United States Patent
Furuta et al.

(10) Patent No.: US 11,592,605 B2
(45) Date of Patent: Feb. 28, 2023

(54) COLOR DEVELOPING STRUCTURE HAVING CONCAVE-CONVEX LAYER, METHOD FOR PRODUCING SUCH STRUCTURE, AND DISPLAY

(71) Applicant: TOPPAN PRINTING CO., LTD., Tokyo (JP)

(72) Inventors: Kaoru Furuta, Tokyo (JP); Hiroyuki Michi, Tokyo (JP); Masashi Kawashita, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 456 days.

(21) Appl. No.: 16/723,107

(22) Filed: Dec. 20, 2019

(65) Prior Publication Data
US 2020/0132900 A1    Apr. 30, 2020

Related U.S. Application Data

(63) Continuation of application No. PCT/JP2018/024246, filed on Jun. 26, 2016.

(30) Foreign Application Priority Data

Jun. 28, 2017 (JP) .............................. JP2017-125816
Dec. 20, 2017 (JP) .............................. JP2017-243586
May 9, 2018 (JP) .............................. JP2018-090841

(51) Int. Cl.
  *B42D 25/324* (2014.01)
  *B42D 25/373* (2014.01)
  (Continued)

(52) U.S. Cl.
  CPC ........... *G02B 5/285* (2013.01); *B42D 25/324* (2014.10); *B42D 25/373* (2014.10); *G02B 1/11* (2013.01);
  (Continued)

(58) Field of Classification Search
  CPC ........... B32B 7/023; B41M 1/10; B41M 3/14; B42D 25/324; B42D 25/328; B42D 25/36;
  (Continued)

(56) References Cited

U.S. PATENT DOCUMENTS 10,571,607 B2 *  2/2020  Kawashita ........... G02B 5/1857
2005/0023433 A1  2/2005  Ishitaka et al.
(Continued)

FOREIGN PATENT DOCUMENTS

CN        1579737 A     2/2005
EP       3 324 222 A1   5/2018
(Continued)

OTHER PUBLICATIONS

English translation of Rikagaku, JP 4853945 B2, retrieved from the website http://worldwide.espacenet.com on May 23, 2022 (Year: 2012).*

(Continued)

*Primary Examiner* — Ryan S Dunning
(74) *Attorney, Agent, or Firm* — Foley & Lardner LLP

(57) ABSTRACT

A color developing structure that exhibits good color development and ensures a desired transmittance while diffusing reflected light in multiple directions. A color developing structure includes a concave-convex layer in which a first surface has a concave-convex structure, and a reflective layer formed on the first surface to extend along the concave-convex structure. A convex surface of the concave-convex structure has a first pattern composed of a plurality of strip portions in plan view. The strip portion has a width in a first direction and a length in a second direction perpendicular to the first direction. The width is smaller than the wavelength of the incident light, and a standard deviation of the lengths of the plurality of strip portions is larger than a standard deviation of the widths.

20 Claims, 18 Drawing Sheets

(51) Int. Cl.
  *G02B 5/28* (2006.01)
  *G02B 1/11* (2015.01)
  *G02B 5/18* (2006.01)
  *B32B 7/023* (2019.01)
  *B41M 1/10* (2006.01)
  *B41M 3/14* (2006.01)

(52) U.S. Cl.
  CPC ......... *G02B 5/1809* (2013.01); *G02B 5/1842* (2013.01); *B32B 7/023* (2019.01); *B41M 1/10* (2013.01); *B41M 3/14* (2013.01)

(58) Field of Classification Search
  CPC .... G02B 5/1809; G02B 5/1842; G02B 5/203; G02B 5/285–287
  See application file for complete search history.

(56) References Cited

U.S. PATENT DOCUMENTS

| | | | |
|---|---|---|---|
| 2008/0054624 A1* | 3/2008 | Adams | B44C 1/227 |
| | | | 438/20 |
| 2013/0081612 A1 | 4/2013 | Honda | |
| 2017/0324063 A1 | 11/2017 | Ohara et al. | |
| 2019/0329527 A1* | 10/2019 | Yoshimura | B32B 3/30 |
| 2019/0333418 A1* | 10/2019 | Kawashita | B32B 7/02 |
| 2021/0132271 A1* | 5/2021 | Kawashita | B32B 27/08 |
| 2021/0268826 A1 | 9/2021 | Yashiki | |
| 2021/0294096 A1* | 9/2021 | Yoshimura | G02B 27/0037 |

FOREIGN PATENT DOCUMENTS

| | | | | |
|---|---|---|---|---|
| EP | 3 570 078 | A1 | | 11/2019 |
| JP | 2005-047080 | A | | 2/2005 |
| JP | 2005-153192 | A | | 6/2005 |
| JP | 2009-155114 | A | | 7/2009 |
| JP | 2010-201644 | A | | 9/2010 |
| JP | 4853945 | B2 | * | 1/2012 ........... G02B 5/1861 |
| JP | 2012-139899 | A | | 7/2012 |
| JP | 2013-174683 | A | | 9/2013 |
| JP | 2013-233762 | A | | 11/2013 |
| JP | 2014-222359 | A | | 11/2014 |
| JP | 2015-194615 | A | | 11/2015 |
| JP | 2017-021140 | A | | 1/2017 |
| JP | 2017-140720 | A | | 8/2017 |
| KR | 1340549 | B1 | * | 12/2013 |
| WO | WO-2010/126640 | A2 | | 11/2010 |
| WO | WO-2011/158677 | A1 | | 12/2011 |
| WO | WO-2016/084727 | A1 | | 6/2016 |
| WO | WO-2016/125843 | A1 | | 8/2016 |
| WO | WO-2017/010099 | A1 | | 1/2017 |
| WO | WO-2017/138536 | A1 | | 8/2017 |

OTHER PUBLICATIONS

English translation of Lee et al., KR 10-1340549 B1, retrieved from the website http://worldwide.espacenet.com on May 31, 2022 (Year: 2013).*

International Searching Authority, "International Search Report," issued in connection with International Patent Application No. PCT/JP2018/024246, dated Sep. 18, 2018.

International Searching Authority, "Written Opinion," issued in connection with International Patent Application No. PCT/JP2018/024246, dated Sep. 18, 2018.

Office Action dated Jul. 23, 2021 issued in a corresponding Chinese Patent Application No. 201880043037.9, (25 pages).

Extended European Search Report dated Jun. 8, 2020 for corresponding European Patent Application No. 18823749.9.

Notice of Reasons for Rejection, dated Nov. 24, 2021, issued in corresponding Japanese Patent Application No. 2017-243586, (8 pages).

Decision of Rejection issued in corresponding Japanese Patent Application No. 2017-243586 dated May 17, 2022 (8 pages).

* cited by examiner

THIRD DIRECTION

FIRST DIRECTION

THIRD DIRECTION

FIRST DIRECTION

COLOR DEVELOPING STRUCTURE HAVING CONCAVE-CONVEX LAYER, METHOD FOR PRODUCING SUCH STRUCTURE, AND DISPLAY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/024246, filed on Jun. 26, 2018, which is based upon and claims the benefit of priority to Japanese Patent Applications Nos. 2017-125816, filed on Jun. 28, 2017; 2017-243586, filed on Dec. 20, 2017; and 2018-090841, filed on May 9, 2018, the disclosures of which are all incorporated herein by reference in their entireties.

TECHNICAL FIELD

The present invention relates to techniques for color developing structures that develop structural colors.

BACKGROUND ART

Structural colors developed by fine structures are different from colors that are seen due to electronic transitions in molecules, such as colors developed by metallic luster or dyes. Structural colors developed by fine structures are visible due to the action of optical phenomena, such as diffraction, interference, and scattering of light, due to the fine structure of objects.

For example, structural colors due to multilayer film interference are generated in such a manner that, in a multilayer film in which adjacent thin films have different refractive indices, light reflected on each interface of the multilayer film interferes. Multilayer film interference is one of the color developing principles of wings of morpho butterflies, which are natural organisms. In morpho butterfly wings, a vivid blue color is visible due to multilayer film interference.

PTL 1 and PTL 2 disclose structures that artificially reproduce such structural colors.

PTL 1 proposes a structure in which a multilayer film is laminated on a surface of the substrate to reproduce the color developing structure of morpho butterflies.

Further, in a method described in PTL 2, a plurality of thin films having different refractive indices and film thicknesses are sequentially formed on a substrate surface. Accordingly, PTL 2 proposes a structure that reflects interference light having narrowband reflection peaks corresponding to red, green, and blue from part of the incident light to thereby obtain iridescent decoration effect.

CITATION LIST

[Patent Literature]: PTL 1: JP 2005-153192 A; PTL 2: JP 2010-201644 A.

SUMMARY OF THE INVENTION

Technical Problem

According to techniques of PTLs 1 and 2, a specific wavelength range among the incident wavelengths is reflected by setting the film thickness and the number of layers of a multilayer film laminated on a flat surface. However, in addition to the reflected light of a specific wavelength due to the multilayer film, light which has been transmitted through the rear surface and light reflected by a substrate or the like rather than by the multilayer film are also visible to an observer. Accordingly, an observer views light of wavelength ranges other than that of the specific wavelength range. That is, there has been a problem that the visibility of the specific wavelength range is reduced.

The present invention is directed to provide a color developing structure that exhibits good color development and enables diffusion of reflected light in multiple directions.

Solution to Problem

In order to address the problem, an aspect of the present invention provides a color developing structure comprising: a concave-convex layer having a first surface, and a second surface located on a side facing away from the first surface, the first surface being provided with a concave-convex structure; and a functional layer located on the first surface or the second surface of the concave-convex layer, wherein a convex surface of the concave-convex structure has a first pattern composed of a plurality of strip portions in plan view, and the strip portion has a width in a first direction and a length in a second direction perpendicular to the first direction, the width is smaller than a wavelength of incident light, and a standard deviation of the lengths of the plurality of strip portions is larger than a standard deviation of the widths.

Advantageous Effects of Invention

According to a color developing structure of an aspect of the present invention, good color development and diffusion of reflected light in multiple directions are expected. Using such a color developing structure enables implementation of displays and other products having high designability and which are functional and inexpensive.

BRIEF DESCRIPTION OF THE DRAWINGS

FIGS. 16A and 16B are schematic configuration views illustrating an example of a concave-convex layer according to the second embodiment, in which FIG. 16A is a plan view, and FIG. 16B is a cross-sectional view.

FIGS. 17A and 17B are views illustrating a second strip shape according to the second embodiment, in which FIG. 17A is a plan view, and FIG. 17B is a cross-sectional view.

FIGS. 18A and 18B are schematic configuration views illustrating an example of a concave-convex layer having a multi-stage shape according to the second embodiment, in which FIG. 18A is a plan view, and FIG. 18B is a cross-sectional view.

FIGS. 21A and 21B are schematic configuration views illustrating an example of a concave-convex structure of the antireflection layer shown in FIG. 20, in which FIG. 21A is a rear view, and FIG. 21B is a cross-sectional view.

FIGS. 24A and 24B are schematic configuration views illustrating an example of a concave-convex structure of the antireflection layer shown in FIG. 23, in which FIG. 24A is a rear view, and FIG. 24B is a cross-sectional view.

DETAILED DESCRIPTION OF REPRESENTATIVE EMBODIMENTS

Figure 1:
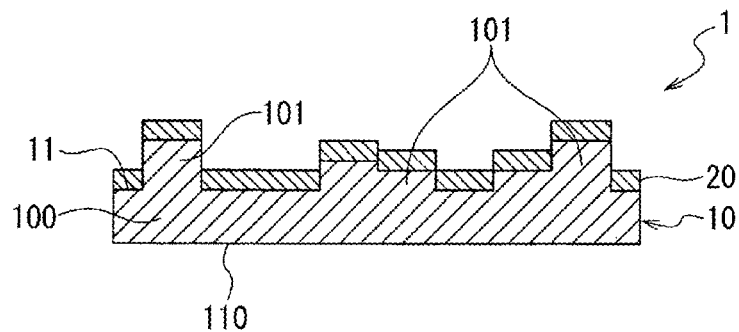
FIG. 1 is a cross-sectional view of a color developing structure of a first embodiment-1.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

A color developing structure of the present embodiment includes a concave-convex layer and a functional layer. The concave-convex layer has a first surface and a second surface, which is a surface located on a side facing away from the first surface, and a concave-convex structure is formed on the first surface. The functional layer is disposed on the first surface or the second surface of the concave-convex layer. The functional layer is formed of a reflective layer or an antireflection layer. The convex surface of the concave-convex structure has a first pattern, which is composed of a plurality of strip portions in plan view. The strip portion has a width in a first direction, and a length in a second direction perpendicular to the first direction. The width is smaller than the wavelength of the incident light, and a standard deviation of the lengths of the plurality of strip portions is larger than a standard deviation of the widths.

The wavelength ranges of incident light and reflected light with respect to the color developing structure are not limited. The following description describes, as an example, a color developing structure intended for light in the visible region. In the first embodiment, the wavelength range of 360 nm or more and 830 nm or less is taken as light in the visible region.

First Embodiment

A first embodiment will now be described.

The color developing structure of the first embodiment is an example in which the functional layer is formed of a reflective layer.

Hereinafter, the first embodiment will be further described with reference to the drawings.

0001Here, an emission direction of light reflected by the structure is limited to a specific direction depending on the angle of incidence of incident light. For example, the wavelength of reflected light greatly changes depending on the observation angle due to metallic luster of the metallic surface that reflects incident light or a structure provided with a multilayer film laminated on a flat surface as described in PTL 2. That is, the visible color greatly changes depending on the observation angle. Therefore, in the related art, there has been a problem that a specific color cannot be uniformly observed across a wide observation angle.

Further, the wavelength of light enhanced by interference due to the multilayer film changes according to the optical path difference generated in each layer of the multilayer film. The optical path difference is determined depending on the film thickness and refractive index of each layer. In the structures described in PTL 1 and PTL 2, colors are produced by multilayer film interference in which the film thicknesses of the low refractive index compound and the high refractive index compound and the number of layers laminated are adjusted. Since each layer in the multilayer film interference has low reflectance, it is necessary to laminate more than ten layers in order to visually recognize a desired wavelength range. Examples of those having a large number of laminated layers include Tetoron (registered trademark, Teijin film solutions Ltd.), which is a structural color film using a multilayer film structure. Tetoron is a laminate of hundreds of layers to produce colors.

In formation of a multilayer film, when a film thickness deviates from the design value range, changes in optical path length occur, which causes a failure in producing a desired color. That is, when the film thickness deviates from the design value range, a problem known as color deviation occurs. Therefore, it is necessary to form a thin uniform film, which is formed by using known techniques such as vacuum vapor deposition, sputtering, atomic layer deposition, and the like. For example, in vacuum vapor deposition, the film thickness of each layer is controlled by using a crystal oscillator. However, since the crystal oscillator is sensitive to contamination, the film thickness may often deviate from the specified value. Further, since the film is formed under vacuum, the oscillator cannot be replaced during the process. Therefore, when more than ten layers are laminated as a multilayer film, errors are accumulated, leading to a failure in obtaining a desired film thickness. In addition, when physical or chemical damage occurs to the structure composed of more than ten layers from the outside, the multilayer film structure is likely to be deformed, leading to a failure in producing a desired color.

In terms of production, in mass production of the structures, a plurality of vacuum vapor deposition machines are required for each vapor deposition source since more than ten layers to hundreds of layers of the low refractive index compounds and the high refractive index compounds are laminated. Further, in terms of cost, the materials are expensive. Even if a small number of vacuum vapor deposition machines are used to repeat vapor deposition, the production cost rises due to an increased flow time. Further, when a display is produced having a color developing structure produced by such a method, the unit price becomes very expensive.

In contrast, according to the first embodiment, it is possible to provide a color developing structure that exhibits good color development without need of laminating more than ten layers, and enables diffusion of reflected light in multiple directions.

First Embodiment-1

A first embodiment-1 will now be described.

As shown in FIG. 1, a color developing structure 1 of the first embodiment-1 includes a concave-convex layer 10 and a reflective layer 20. The concave-convex layer 10 includes a flat region 100 and a concave-convex structure 101 formed on one surface (first surface 11) of the flat region. The flat region 100 has the first surface 11 on which the concave-convex structure 101 is formed and a second surface 110 on a side facing away from the first surface 11.

In the present embodiment, a convex structure is formed on the upper surface of the flat region 100 to thereby provide the concave-convex structure. The concave-convex structure can also be provided by forming a concave structure on the upper surface of the flat region 100. The same applies to other embodiments.

Here, a portion of the upper surface (first surface 11) of the flat region 100 where the convex structure is not formed also constitutes part of the concave-convex surface of the concave-convex structure. The same applies to other embodiments.

The reflective layer 20 is formed extending along the surface of the concave-convex layer 10 on a side having the first surface 11 on which the concave-convex structure is provided.

Figure 2A:
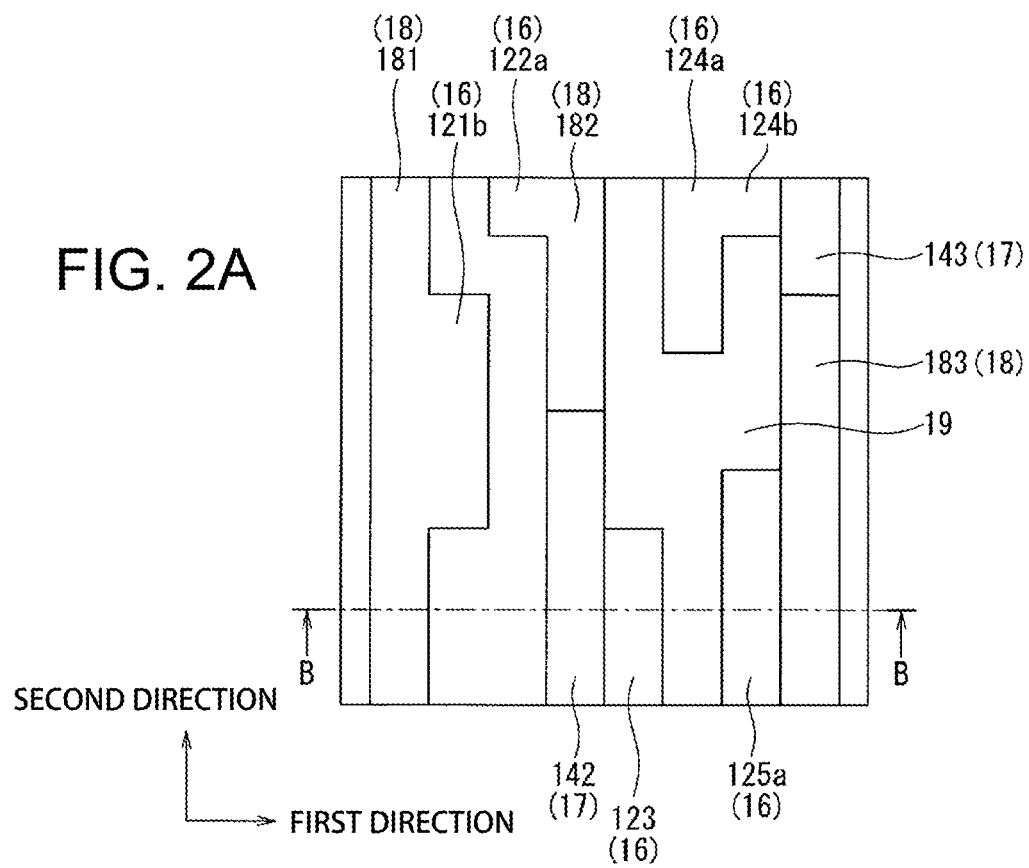
FIGS. 2A and 2B include a plan view (FIG. 2A) illustrating convex surfaces of the multi-stage shape that constitutes the concave-convex structure of the color developing structure of the first embodiment-1, and a cross-sectional view FIG. 2B taken along the line B-B.
Figure 2B:
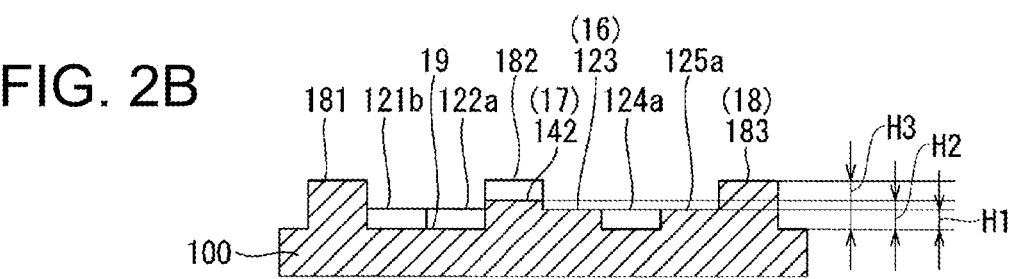

As shown in FIGS. 2A and 2B, the concave-convex structure of the concave-convex layer 10 includes convex surfaces $121b$ to $183$ having three different heights (H1<H2<H3) from a predetermined reference surface (for example, the upper surface of the flat region 100). The convex surfaces $121b$, $122a$, $123$, $124a$, $124b$, and $125a$ have the height H1. The convex surface 142 and 143 have the height H2. The convex surfaces 181, 182, and 183 have the height H3. That is, in the color developing structure 1 of the first embodiment, the concave-convex structure of the concave-convex layer 10 has a multi-stage shape composed of three stages in which the convex surface has three different heights. The three-stage shape is obtained by partially superimposing the convex structure constituting a second pattern 14 shown in FIGS. 4A and 4B on the convex structure constituting the first pattern 12 shown in FIGS. 3A and 3B.

Further, in the color developing structure of the present embodiment, when the convex surface of the concave-convex structure has a multi-stage shape, the multi-stage shape may be composed of at least two stages in which the convex surface has two different heights.

Figure 3A:
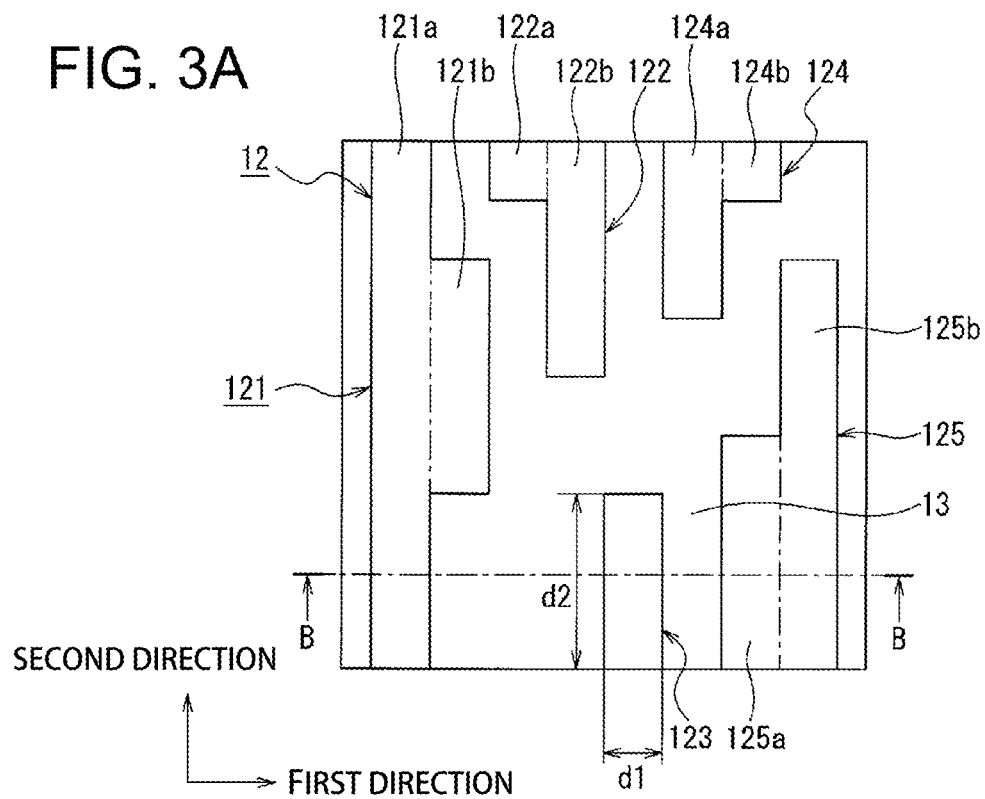
FIGS. 3A and 3B include a plan view (FIG. 3A) of a first pattern that constitutes the convex surfaces of the multi-stage shape of the first embodiment-1, and a cross-sectional view (FIG. 3B) taken along the line B-B.
Figure 3B:
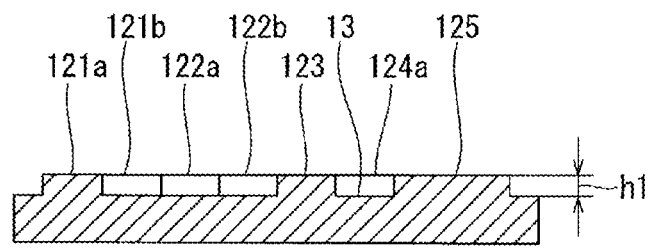

As shown in FIGS. 3A and 3B, the first pattern 12 is composed of a plurality of strip portions $121a$, $121b$, $122a$, $122b$, $123$, $124a$, $124b$, $125a$, and $125b$ in plan view. Each of the strip portions $121a$ to $125b$ has a width d1 in the first direction and a length d2 in the second direction perpendicular to the first direction. The width d1 is smaller than the wavelength of the incident light. In the plurality of strip portions, the standard deviation of the lengths d2 is larger than the standard deviation of the widths d1.

Further, among these strip portions, the strip portions $121a$ and $121b$, the strip portions $122a$ and $122b$, the strip portions $124a$ and $124b$, and the strip portions $125a$ and $125b$, which are adjacent in the first direction and in contact with each other, each form single patterns 121, 122, 124, and 125, respectively.

Further, among the strip portions $121a$ to $125b$, the strip portions $124b$ and $122a$ have a square shape. In the present invention, the strip portion may include square shapes. Further, throughout the drawings, the strip portions $121a$ to $125b$ are illustrated as rectangular shapes in plan view. However, the strip portion is not limited to these shapes. The strip portion may have other rectangular shapes or oval shapes having a width which is not constant. That is, the strip shape can be defined as a shape that satisfies $d1 \leq d2$.

Figure 4A:
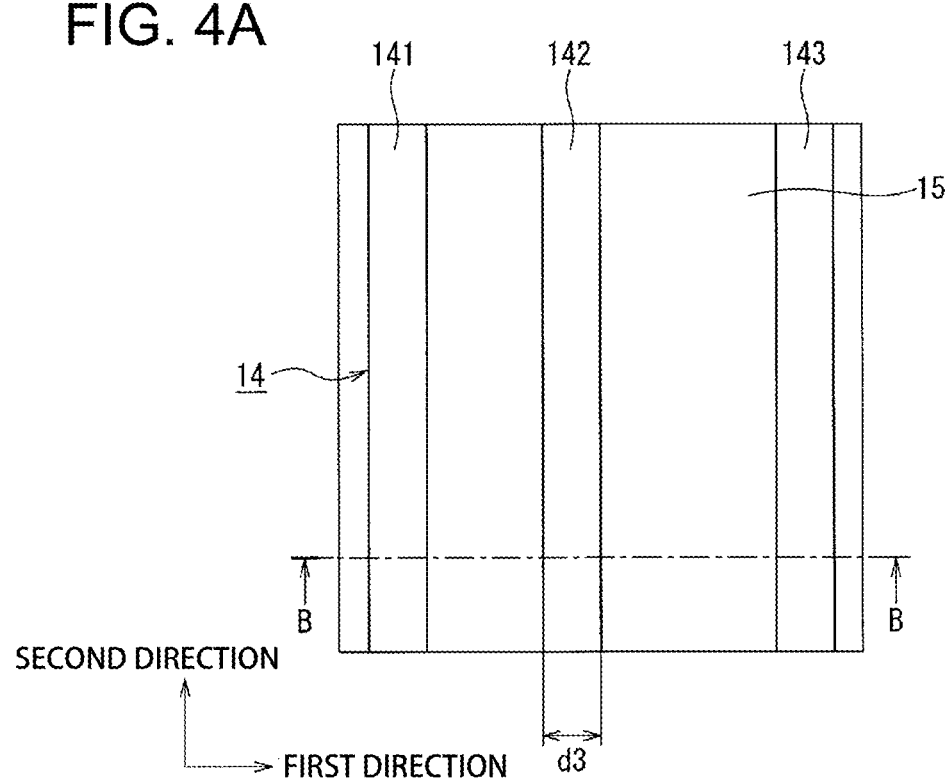
FIGS. 4A and 4B include a plan view (FIG. 4A) of a second pattern that constitutes the convex surfaces of the multi-stage shape of the first embodiment-1, and a cross-sectional view (FIG. 4B) taken along the line B-B.
Figure 4B:
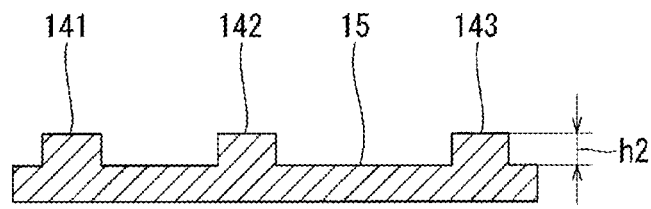

As shown in FIGS. 4A and 4B, the second pattern 14 is composed of a plurality of strip portions 141 to 143 in plan view. The strip portion of the second pattern 14 has a width d3 in the first direction and a length in the second direction perpendicular to the first direction. The arrangement intervals of the plurality of strip portions 141 to 143 in the first direction are not constant. The average of the arrangement intervals is ½ or more of the minimum wavelength in the wavelength ranges of incident light.

First Embodiment-2

Next, a first embodiment-2 will now be described.

Figure 5:
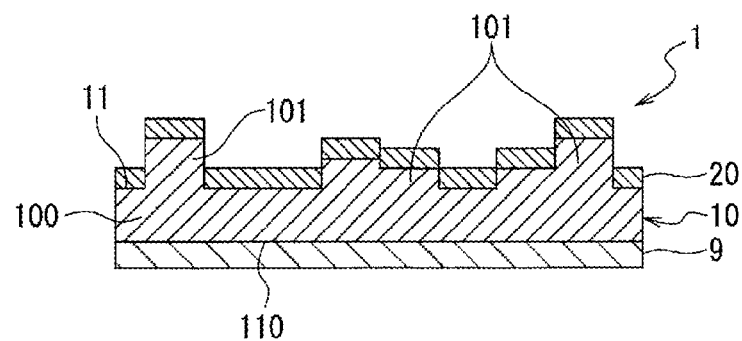
FIG. 5 is a cross-sectional view of a color developing structure of a first embodiment-2.

As shown in FIG. 5, the color developing structure 1 of the first embodiment-2 includes a substrate 9 on a lower surface (second surface 110 located on a side opposite to that on which the reflective layer 20 is formed) of the concave-convex layer 10 of the color developing structure 1 of the first embodiment-1. Other configuration is the same as that of the color developing structure 1 of the first embodiment-1. The substrate 9 may not be necessarily provided in the color developing structure if an increased thickness is provided in the color developing structure 1 in addition to the concave-convex structure of the concave-convex layer 10. However, in the first embodiment-2, the substrate 9 is provided in the color developing structure in order to impart functions such as mechanical strength and formability.

[Supplementary Description of First Embodiment-1 and First Embodiment-2]

The concave-convex layer 10 is made of a material that transmits light in the visible region, and has a concave-convex structure on one or both surfaces thereof. FIGS. 1 and 5 illustrate an example in which the concave-convex structure 101 is provided only on the first surface. However, the concave-convex layer 10 may also include a concave-convex structure provided on the second surface. In the first embodiment-1 and the first embodiment-2, the reflective layer 20 is provided only on the first surface.

The reflective layer 20 is located on the first surface 11 of the concave-convex layer 10, and has a surface shape that follows the concave-convex structure 101 to cover the first surface 11 of the concave-convex layer 10. Accordingly, when light is incident on the reflective layer 20, strong reflected light is emitted at the interface between the reflective layer 20 and the air, since the wavelength of the light and the vibration direction of free electrons of the metal are different. When the concave-convex structure is not provided, the light is observed as having high intensity due to a high intensity of only the specular reflected light. When the reflective layer 20 having a surface shape that follows the concave-convex layer 10 is provided, scattered light having anisotropy rather than specular reflected light is generated. Accordingly, reflected light is observed as light having directivity.

The reflective layer 20 preferably includes at least one metal or metal alloy having a refractive index of 0.2 or more and 5.0 or less. When at least one metal or metal alloy having a refractive index of 0.2 or more and 5.0 or less is included, the intensity of light reflected by the reflective layer increases.

Further, an extinction coefficient of the reflective layer in the visible light region is preferably 2 or more and 6 or less so that light absorption is decreased and the reflected light is efficiently emitted.

First Embodiment-3

Next, a first embodiment-3 will now be described.

Figure 6:
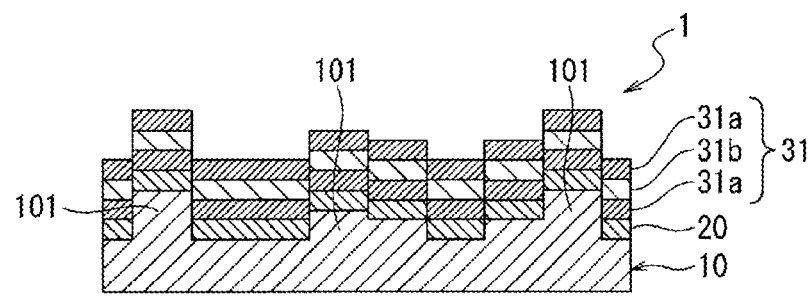
FIG. 6 is a cross-sectional view of a color developing structure of a first embodiment-3.

As shown in FIG. 6, the color developing structure 1 of the first embodiment-3 includes an interference layer 31 on the reflective layer 20 of the color developing structure 1 of the first embodiment-1. Other configuration is the same as that of the color developing structure 1 of the first embodiment-1.

The interference layer 31 of the first embodiment-3 has a multilayer configuration composed of three or fewer layers. The multilayer configuration has a structure in which high refractive index layers 31a and low refractive index layers 31b are alternately laminated. The refractive index of the high refractive index layer 31a is larger than the refractive index of the low refractive index layer 31b. In order to increase the amount of interference light by using a small number of layers, the difference between the refractive indices of the high refractive index layer 31a and the low refractive index layer 31b is preferably in the range of 0.6 or more and 1.5 or less.

The interference layer 31 is disposed on the reflective layer 20. The interference layer 31 has a surface shape that follows the concave-convex structure 101 so as to cover the reflective layer 20. When the refractive index is n and the optical path difference is 1, increased brightness is achieved under the condition of 2nl=(m+½). The refractive index of the interference layer 31 is larger than that of the refractive index of the reflective layer 20. In order to increase the amount of reflected light from the surface on a side opposite to that contacting the reflective layer 20 (upper surface in FIG. 6), the refractive index of the interference layer 31 is preferably in the range of 1.4 or more and 5.0 or less.

When light enters the color developing structure 1, light reflected by each interface between the high refractive index layer 31a and the low refractive index layer 31b of the interference layer 31 undergoes interference. At this time, light changes traveling direction due to the irregular asperities of the interference layer 31. As a result, light of a specific wavelength range is emitted in a wide angular range. Further, light which has been transmitted without being reflected by the interference layer 31 reaches the reflective layer 20. Here, light reflected by the reflective layer 20 travels again to the interference layer 31. Since light that has traveled to the interference layer 31 again undergoes interference by the interference layer 31, it is strongly emitted from the color developing structure 1 as reflected light having a specific wavelength range. The wavelength range of reflected light is determined depending on the refractive index and extinction coefficient of the material constituting the high refractive index layer 31a and the low refractive index layer 31b, the film thickness, and the width, height, and arrangement of the convex portion.

In FIG. 6, the interference layer 31 is illustrated as a multilayer film. However, the interference layer 31 may also be a thin film composed of a single layer. When the interference layer 31 is a single layer, the phase of light emitted from the interference layer 31 is reversed due to the thin film interference by the interference layer 31, and thus the effect is achieved. Further, in the present embodiment, since the reflective layer 20 is provided as an underlayer of the interference layer 31, the utilization efficiency of incident light can be increased for the same reason as described above. Therefore, the interference layer 31 composed of a single layer is also preferred since good visibility can also be achieved.

First Embodiment-4

Next, a first embodiment-4 will now be described.

Figure 7:
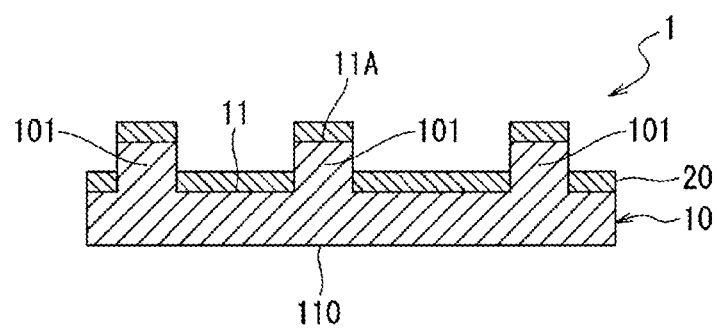
FIG. 7 is a cross-sectional view of a color developing structure of a first embodiment-4.

As shown in FIG. 7, the color developing structure 1 of the first embodiment-4 includes the concave-convex layer 10 in which the first surface 11 has the concave-convex structure 101, and the reflective layer 20 extending along the concave-convex structure of the first surface 11. The color developing structure 1 of the first embodiment-4 is an example in which the convex surfaces of the concave-convex structure 101 of the concave-convex layer 10 have the same shape (a plurality of convex surfaces have the same height).

The shape of the convex surfaces is composed of a plurality of strip portions in plan view. Each strip portion has a width in the first direction and a length in the second direction perpendicular to the first direction. The width in the first direction is smaller than the wavelength of the incident light. In the plurality of strip portions, the standard deviation of the lengths d2 is larger than the standard deviation of the widths d1. That is, in the color developing structure 1, the convex surfaces of the concave-convex structure 101 of the concave-convex layer 10 have only the first pattern. Further, the reflective layer 20 is formed extending along the surface of the concave-convex structure on the first surface 11 of the concave-convex layer 10.

Other configuration is the same as the color developing structure 1 of the first embodiment-1.

First Embodiment-5

Next, a first embodiment-5 will now be described.

Figure 8:
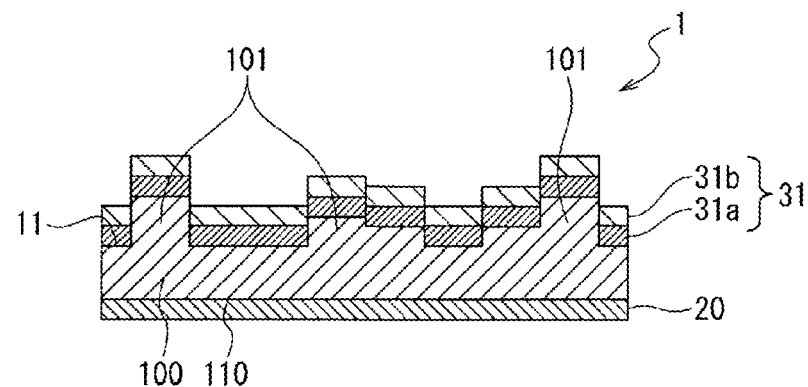
FIG. 8 is a cross-sectional view illustrating a color developing structure of a first embodiment-5.

As shown in FIG. 8, the color developing structure 1 of the first embodiment-5 is configured such that the reflective layer 20 of the color developing structure 1 of the first embodiment-1 is disposed on the second surface 110 of the concave-convex layer 10. Other configuration is the same as that of the other embodiments.

In the color developing structure 1, the incident light is partially scattered and reflected by the concave-convex structure 101, and partially transmitted through the concave-convex layer 10. Since the reflective layer 20 is provided on the second surface 110, the light which has been transmitted through the concave-convex layer 10 is reflected by the reflective layer 20, and again transmitted through the concave-convex structure. Due to the concave-convex structure, the reflected light becomes scattered light having anisotropy rather than specular reflected light, and is observed as light having directivity. Furthermore, the thickness of the flat region 100 (thickness between the first surface 11 and the second surface 110) can be adjusted to thereby allow the flat region 100 to serve as one thin film layer. As a result, the number of layers of the interference layer 31 can be decreased because the flat region 100 can serve as part of the multilayer film. Further, thin film interference by the flat region can also be generated without providing the interference layer.

The thickness between the first surface 11 and the second surface 110 of the concave-convex layer 10 is preferably in the range of 20 nm or more and 1000 nm or less. When the thickness is within this range, the flat region can be used as one of the layers constituting the interference layer so that interference light can be effectively obtained.

Although the color developing structure 1 includes the interference layer 31, the interference layer 31 may not be necessarily provided. The interference layer 31 may be configured to extend along the concave-convex structure as in the first embodiment-3, or may have a flat surface shape. The interference layer 31 may also be provided on the second surface 110, which is different from the concave-convex surface of the concave-convex layer, or may also be provided between the concave-convex layer 10 and the reflective layer 20.

First Embodiment-6

Next, a first embodiment-6 will now be described.

Figure 9:
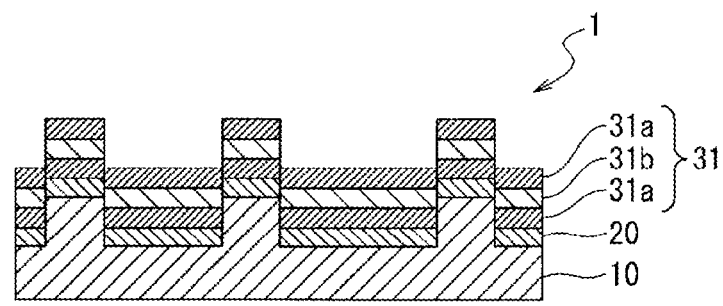
FIG. 9 is a cross-sectional view of a color developing structure of a first embodiment-6.

As shown in FIG. 9, the color developing structure 1 of the first embodiment-6 includes an interference layer 31 on the reflective layer 20 of the color developing structure 1 of the first embodiment-4. A configuration of the interference layer 31 is the same as that of the color developing structure 1 of the first embodiment-3. Other configuration is the same as that of the color developing structure 1 of the first embodiment-4.

First Embodiment-7

Next, a first embodiment-7 will now be described.

Figure 10:
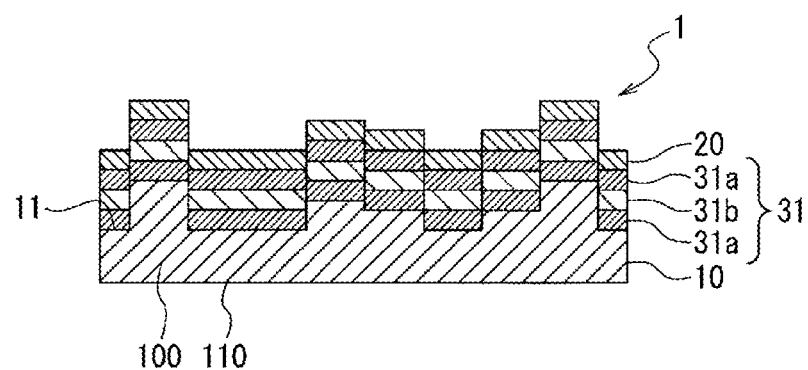
FIG. 10 is a cross-sectional view illustrating a color developing structure of a first embodiment-7.

As shown in FIG. 10, the color developing structure 1 of the first embodiment-7 differs from the color developing structure 1 of the first embodiment-3 in that it includes the reflective layer 20 on the interference layer 31. Other configuration is the same as that of the color developing structure 1 of the first embodiment-3.

The configuration of the first embodiment-7 is useful mainly when it is observed through the second surface 110. That is, when light enters the second surface 110 of the color developing structure 1, the light which has been transmitted through the second surface 110 changes traveling direction due to irregular asperities on the surface of the interference layer 31. Accordingly, light undergoes interference as it is reflected by each interface between the high refractive index layer 31a and the low refractive index layer 31b of the interference layer 31. As a result, in the first embodiment-7, light of a specific wavelength range is emitted across a wide angular range. Further, light which has been transmitted without being reflected by the interference layer 31 reaches the reflective layer 20. Here, light reflected by the reflective layer 20 travels again to the interference layer 31. Since light that has traveled to the interference layer 31 again undergoes interference by the interference layer 31, it is strongly emitted from the color developing structure 1 as reflected light having a specific wavelength range. The wavelength range of reflected light is determined depending on the refractive index and extinction coefficient of the material constituting the high refractive index layer 31a and the low refractive index layer 31b, the film thickness, and the width, height, and arrangement of the convex portion.

First Embodiment-8

Next, a first embodiment-8 will now be described.

Figure 11:
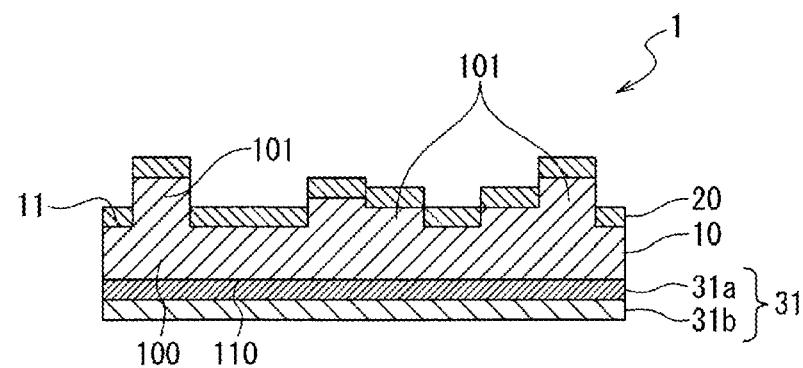
FIG. 11 is a cross-sectional view illustrating a color developing structure of a first embodiment-8.

As shown in FIG. 11, the color developing structure 1 of the first embodiment-8 includes the reflective layer 20 that extends along the concave-convex structure 101, and an interference layer 31 on the second surface 110 located on a side opposite to that on which the reflective layer 20 is formed. Other configuration is the same as that of the color developing structure of the other embodiments.

The first embodiment-8 is useful mainly when it is observed through the second surface 110. That is, when light enters through the second surface 110 of the color developing structure 1, the light is reflected by each interface between the high refractive index layer 31a and the low refractive index layer 31b of the interference layer 31 and undergoes interference. Further, light which has been transmitted without being reflected by the interference layer 31 is transmitted through the second surface 110, and reaches the reflective layer 20 while changing traveling direction due to the irregular asperities. Here, light reflected by the reflective layer 20 travels again to the interference layer 31. Since light that has traveled to the interference layer 31 again undergoes interference by the interference layer 31, light having a specific wavelength range is strongly emitted in a wide angular range from the color developing structure 1. The wavelength range of reflected light is determined depending on the refractive index and extinction coefficient of the material constituting the high refractive index layer 31a and the low refractive index layer 31b, the film thickness, and the width, height, and arrangement of the convex portion.

[Supplementary Description]

<First Pattern>

With reference to FIGS. 3A and 3B, the details of the concave-convex structure of the concave-convex layer will be supplementarily described. As shown in FIG. 3A, a virtual plane to which the concave-convex structure is projected in the thickness direction of the concave-convex layer is illustrated as a rectangular shape having two sides parallel in the first direction and two sides parallel in the second direction, which is perpendicular to the first direction. A pattern shown on this virtual plane corresponds to a pattern of the convex surface of the concave-convex structure in plan view.

As shown in FIG. 3A, a plurality of convex portions constituting the concave-convex structure have strip shapes having irregular lengths. As shown in FIG. 3B, the concave-convex structure is composed of a plurality of convex portions and a plurality of concave portions.

In the virtual plane, a pattern formed by the projected image of the first pattern 12 is a pattern composed of a plurality of strip portions. The first pattern 12 has a shape extending in the second direction, and the strip portion has the length d2 in the second direction, which is larger than the length (width) d1 in the first direction. The plurality of strip portions of the first pattern are arranged so as not to be overlapped in either the first direction or the second direction.

In the plurality of strip portions constituting the first pattern 12, the length d1 in the first direction is constant. The plurality of strip portions are arranged in the first direction at an arrangement intervals of the length d1. That is, the plurality of strip portions are arranged with a periodicity of the length d1.

On the other hand, in the plurality of strip portions constituting the first pattern 12, the length d2 in the second direction is not constant. The length d2 of each strip portion is a value selected from a population having a predetermined standard deviation. This population preferably follows a normal distribution.

In formation of the first pattern composed of the plurality of strip portions, for example, the plurality of strip portions having the length d2 distributed with a predetermined standard deviation are temporarily spread in a predetermined region. Here, whether the respective strip portions should be actually fixed or not at these locations are determined according to a predetermined probability to thereby determine regions where the strip portions should be located and where the strip portions should not be located. In order to efficiently scatter the reflected light from the reflective layer 20, the length d2 preferably has an average of 4.15 μm or less and distribution with a standard deviation of 1 μm or less.

The region in which the first pattern 12 is positioned is a region in which the strip portion is arranged. In the first pattern 12, when the adjacent strip portions are in contact with each other, each region formed by combining the strip portions can be regarded as one strip portion. In this configuration, the length in the first direction of the strip portions constituting the first pattern 12 is an integral multiple of the width d1 of the strip portion.

In order to prevent occurrence of rainbow spectrum due to the concave-convex structure, the length (width) d1 in the first direction of the strip portions constituting the first pattern 12 is not larger than the wavelength of the light in the visible region. In other words, the length d1 is subwavelength. That is, the length d1 is equal to or less than the wavelength range of incident light. That is, the length d1 is preferably 830 nm or less, and more preferably 700 nm or less.

Further, the length d1 is preferably less than the peak wavelength of light in the above specific wavelength range reflected from the reflective layer 20. For example, when the color developing structure 40 is intended to develop a blue color, the length d1 is, preferably, 300 nm or approximately 300 nm. When the color developing structure 40 is intended to develop a green color, the length d1 is, preferably, 400 nm or approximately 400 nm. When the color developing structure 40 is intended to develop a red color, the length d1 is, preferably, 460 nm or approximately 460 nm.

In order to increase the spread of light reflected by the reflective layer 20, that is, to enhance the scattering effect of the reflected light, the concave-convex structure preferably has many asperities. Further, the ratio of the area occupied by the first pattern 12 per unit area in plan view is preferably in the range of 40% or more and 60% or less. For example, the ratio of the area occupied by the first pattern 12 to the first concave portion 13 per unit area in plan view is preferably 1:1.

As shown in FIG. 3B, the height h1 of the first pattern 12 is constant, and can be set according to the color desired to be exhibited by the color developing structure 1. That is, the height h1 can be set depending on the wavelength range of light desired to be reflected from the color developing structure 1. When the height h1 of the convex portion of the first pattern 12 is larger than the surface roughness of the reflective layer 20 on the convex portions of the first pattern 12 and the first concave portion 13, the scattering effect of the reflected light can be obtained.

However, in order to suppress the interference of light caused by reflection on the asperities on the surface of the reflective layer 20, the height h1 is preferably equal to or less than ½ of the wavelength of light in the visible region. That is, the height h1 is preferably 415 nm or less. Furthermore, in order to suppress the interference of light described above, the height h1 is more preferably equal to or less than ½ of the peak wavelength of light in the above specific wavelength range reflected by the reflective layer 20 and the interference layer 31.

Moreover, if the height h1 is excessively large, the scattering effect of the reflected light increases too much, and the intensity of the reflected light tends to be low. Accordingly, when the reflected light is light in the visible region, the height h1 is preferably 10 nm or more and 200 nm or less. For example, in a color developing structure 40 that exhibits a blue color, the height h1 is preferably 40 nm or more and 150 nm or less in order to obtain effective light spreading, and the height h1 is preferably 100 nm or less in order to suppress the scattering effect from increasing too much.

In addition, the strip portions (hereinafter, also called "strip portions of the first pattern") constituting the first pattern 12 can also be arranged to form a pattern of the first pattern 12 in a virtual plane in a manner such that two adjacent strip portions arranged in the first direction are partially overlapped. In other words, the plurality of strip portions may be arranged in the first direction at an arrangement interval smaller than the length d1, and the arrangement intervals of the strip portions may not be necessarily constant. At the position where the strip portions are overlapped with each other, one pattern is located in one region which is obtained by combining the regions in which the strip portions are located. In this case, the length of the first pattern 12 in the first direction is different from an integral multiple of the length d1 of the strip portion. Moreover, the length d1 of the strip portions constituting the first pattern 12 may not be necessarily constant. In each strip portion, the length d2 may be equal to or greater than the length d1, and the standard deviation of the length d2 of the plurality of strip portions may be larger than the standard deviation of the length d1. With this configuration as well, the scattering effect of the reflected light can be obtained.

<Second Pattern>

When the convex surface of the concave-convex structure has a multi-stage shape, the multi-stage shape is obtained by partially superimposing the second pattern on the first pattern. In this case, the shape of the portion of the first pattern superimposed by the second pattern is also modified.

According to the color developing structures (color developing structures having a first structure) in the first embodiment-4 and the first embodiment-6 shown in FIGS. 7 and 9, respectively, in which the convex surface of the concave-convex structure 101 of the concave-convex layer 10 has a single shape (single stage shape), changes in visible color due to the scattering effect of reflected light depending on the observation angle are gentle. However, the vividness of the visible color decreases due to a decrease in the intensity of the reflected light caused by scattering. Depending on the application or the like of the color developing structure, there may be a case where a structure that enables more vivid colors to be observed in a wide angular range is required.

On the other hand, according to the color developing structures (color developing structures having a second structure) in the first embodiment-1, the first embodiment-2, and the first embodiment-3 shown in FIGS. 1, 5, and 6, respectively, in which the convex surface of the concave-convex structure 101 of the concave-convex layer has a multi-stage shape, the strip portions in the second pattern are arranged to generate diffracted light having high reflection intensity. Therefore, according to these color developing structures, more vivid colors can be observed in a wide angular range due to the scattering effect of light by the first pattern 12 and diffraction effect of light by the second pattern 14.

As shown in FIG. 4A, in the virtual plane described above, the patterns constituting the second pattern 14 have a strip shape extending in the second direction with a constant width. These patterns are arranged with an interval in the first direction. In other words, the patterns constituting the projected image of the second pattern 14 in the virtual plane are patterns composed of a plurality of strip portions that extend in the second direction and are arranged in the first direction. The length (width) d3 of the second pattern 14 in the first direction may be the same or different from the length (width) d1 of the patterns constituting the first pattern 12.

An arrangement interval de in the first direction of the patterns constituting the second pattern 14, that is, an arrangement interval of the strip portions in the first direction is set so that at least part of the light reflected by the surface of the concave-convex structure of the second pattern 14 is observed as first-order diffracted light. In other words, the first-order diffracted light is diffracted light whose diffraction order m is 1 or −1. That is, the arrangement interval de satisfies "de≥λ/(sin θ+sin φ)", where θ is an angle of incidence of the incident light, φ is a reflection angle of reflected light, and λ is a wavelength of diffraction light.

For example, when visible light with λ=360 nm is a target, the arrangement interval de of the second pattern 14 may be 180 nm or more. That is, the arrangement interval de may be ½ or more of the minimum wavelength in the wavelength ranges included in the incident light. Further, the arrangement interval de is a distance in the first direction between the sides of two adjacent patterns, the sides being located on the same side of the respective second patterns 14 in the first direction.

The periodicity of the pattern composed of the strip portions constituting the second pattern 14 is affected by the periodicity of the concave-convex structure of the concave-convex layer 10. That is, the periodicity of the pattern is affected by the periodicity of the concave-convex structure on the surface of the reflective layer 20. When the arrangement intervals de of the plurality of strip portions are constant, reflected light of a specific wavelength is emitted by the reflective layer 20 at a specific angle due to a diffraction phenomenon on the surface of the reflective layer 20. The reflection intensity of light due to this diffraction is much stronger than the reflection intensity of the reflected light due to the scattering effect of light caused by the strip portions described in the aforementioned first pattern 12. Accordingly, while light having a metallic luster is seen, the visible color changes depending on the observation angle since a spectrum due to the diffraction occurs.

Therefore, for example, even if the structure of the strip portions constituting the first pattern is designed to enable the color developing structure to exhibit a blue color, light in the range from strong green to red may be observed by surface reflection due to diffraction depending on the observation angle when the arrangement interval de of the strip portions constituting the second pattern 14 (hereinafter, referred to as "strip portions of the second pattern") is a constant value in the range of 400 nm or more and 5 μm or less. On the other hand, when the arrangement interval de of the strip portions of the second pattern is increased, for example, to 50 μm or approximately 50 μm, the angular range in which light in the visible region is diffracted is decreased. Accordingly, changes in color due to diffraction become less likely to be observed. However, light having brightness such as a metallic luster is observed only at a specific observation angle.

Therefore, when the pattern of the strip portions of the second pattern is formed as the pattern in which a plurality of structures having different periodicities are overlapped with each other, instead of having the arrangement interval de of a constant value, light of a plurality of wavelengths is mixed with the light reflected due to diffraction. Accordingly, dispersed light with high monochromaticity is less likely to be seen. As a result, glossy and vivid colors are observed in a wide angular range. In this case, the arrangement intervals de are selected from, for example, a range of 360 nm or more and 5 μm or less. The average value of the arrangement intervals de of the plurality of the strip portions of the second pattern 14 may be ½ or more of the minimum wavelength of the wavelength range included in the incident light.

However, with an increase in the standard deviation of the arrangement intervals de, the arrangement of the strip portions of the second pattern becomes irregular and thus the scattering effect becomes dominant. Accordingly, strong reflection produced by diffraction becomes less likely to occur. Therefore, the arrangement intervals de of the strip portions of the second pattern are preferably determined depending on the angle at which light spreads due to the scattering effect of light by the strip portions of the first pattern so that the light produced due to diffraction is emitted to an angular range which is substantially the same as the angular range for the above scattered light. For example, when blue reflected light is emitted with a spread within a range of ±40° with respect to the angle of incidence, the arrangement interval de in the pattern of the strip portions of the second pattern is set to have an average in the range of 1 μm or more and 5 μm or less, with a standard deviation of 1 μm or approximately 1 μm. Thus, reflected light due to diffraction is generated in an angular range substantially equal to the angular range to which light is scattered by the strip portions of the first pattern.

Further, in order to ensure diffraction phenomenon of a longer periodicity, a square region with each side of 10 μm or more and 100 μm or less may be used as a unit region, and, in the pattern of the strip portion of the second pattern in each unit region, the average of the arrangement intervals de may be set in the range of 1 μm or more and 5 μm or less, and the standard deviation may be set to 1 μm or approximately 1 μm. In addition, a plurality of unit regions may include a region having a constant arrangement interval de which is in the range of 1 μm or more and 5 μm or less. Even if there is a unit region having a constant arrangement interval de, the same effect as that of the configuration having irregular arrangement intervals de in all the unit regions is expected due to the resolution of the human eye, as long as the arrangement intervals de vary with a standard deviation of approximately 1 μm.

The second pattern 14 shown in FIGS. 4A and 4B has a periodicity associated with the arrangement intervals de only in the first direction. The scattering effect of light by the strip portions of the first pattern mainly acts on the light reflected in the first direction, but can also partially affect the light reflected in the second direction. Accordingly, the strip portions constituting the second pattern 14 may also have a periodicity in the second direction. That is, the second pattern 14 may be a pattern in which a plurality of strip portions extending in the second direction are arranged in each of the first direction and the second direction.

In this second pattern 14, for example, each of the arrangement interval in the first direction and the arrangement interval in the second direction of the strip portions may vary with each average being in the range of 1 μm or more and 100 μm or less. Furthermore, depending on the difference between the influence of the light scattering effect of the strip portions of the first pattern on the first direction and the influence on the second direction, the average of the arrangement intervals in the first direction and the average of the arrangement intervals in the second direction may be different from each other. In addition, the standard deviation of the arrangement intervals in the first direction and the standard deviation of the arrangement intervals in the second direction may be different from each other.

A shown in FIG. 4B, the height h2 of the strip portions 141 to 143 constituting the second pattern 14 may be larger than the surface roughness of the reflective layer 20 and the interference layer 31 on the convex surface (upper surface of the second pattern 14) and the concave surface 15. However, with an increase in the height h2, the diffraction effect due to the strip portions of the second pattern becomes dominant in the effect of the concave-convex structure on the reflected light, and thus the scattering effect of light due to the strip portions of the first pattern becomes less likely to be obtained. Accordingly, the height h2 is preferably the same or approximately the same as the height h1 of the strip portions of the first pattern, and the height h2 may be the equal to the height h1. For example, the height h1 of the strip portion of the first pattern and the height h2 of the strip portion of the second pattern are preferably within the range of 10 nm or more and 200 nm or less. In the color developing structure that exhibits a blue color, the height h1 of the strip portion of the first pattern and the height h2 of the strip portion of the second pattern are preferably within the range of 10 nm or more and 150 nm or less.

The details of the concave-convex structure of the color developing structure having the second structure (multi-stage shape) will be described below.

In the color developing structure having the second structure, as shown in FIG. 2A, a pattern formed by the projected image of the convex portion in the virtual plane is a pattern in which the first pattern 12 and the second pattern 14 are partially overlapped with each other. That is, a region in which the convex portions of the concave-convex structure are located includes a region 16 formed only by the strip portion of the first pattern 12, a region 17 formed only by the strip portion of the second pattern 14, a region 18 in which the strip portion of the first pattern 12 and the strip portion of the second pattern 14 are overlapped with each other, and the concave portion 19. In FIGS. 2A and 2B, the surface of the concave portion 19 is formed of the first surface 11. Further, in FIGS. 2A and 2B, the first pattern 12 and the second pattern 14 are overlapped with each other such that that their ends are aligned with each other in the first direction; however, the configuration is not limited thereto. An end of the first pattern 12 and an end of the second pattern 14 may not be aligned with each other.

As shown in FIG. 2B, a height H1 of the convex portion in the region 16 is the height h1 of the first pattern 12. Further, a height H2 of the convex portion in the region 17 is the height h2 of the second pattern 14. A height H3 of the convex portion in the region 18 is a sum of the height h1 of the first pattern 12 and the height h2 of the second pattern 14. Thus, the strip portions having a predetermined height h1, whose projected image in the virtual plane forms the first pattern 12, and the strip portions having a predetermined height h2, whose projected image in the virtual plane forms the second pattern 14 are overlapped in the height direction to form a multistage shape.

As described above, according to the color developing structure 1 having the convex surfaces of the multi-stage shape, which causes the synergy effect of the light diffusion phenomenon due to the portion formed by the first pattern 12 and light diffraction phenomenon due to the portion formed by the second pattern 14, reflected light of a specific wavelength range can be observed in a wide angular range. Further, since the intensity of the reflected light is increased, glossy and vivid colors are seen. In other words, with a single structure, the color developing structure 1 having the convex surfaces of the multi-stage shape performs both the light diffusion function and the light diffraction function since it has a multi-stage shape.

Further, the first pattern 12 and the second pattern 14 may be arranged so as not to be overlapped with each other in the virtual plane. With this configuration as well, the light diffusion effect and light diffraction effect by the strip portions of the first pattern 12 and the second pattern 14, respectively, can be obtained. However, when the first pattern 12 and the second pattern 14 are arranged so as not to be overlapped with each other, the area in which the first pattern 12 can be positioned per unit area is reduced compared with the first structure, and the light diffusion effect is decreased. Hence, in order to improve the light diffusion effect and light diffraction effect by the strip portions of the first pattern 12 and the second pattern 14, respectively, the first pattern 12 and the second pattern 14 are preferably overlapped with each other as shown in FIGS. 2A and 2B so that the convex portion forms a multistage shape.

[Materials and Methods for Producing Layers of Color Developing Structure]

Materials for each layer that constitutes the color developing structure, and methods for producing the color developing structure, will now be described.

<Concave-Convex Layer>

The concave-convex layer 10 that constitutes the color developing structure is made of a material having optical transparency to light in the visible region, i.e., a material transparent to light in the visible region. Alternatively, the concave-convex layer 10 may be any light absorptive material containing a black pigment or dye. Materials for the concave-convex layer 10 preferably include, but are not limited to, thermoplastic resins, thermosetting resins, and photocurable resin as a main component.

Further, materials for forming the concave-convex layer 10 preferably include composites having a refractive index in the visible light region of 1.4 or more and 3.0 or less, or composites containing an inorganic compound having an extinction coefficient of 2 or more and 6 or less.

Thermoplastic resins that can be used include, but are not limited to, polyolefin, polyester, acrylic, vinyl, polyurethane, fluorine, styrene, polyamide, and urea-based resins. Films and pellets made of resins such as polyethylene, polypropylene, cycloolefin copolymer, polyethylene terephthalate, polycarbonate, polyethylene naphthalate, polymethyl methacrylate, polymethyl acrylate, polyvinyl chloride, polyvinyl acetate, polystyrene, nylon, polyurethane, polytetrafluoroethylene, acrylonitrile butadiene styrene resin, polylactic acid, polyethersulfone, polyether ether ketone, and polyimide can be melted by heat to form a desired concave-convex structure. Thermosetting resins that can be used include, but are not limited to, urethane resins, melamine-based resins, epoxy resins, phenolic resins, and the like obtained by reaction of acrylic polyol or polyester polyol having hydroxyl groups reactive with polyisocyanate.

Examples of photocurable resins include urethane acrylate, epoxy acrylate, polyester acrylate, polyacrylic acrylate, and polydimethylsiloxane. One or more radical polymerization initiators or cationic polymerization initiators may be used for polymerization.

In the present embodiment, a radically polymerizable monomer is preferably a compound having one or more acryloyl groups or methacryloyl groups. Examples of monofunctional (meth)acryl compound having one acryloyl group or methacryloyl group include, but are not limited to, methyl (meth)acrylate, ethyl (meth)acrylate, propyl (meth)acrylate, isopropyl (meth)acrylate, butyl (meth)acrylate, amyl (meth) acrylate, isobutyl (meth)acrylate, t-butyl (meth)acrylate, pentyl (meth)acrylate, isoamyl (meth)acrylate, hexyl (meth) acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth) acrylate, isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth) acrylate, 4-butylcyclohexyl (meth)acrylate, adamantyl (meth)acrylate, methyladamantyl (meth)acrylate, phenoxyethyl (meth)acrylate, phenoxy-2-methylethyl (meth)acrylate, phenoxyethoxyethyl (meth)acrylate, 3-phenoxy-2-hydroxypropyl (meth)acrylate, 2-phenylphenoxyethyl (meth) acrylate, 4-phenylphenoxyethyl (meth)acrylate, 3-(2-phenyl phenyl)-2-hydroxypropyl (meth)acrylate, EO-modified p-cumylphenyl (meth)acrylate, 2-bromophenoxyethyl (meth)acrylate, 2,4-dibromophenoxyethyl (meth)acrylate, 2,4,6-tribromophenoxyethyl (meth)acrylate, EO-modified phenoxy (meth)acrylate, PO-modified phenoxy (meth)acrylate, polyoxyethylene nonylphenyl ether (meth)acrylate, acryloylmorpholine, 2-hydroxyethyl (meth)acrylate, 2-hydroxypropyl (meth)acrylate, 2-hydroxybutyl (meth)acrylate, benzyl (meth)acrylate, tetrahydrofurfuryl (meth)acrylate, butoxyethyl (meth)acrylate, ethoxydiethylene glycol (meth) acrylate, polyethylene glycol mono(meth)acrylate, polypropylene glycol mono(meth)acrylate, methoxy ethylene glycol (meth)acrylate, ethoxyethyl (meth)acrylate, methoxy polyethylene glycol (meth)acrylate, methoxy polypropylene glycol (meth)acrylate, diacetone (meth)acrylamide, isobutoxymethyl (meth)acrylamide, N,N-dimethyl (meth) acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth) acrylamide, and N,N-dimethylaminopropyl (meth)acrylamide.

Examples of polyfunctional (meth)acryl compound having two or more acryloyl groups or methacryloyl groups include, but are not limited to, trimethylolpropane di(meth) acrylate, trimethylolpropane tri(meth)acrylate, EO-modified trimethylolpropane tri(meth)acrylate, PO-modified trimethylolpropane tri(meth)acrylate, EO-, PO-modified trimethylolpropane tri(meth)acrylate, pentaerythritol tri(meth)acrylate, pentaerythritol tetra(meth)acrylate, ethylene glycol di(meth)acrylate, tetraethylene glycol di(meth)acrylate, polyethylene glycol di(meth)acrylate, polypropylene glycol di(meth)acrylate, 1,4-butanediol di(meth)acrylate, 1,6-hexanediol di(meth)acrylate, neopentyl glycol di(meth)acrylate, tris(2-hydroxyethyl) isocyanurate tri(meth)acrylate, tris (acryloyloxy)isocyanurate, bis(hydroxymethyl) tricyclodecane di(meth)acrylate, dipentaerythritol penta(meth)acrylate, dipentaerythritol hexa(meth)acrylate, EO-modified 2,2-bis(4-((meth)acryloxy)phenyl) propane, PO-modified 2,2-bis(4-((meth)acryloxy)phenyl) propane, and EO-, PO-modified 2,2-bis(4-((meth)acryloxy)phenyl) propane.

These radically polymerizable monomers can be used singly or in combination of two or more. Further, in the above description, (meth)acrylate refers to acrylate and/or methacrylate, and (meth)acryloyl group refers to acryloyl group and/or methacryloyl group, EO refers to ethylene oxide, and the EO-modified compound refers to a block structure of an ethylene oxide group. In addition, PO refers to propylene oxide, and the PO-modified compound refers to a block structure of propylene oxide group.

In order to adjust the refractive index, monofunctional or polyfunctional monomer having two or more acryloyl groups or methacryloyl groups having a fluoro group may be added. Examples of these include, but are not limited to, (meth)acrylic compound trifluoroethyl (meth)acrylate, tetrafluoroethyl (meth)acrylate, pentafluoroethyl (meth)acrylate, hexafluoroethyl (meth)acrylate, trifluoropropyl (meth)acrylate, tetrafluoropropyl (meth)acrylate, pentafluoropropyl (meth)acrylate, hexafluoropropyl (meth)acrylate, heptafluoropropyl (meth)acrylate, trifluorobutyl (meth)acrylate, tetrafluorobutyl (meth)acrylate, pentafluorobutyl (meth)acrylate, hexafluorobutyl (meth)acrylate, heptafluorobutyl (meth)acrylate, trifluoropentyl (meth)acrylate, tetrafluoropentyl (meth)acrylate, pentafluoropentyl (meth)acrylate, hexafluoropentyl (meth)acrylate, heptafluoropentyl (meth)acrylate, octafluoropentyl (meth)acrylate, nonafluoropentyl (meth)acrylate, trifluorohexyl (meth)acrylate, tetrafluorohexyl (meth)acrylate, pentafluorohexyl (meth)acrylate, hexafluorohexyl (meth)acrylate, heptafluorohexyl (meth)acrylate, octafluorohexyl (meth)acrylate, nonafluorohexyl (meth)acrylate, decafluorohexyl (meth)acrylate, and undecafluorohexyl (meth)acrylate.

In order to improve dispersibility of the inorganic compounds or in order to improve adhesiveness to the interference layer, a monofunctional monomer having an acryloyl group or methacryloyl group as a dimethyl polysiloxane main chain or silicone main chain, or polyfunctional monomer having two or more of these may be added. The acryloyl group or methacryloyl group may be either single-end type or dual-end type, or may also be a side-chain type. As the molecular weight of the silicone main chain decreases, the solubility in the resin is increased, and, as the molecular weight of the silicone main chain increases, the surface characteristics are improved.

The polymerizable monomer may also be a cationic polymerizable monomer. The cationic polymerizable monomer is preferably a compound having at least one vinyl ether group, epoxy group, or oxetanyl group.

Examples of the compounds having one vinyl ether group include, but are not limited to, methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexyl methyl vinyl ether, 4-methylcyclohexyl methyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexyl methyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Examples of the compounds having two or more vinyl ether groups include, but are not limited to, divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, and bisphenol F alkylene oxide divinyl ether; and polyfunctional vinyl ethers such as trimethylol ethane trivinyl ether, trimethylol propane trivinyl ether, ditrimethylol propane tetravinyl ether, glycerin trivinyl ether, pentaerythritol tetravinyl ether, dipentaerythritol pentavinyl ether, dipentaerythritol hexavinyl ether, ethylene oxide-added trimethylolpropane trivinyl ether, propylene oxide-added trimethylolpropane trivinyl ether, ethylene oxide-added ditrimethylolpropane tetravinyl ether, propylene oxide-added ditrimethylolpropane tetravinyl ether, ethylene oxide-added pentaerythritol tetravinyl ether, propylene oxide-added pentaerythritol tetravinyl ether, ethylene oxide-added dipentaerythritol hexavinyl ether, and propylene oxide-added dipentaerythritol hexavinyl ether.

Examples of the compounds having one epoxy group include, but are not limited to, phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, and 3-vinylcyclohexene oxide.

Examples of the compounds having two or more epoxy groups include, but are not limited to, bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy) cyclohexane-meta-dioxane, bis(3,4-epoxycyclohexylmethyl) adipate, vinylcyclohexene oxide, 4-vinylepoxycyclohexane, bis(3,4-epoxy-6-methylcyclohexylmethyl) adipate, 3,4-epoxy-6-methylcyclohexyl-3',4'-epoxy-6'-methylcyclohexanecarboxylate, methylenebis(3,4-epoxycyclohexane), dicyclopentadiene diepoxide, ethylene glycol di(3,4-epoxycyclohexylmethyl) ether, ethylenebis (3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxyoctane, and 1,2,5,6-diepoxycyclooctane.

Examples of the compounds having one oxetanyl group include, but are not limited to, 3-ethyl-3-hydroxymethyloxetane, 3-(meth)allyloxymethyl-3-ethyloxetane, (3-ethyl-3-oxetanylmethoxy) methylbenzene, 4-fluoro-[1-(3-ethyl-3-oxetanylmethoxy)methyl] benzene, 4-methoxy-[1-(3-ethyl-3-oxetanylmethoxy) methyl] benzene, [1-(3-ethyl-3-oxetanylmethoxy)ethyl]phenyl ether, isobutoxymethyl (3-ethyl-3-oxetanylmethyl) ether, isobornyloxyethyl (3-ethyl-3-oxetanylmethyl) ether, isobornyl (3-ethyl-3-oxetanyl) methyl) ether, 2-ethylhexyl (3-ethyl-3-oxetanylmethyl) ether, ethyldiethylene glycol (3-ethyl-3-oxetanylmethyl) ether, dicyclopentadiene (3-ethyl-3-oxetanylmethyl) ether, dicyclopentenyloxyethyl (3-ethyl-3-oxetanylmethyl) ether, dicyclopentenyl (3-ethyl-3-oxetanylmethyl) ether, tetrahydrofurfuryl (3-ethyl-3-oxetanylmethyl) ether, tetrabromophenyl (3-ethyl-3-oxetanylmethyl) ether, 2-tetrabromophenoxy ethyl (3-ethyl-3-oxetanylmethyl) ether, tribromophenyl (3-ethyl-3-oxetanylmethyl) ether, 2-tribromophenoxyethyl (3-ethyl-3-oxetanylmethyl) ether, 2-hydroxyethyl (3-ethyl-3-oxetanylmethyl) ether, 2-hydroxypropyl (3-ethyl-3-oxetanylmethyl) ether, butoxyethyl (3-ethyl-3-oxetanylmethyl) ether, pentachlorophenyl (3-ethyl-3-oxetanylmethyl) ether, pentabromophenyl (3-ethyl-3-oxetanylmethyl) ether, and bornyl (3-ethyl-3-oxetanylmethyl) ether.

Examples of the compounds having two or more oxetanyl groups include, but are not limited to, polyfunctional oxetane such as EO-modified bisphenol A bis(3-ethyl-3-oxetanylmethyl) ether, PO-modified bisphenol A bis(3-ethyl-3-oxetanylmethyl) ether, EO-modified hydrogenated bisphenol A bis(3-ethyl-3-oxetanylmethyl) ether, PO-modified hydrogenated bisphenol A bis(3-ethyl-3-oxetanylmethyl) ether, EO-modified bisphenol F (3-ethyl-3-oxetanylmethyl) ether, 3,7-bis(3-oxetanyl)-5-oxa-nonane, 3,3'-(1,3-(2-methylenyl) propanediylbis (oxymethylene)) bis-(3-ethyloxetane), 1,4-bis[(3-ethyl-3-oxetanylmethoxy)methyl] benzen, 1,2-bis [(3-ethyl-3-oxetanylmethoxy)methyl] ethane, 1,3-bis [(3-ethyl-3-oxetanylmethoxy)methyl] propane, ethylene glycol bis(3-ethyl-3-oxetanylmethyl) ether, dicyclopentenyl bis(3-ethyl-3-oxetanylmethyl) ether, triethylene glycol bis(3-ethyl-3-oxetanylmethyl) ether, tetraethylene glycol bis (3-ethyl-3-oxetanyl)methyl) ether, tricyclodecanediyldimethylene (3-ethyl-3-oxetanylmethyl) ether, trimethylolpropane tris(3-ethyl-3-oxetanylmethyl) ether, 1,4-bis(3-ethyl-3-oxetanylmethoxy) butane, 1,6-bis(3-ethyl-3-oxetanylmethoxy) hexane, pentaerythritol tris(3-ethyl-3-oxetanylmethyl) ether, pentaerythritol tetrakis (3-ethyl-3-oxetanylmethyl) ether, polyethylene glycol bis(3-ethyl-3-oxetanylmethyl) ether, dipentaerythritol hexakis (3-ethyl-3-oxetanylmethyl) ether, dipentaerythritol pentakis (3-ethyl-3-oxetanylmethyl) ether, dipentaerythritol tetrakis (3-ethyl-3-oxetanylmethyl) ether, caprolactone-modified dipentaerythritol hexakis (3-ethyl-3-oxetanylmethyl) ether, caprolactone-modified dipentaerythritol pentakis (3-ethyl-3-oxetanylmethyl) ether, and ditrimethylol tetrakis (3-ethyl-3-oxetanylmethyl) ether.

These cationic polymerizable monomers can be used singly or in combination of two or more. In the above description, EO refers to ethylene oxide, and EO-modified compound refers to a block structure of an ethylene oxide group. In addition, PO refers to propylene oxide, and the PO-modified compound refers to a block structure of propylene oxide group. Further, hydrogenation refers to adding a hydrogen atom to a C=C double bond such as in a benzene ring.

When the polymerizable monomer is a radical polymerizable monomer, the polymerization initiator is that of generating radicals by light (radiation such as infrared rays, visible rays, ultraviolet rays, far ultraviolet rays, charged particle beams such as X-rays and electron beams). When the polymerizable monomer is a cationic polymerizable monomer, the polymerization initiator is that of generating an acid by light.

Examples of the compounds used as the radical generator include, but are not limited to, 2,4,5-triarylimidazole dimer that can be substituted such as 2-(o-chlorophenyl)-4,5-diphenylimidazole dimer, 2-(o-chlorophenyl)-4,5-di(methoxyphenyl) imidazole dimer, 2-(o-fluorophenyl)-4,5-diphenylimidazole dimer, and 2-(o- or p-methoxyphenyl)-4,5-diphenylimidazole dimer; benzophenone derivatives such as benzophenone, N,N'-tetramethyl-4,4'-diaminobenzophenone (Michler's ketone), N,N'-tetraethyl-4,4'-diaminobenzophenone, 4-methoxy-4'-dimethylaminobenzophenone, 4-chlorobenzophenone, 4,4'-dimethoxybenzophen, and 4,4'-diaminobenzophenone; aromatic ketone derivative such as 2-benzyl-2-dimethylamino-1-(4-morpholinophenyl)-butanone-1,2-methyl-1-[4-(methylthio) phenyl]-2-morpholino-propanone-1-one; quinones such as 2-ethylanthraquinone, phenanthrenequinone, 2-t-butylanthraquinone, octamethylanthraquinone, 1,2-benzanthraquinone, 2,3-benzanthraquinone 2-phenylanthraquinone, 2,3-diphenylanthraquinone, 1-chloroanthraquinone, 2-methylanthraquinone, 1,4-naphthoquinone, 9,10-phenantharaquinone, 2-methyl-1,4-naphthoquinone, and 2,3-dimethylanthraquinone; benzoin ether derivatives such as benzoin methyl ether, benzoin ethyl ether, and benzoin phenyl ether; benzoin derivatives such as benzoin, methyl benzoin, ethyl benzoin, and propyl benzoin; benzyl derivatives such as benzyl dimethyl ketal; acridine derivatives such as 9-phenylacridine, and 1,7-bis(9,9'-acridinyl) heptane; N-phenylglycine derivatives such as N-phenylglycine; acetophenone derivatives such as acetophenone, 3-methylacetophenone, acetophenone benzyl ketal, 1-hydroxycyclohexyl phenyl ketone, and 2,2-dimethoxy-2-phenylacetophenone; thioxanthone derivatives such as thioxanthone, diethylthioxanthone, 2-isopropylthioxanthone, and 2-chloro thioxanthone; xanthone, fluorenone, benzaldehyde, fluorene, anthraquinone, triphenylamine, carbazole, 1-(4-isopropylphenyl)-2-hydroxy-2-methylpropan-1-one, 2-hydroxy-2-methyl-1-phenylpropan-1-one, 2,4,6-trimethylbenzoyldiphenylphosphine oxide, and bis-(2,6-dimethoxybenzoyl)-2,4,4-trimethylpentylphosphine oxide. These can be used singly or in combination of two or more.

Examples of the compounds used as a polymerization initiator that generates an acid by light include, but are not limited to, onium salt compounds, sulfone compounds, sulfonate ester compounds, sulfonimide compounds, and diazomethane compounds.

Examples of the onium salt compounds include iodonium salts, sulfonium salts, phosphonium salts, diazonium salts, ammonium salts, pyridinium salts, and the like. Specific examples of the onium salt compounds include, but are not limited to, bis(4-t-butylphenyl) iodonium perfluoro-n-butanesulfonate, bis(4-t-butylphenyl) iodonium trifluoromethanesulfonate, bis(4-t-butylphenyl) iodonium 2-trifluoromethylbenzenesulfonate, bis(4-tert-butylphenyl) iodonium pyrenesulfonate, bis(4-tert-butylphenyl) iodonium n-dodecylbenzenesulfonate, bis(4-tert-butylphenyl) iodonium p-toluene sulfonate, bis(4-tert-butylphenyl) iodonium benzene sulfonate, bis(4-tert-butylphenyl) iodonium 10-camphor sulfonate, bis(4-tert-butylphenyl) iodonium n-octane sulfonate, diphenyliodonium perfluoro-n-butanesulfonate, diphenyliodonium trifluoromethanesulfonate, diphenyliodonium 2-trifluoromethylbenzenesulfonate, diphenyliodonium pyrenesulfonate, diphenyliodonium n-dodecylbenzenesulfonate, diphenyliodonium p-toluenesulfonate, diphenyl iodonium benzenesulfonate, diphenyliodonium 10-camphorsulfonate, diphenyliodonium n-octanesulfonate, triphenylsulfonium perfluoro-n-butanesulfonate, triphenylsulfonium trifluoromethanesulfonate, triphenylsulfonium 2-trifluoromethylbenzenesulfonate, triphenylsulfonium pyrenesulfonate, triphenylsulfonium n-dodecylbenzenesulfonate, triphenylsulfonium p-toluenesulfonate, triphenylsulfoniumbenzenesulfonate, triphenylsulfonium 10-camphorsulfonate, triphenylsulfonium n-octanesulfonate, diphenyl(4-t-butylphenyl) sulfonium perfluoro-n-butanesulfonate, diphenyl(4-t-butylphenyl) sulfonium trifluoromethanesulfonate, diphenyl (4-t-butylphenyl) sulfonium 2-trifluoromethylbenzenesulfonate, diphenyl(4-t-butylphenyl) sulfonium pyrenesulfonate, diphenyl(4-t-butylphenyl) sulfonium n-dodecylbenzenesulfonate, diphenyl(4-t-butylphenyl) sulfonium p-toluenesulfonate, diphenyl(4-t-butylphenyl) sulfoniumbenzenesulfonate, diphenyl(4-t-butylphenyl) sulfonium 10-camphor sulfonate, diphenyl(4-t-butylphenyl) sulfonium n-octanesulfonate, tris (4-methoxyphenyl) sulfonium perfluoro-n-butanesulfonate, tris(4-methoxyphenyl) sulfonium trifluoromethanesulfonate, tris(4-methoxyphenyl) sulfonium 2-trifluoromethylbenzenesulfonate, tris(4-methoxyphenyl) sulfonium pyrenesulfonate, tris(4-methoxyphenyl) sulfonium n-dodecylbenzenesulfonate, tris(4-methoxyphenyl) sulfonium p-toluenesulfonate, tris(4-methoxyphenyl) sulfoniumbenzenesulfonate, tris(4-methoxyphenyl) sulfonium 10-camphorsulfonate, and tris(4-methoxyphenyl) sulfonium n-octane sulfonate.

Examples of the sulfone compounds include β-ketosulfone, β-sulfonylsulfone, α-diazo compounds thereof, and the like. Specific examples of the sulfone compounds include, but are not limited to, phenacylphenylsulfone, mesitylphenacylsulfone, bis(phenylsulfonyl) methane, and 4-trisphenacylsulfone.

Examples of the sulfonate ester compounds include alkyl sulfonate esters, haloalkyl sulfonate esters, aryl sulfonate esters, imino sulfonates, and the like. Specific examples of the sulfonate ester compounds include, but are not limited to, α-methylol benzoin perfluoro-n-butane sulfonate, α-methylol benzoin trifluoromethane sulfonate, and α-methylol benzoin 2-trifluoromethylbenzene sulfonate.

Specific examples of the sulfonimide compounds include, but are not limited to, N-(trifluoromethylsulfonyloxy) succinimide, N-(trifluoromethylsulfonyloxy) phthalimide, N-(trifluoromethylsulfonyloxy) diphenylmaleimide, N-(trifluoromethylsulfonyloxy) bicyclo[2.2.1]hept-5-ene-2,3-dicarboximide, N-(trifluoromethylsulfonyloxy)-7-oxabicyclo [2.2.1] hept-5-ene-2,3-dicarboximide, N-(trifluoromethylsulfonyloxy) bicyclo [2.2.1] heptane-5,6-oxy-2,3-dicarboximide, N-(trifluoromethylsulfonyloxy) naphthylimide, N-(10-camphorsulfonyloxy) succinimide, N-(10-camphorsulfonyloxy) phthalimide, N-(10-camphorsulfonyloxy) diphenylmaleimide, N-(10-camphorsulfonyloxy) bicyclo[2.2.1] hept-5-ene-2, 3-dicarboximide, N-(10-camphorsulfonyloxy)-7-oxabicyclo [2.2.1] hept-5-ene-2,3-dicarboximide, N-(10-camphorsulfonyloxy) bicyclo[2.2.1] heptane-5,6-oxy-2,3-dicarboximide, N-(10-camphorsulfonyloxy) naphthylimide, N-(4-methylphenylsulfonyloxy) succinimide, N-(4-methylphenylsulfonyloxy) phthalimide, N-(4-methylphenylsulfonyloxy) diphenylmaleimide, N-(4-methylphenylsulfonyloxy) bicyclo[2.2.1] hept-5-ene-2,3-dicarboximide, N-(4-methylphenylsulfonyloxy)-7-oxabicyclo [2.2.1] hept-5-ene-2,3-dicarboximide, N-(4-methylphenylsulfonyloxy) bicyclo[2.2.1] heptane-5,6-oxy-2,3-dicarboximide, N-(4-methylphenylsulfonyloxy) naphthylimide, N-(2-trifluoromethylphenylsulfonyloxy) succinimide, N-(2-trifluoromethylphenylsulfonyloxy) phthalimide, N-(2-trifluoromethylphenylsulfonyloxy) diphenylmaleimide, N-(2-trifluoromethylphenylsulfonyloxy) bicyclo[2.2.1] hept-5-ene-2,3-dicarboximide, N-(2-trifluoromethylphenylsulfonyloxy)-7-oxabicyclo[2.2.1] hept-5-ene-2,3-dicarboximide, N-(2-trifluoromethylphenylsulfonyloxy) bicyclo[2.2.1] heptane-5,6-oxy-2,3-dicarboximide, N-(2-trifluoromethylphenylsulfonyloxy) naphthylimide, N-(4-fluorophenylsulfonyloxy) succinimide, N-(4-fluorophenyl) phthalimide, N-(4-fluorophenylsulfonyloxy) diphenylmaleimide, N-(4-fluorophenylsulfonyloxy) bicyclo[2.2.1]hept-5-ene-2,3-dicarboximide, N-(4-fluorophenylsulfonyloxy)-7-oxabicyclo[2.2.1] hept-5-ene-2,3-dicarboximide, N-(4-fluorophenylsulfonyloxy) bicyclo[2.2.1] heptane-5,6-oxy-2, 3-dicarboximide, and N-(4-fluorophenylsulfonyloxy) naphthylimide.

Specific examples of the diazomethane compounds include, but are not limited to, bis(trifluoromethylsulfonyl) diazomethane, bis(cyclohexylsulfonyl) diazomethane, bis (phenylsulfonyl) diazomethane, bis(p-toluenesulfonyl) diazomethane, methylsulfonyl p-toluenesulfonyldiazomethane, (cyclohexylsulfonyl) (1,1-dimethylethylsulfonyl) diazomethane, and bis(1,1-dimethylethylsulfonyl) diazomethane.

The polymerization initiator that generates an acid with light can be used singly or in combination of two or more.

In order to adjust to a desired refractive index, the following inorganic compounds may be added in addition to the main component resin. Although not limited, one or more of $Nb_2O_5$, $Ta_2O_5$, $Al_2O_3$, $Fe_2O_3$, $HfO_2$, MgO, ZrO, $Zr_2O$, $SnO_2$, $Sb_2O_3$, $Sb_2O_5$, $CeO_3$, $WO_3$, PbO, $In_2O_3$, CdO, $BaTiO_3$, LiF, $BaF_2$, $CaF_2$, $MgF_2$, $AlF_3$, $CeF_3$, ZnS, $PbCl_2$, TO, PTO, ATO, ITO, and the like can be used.

The particle size of these is preferably in the range of 5 nm or more and 100 nm or less. In order to produce a desired concave-convex structure, the particle size is preferably in the range of 5 nm or more and 30 nm or less. Further, in order to achieve uniform dispersion without aggregation, a dispersant may be added to the concave-convex layer 10.

<Substrate>

The substrate 9 may be made of a material having optical transparency to light in the visible region, or light absorptive material containing a black pigment or dye. Examples of the material for forming the substrate 9 include, but are not limited to, polyolefin, polyester, acrylic, vinyl, polyurethane, fluorine, styrene, polyamide, and urea-based resins. Films made of resins such as polyethylene, polypropylene, cycloolefin copolymer, polyethylene terephthalate, polycarbonate, polyethylene naphthalate, polymethyl methacrylate, polymethyl acrylate, polyvinyl chloride, polyvinyl acetate, polystyrene, nylon, polyurethane, polytetrafluoroethylene, acrylonitrile butadiene styrene resin, polylactic acid, polyethersulfone, polyether ether ketone, polyimide, and triacetylcellulose can be used as the substrate. In order to increase the adhesion between the substrate and the concavo-convex layer, those having a surface treatment such as corona treatment, plasma treatment, ozone treatment, or easy adhesion treatment can be used.

The concavo-convex structure is formed on the surface of a relatively hard substrate such as synthetic quartz or silicon wafer, for example, by using a known microprocessing technique such as lithography or dry etching by irradiating light or charged particle beam.

<Reflective Layer>

The material for forming the reflective layer 20 is not specifically limited as long as it is a compound that reflects incident light, and is preferably a metal or metal alloy. Using a metal, metal alloy, or composite enables to produce colors without laminating tens of layers. The material for forming the reflective layer 20 is preferably a metal or metal alloy having a refractive index of 0.2 or more and 3 or less. When such a material is adopted, strong specular reflected light and scattered light are obtained when light is incident on the concave-convex structure. Further, since the reflective layer 20 can reduce light absorption, the extinction coefficient is preferably 2 or more and 6 or less. Specifically, the reflective layer 20 is made of a material including one or more metals, or alloys or composites thereof. Examples of the metal include Au, Ag, Cu, Al, Zn, Ni, Cr, Ge, Mo, Ga, Ta, W, In, and Sn. When such a material is used, the brightness of light reflected by the reflective layer increases. More preferably, the metal is Au, Ag, Cu, or Al.

<Interference Layer>

When the interference layer 31 is formed of a single layer, the interference layer 31 is preferably made of a material having a high refractive index. The interference layer 31 is more preferably made of a compound having a refractive index of 1.5 or more and 5.0 or less and an extinction coefficient of 2 or more and 6 or less. Further, the material for forming the interference layer 31 preferably includes compounds having a refractive index difference of 0.2 or more and 0.8 or less relative to the concave-convex layer.

When the interference layer is a multilayer, the high refractive index layers 31a and the low refractive index layers 31b are alternately laminated to achieve multilayer film interference. The order of the high refractive index layer 31a and the low refractive index layer 31b may be changed. The number of laminated layers can be reduced as long as the function is achieved. Both the high refractive index layer and the low refractive index layer are made of materials having optical transparency to light in the visible region. That is, the interference layer 31 is made of a material that is transparent to light in the visible region.

The materials of these layers are not limited as long as the refractive index of the high refractive index layer 31a is higher than the refractive index of the low refractive index layer 31b. When the difference in refractive indices between the high refractive index layer 31a and the low refractive index layer 31b is in the range of 0.6 or more and 1.5 or less, high intensity reflected light can be obtained with a small number of laminated layers. Further, when a compound having a refractive index of 1.5 or more and 5.0 or less is provided as a high refractive index layer at the interface between the high refractive index layer and the air, the phase is reversed when light is incident on the interference layer from the air, and a strong interference effect is achieved.

Examples of the compound used for the interference layer include inorganic-organic hybrid materials in which an inorganic material is dispersed in an inorganic dielectric material or an organic resin material. Examples of the inorganic dielectric material include $Nb_2O_5$, $Ta_2O_5$, $Al_2O_3$, $Fe_2O_3$, $HfO_2$, MgO, ZrO, $Zr_2O$, $SnO_2$, $Sb_2O_3$, $Sb_2O_5$, $CeO_3$, $WO_3$, PbO, $In_2O_3$, CdO, $BaTiO_3$, LiF, $BaF_2$, $CaF_2$, $MgF_2$, $AlF_3$, $CeF_3$, ZnS, $PbCl_2$, TO, PTO, ATO, and ITO. Examples of the inorganic-organic hybrid material in which an inorganic material is dispersed in an organic resin material include materials in which an inorganic material is dispersed in an organic resin material such as acrylic resin, phenolic resin, epoxy resin, and urethane resin.

More preferably, the high refractive index layer includes $TiO_2$, and the low refractive index layer includes $SiO_2$.

The high refractive index layers 31a located on both sides of the low refractive index layer 31b may be made of the same material or different compounds.

The high refractive index layer 31a and the low refractive index layer 31b made of an inorganic material are each formed, for example, using a known thin film formation technique such as sputtering, vacuum deposition, or an atomic layer deposition method. Moreover, when each of the high refractive index layer 31a and the low refractive index layer 31b are made of an organic material, a known technique such as self-organization may be used to form the high refractive index layer 31a and the low refractive index layer 31b.

The film thickness of the high refractive index layer 31a and the low refractive index layer 31b may be designed using a transfer matrix method or the like depending on a desired color to be developed by the color developing structure. The film thickness of the high refractive index layer and low refractive index layer is preferably in the range of 30 nm or more and 300 nm or less.

FIGS. 6 and 8 illustrate an example of the interference layer 31 composed of three layers in which the high refractive index layer 31a and the low refractive index layer 31b are alternately laminated as the interference layer 31 in this order from a position adjacent to the concave-convex layer 10. However, the number of layers included in the interference layer 31 and the order of lamination are not limited thereto. The interference layer 31 of the multilayer structure may be configured such that layers adjacent to each other have refractive indices that are different from each other, and the reflectance to light in a specific wavelength range of the incident light entering the interference layer 31 is higher than the reflectance in other wavelength ranges.

In addition, the material for forming the interference layer is not limited to these materials described above. When the material includes one or more of a titanium compound, niobium compound, and silicon compound, the interference layer also functions as a protective layer for protecting the reflective layer. Therefore, the interference layer has improved scratch resistance. Since the interference layer is a thin film layer that follows the fine concave-convex structure, dirt attached to the layer can be easily wiped off. Therefore, the interference layer preferably has an antifouling effect. In addition, when a multilayer film is applied to the interference layer, a layer on the multilayer film on a side facing away from the reflective layer is preferably provided as the protective layer described above.

Since the concave-convex layer 10 is made of a material transparent to light in the visible region, among the wavelength range included in the incident light, part of the light in the wavelength range other than the specific wavelength range reflected on the interference layer 31 is transmitted through the interference layer 31 and also through the concave-convex layer 10. Accordingly, when the concave-convex layer 10 is observed from one of the front and rear sides and a light source or a structure such as a white board that reflects the transmitted light exists on the other side of the concave-convex layer 10, reflected light of a specific wavelength range from the reflective layer 20 is seen on one side in addition to the light that has been transmitted through the reflective layer 20 from the other side. As described above, the wavelength range of the transmitted light is different from the wavelength range of the reflected light, and color of the transmitted light is typically a complementary color of the reflected light. Therefore, when such transmitted light is seen, the visibility of the color of the reflected light is reduced.

The concave-convex structure of the concave-convex layer 10 is fabricated, for example, by nanoimprinting. For example, in production of the concave-convex structure of the concave-convex layer 10 by photo-nanoimprinting, a photocurable resin as a resin for constituting the concave-convex layer 10 is applied to a surface of a mold on which a concave-convex shape is formed. The mold is an intaglio plate having a reversed concave-convex shape of the concave-convex shape to be formed. Methods for applying a photocurable resin are not specifically limited, and known application methods such as ink jetting, spraying, bar coating, roll coating, slit coating, gravure coating, and the like may be used.

Then, the substrate 9 is superimposed on the surface of the application layer made of the photocurable resin, and the application layer and the mold, which are pressed against each other, are irradiated with light through the substrate 9 or the mold. Subsequently, the cured photocurable resin and the substrate 9 are removed from the mold. Thus, the concave-convex shape of the mold is transferred to the photocurable resin to thereby form the concave-convex layer 10 having the concave-convex shape on the surface thereof. The mold is made of, for example, synthetic quartz or silicon, and is formed using a known microprocessing technique such as lithography or dry etching by irradiating light or charged particle beam.

In addition, the photocurable resin may be irradiated with light while it is applied to the surface of the substrate 9 and the mold is pressed against the application layer of the substrate 9.

Further, thermal nanoimprinting may be used in place of the photo-nanoimprinting. In this case, a resin according to the fabrication method, such as a thermoplastic resin, a thermosetting resin, or the like, is used as a resin used for the concave-convex layer having the concave-convex structure.

Second Embodiment

Next, a second embodiment will now be described.

The second embodiment is an example in which the functional layer is formed as an antireflection layer.

The description of the second embodiment follows.

Further, elements denoted by the same reference signs have the same configuration and are made of the same material as that of the first embodiment.

[Color Developing Structure]

A color developing structure of the second embodiment includes a concave-convex layer, an interference layer, and an antireflection layer. The interference layer is formed to follow the surface shape of the concave-convex layer of the concave-convex structure. The antireflection layer is disposed on the second surface of the concave-convex layer.

Figure 15:
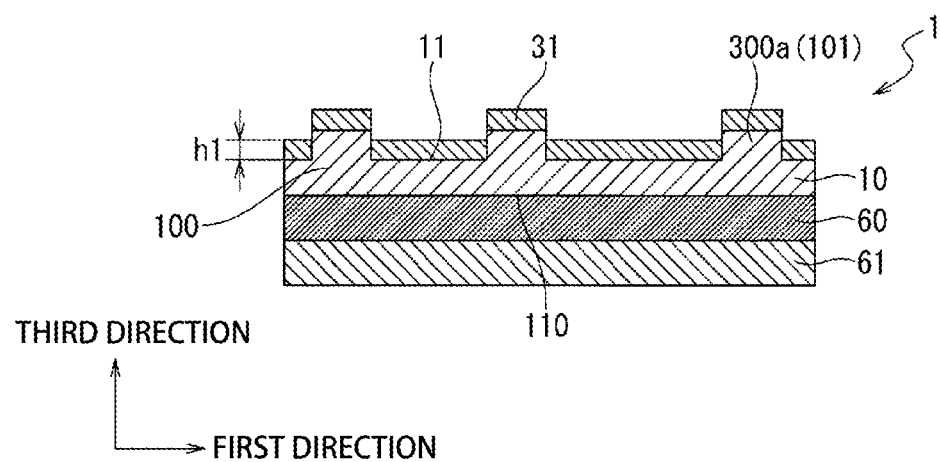
FIG. 15 is a cross-sectional view illustrating an example of a color developing structure according to a second embodiment.

As shown in FIG. 15, the color developing structure 1 of the second embodiment includes a substrate 60, the concave-convex layer 10 provided on one surface of the substrate 60, the concave-convex layer 10 having a plurality of concave-convex structure and transmitting light in the visible region, an antireflection layer 61, and the interference layer 31 that produces interference. The antireflection layer 61 is provided on a surface of the substrate 60 on a side opposite to that on which the concave-convex layer 10 is formed. The antireflection layer 61 absorbs at least part of the light transmitted through the interference layer 31. The interference layer 31 has a surface shape that follows the concave-convex structure 101 of the concave-convex layer 10. That is, in cross-sectional view, the interference layer 31 is formed on the upper surface of the concave portion and the upper surface of the convex portion of the concave-convex layer 10.

Either a first form or a second form, described later, can be applied to the concave-convex structure (hereinafter, also referred to as a first concave-convex structure) of the concave-convex layer 10. The shape of the concave-convex structure of the concave-convex layer 10 is not limited to these forms. In addition, either the first form or the second form, described later, can also be applied to the antireflection layer 61. These will be described in connection with the specific drawings.

In the present embodiment, the concave-convex structure 101 is provided by forming a convex structure on the upper surface of the flat region 100. The concave-convex structure can also be provided by forming a concave structure on the upper surface of the flat region 100. The same applies to other embodiments.

Here, a portion of the upper surface (first surface 11) of the flat region 100 where the convex structure is not formed also constitutes part of the concave-convex surface of the concave-convex structure. The same applies to other embodiments.

The width direction of the color developing structure 1 is referred to as a first direction, the depth direction is referred to as a second direction, and the thickness direction is referred to as a third direction. The first direction and the second direction are in a virtual plane projected in the third direction. The first direction is perpendicular to the second direction, and the first direction is perpendicular to the third direction. In the following description, a side of the color developing structure 1 on which the interference layer 31 is located is also referred to as a front surface (or first surface 11), while a side on which the antireflection layer 61 is located is also referred to as a rear surface (or second surface 110).

<First Form of Concave-Convex Structure of Concave-Convex Layer>

The details of the concave-convex structure of the concave-convex layer 10 will now be described.

Materials and basic configuration of the concave-convex layer 10 may be the same as those of the concave-convex layer of the first embodiment.

When a photocurable resin is used as a material for the concave-convex layer 10, layers from the concave-convex layer 10 to the antireflection layer 61 can be made of a single material. The concave-convex layer 10 preferably has a refractive index in the range of 1.3 or more and 1.5 or less.

First, as an example of the concave-convex layer 10, a pattern formed of the shapes of convex portions 300*a* constituting the concave-convex structure 101 in plan view will be described. The pattern is a first pattern 201, which is formed of a first strip shape.

Figure 16A:
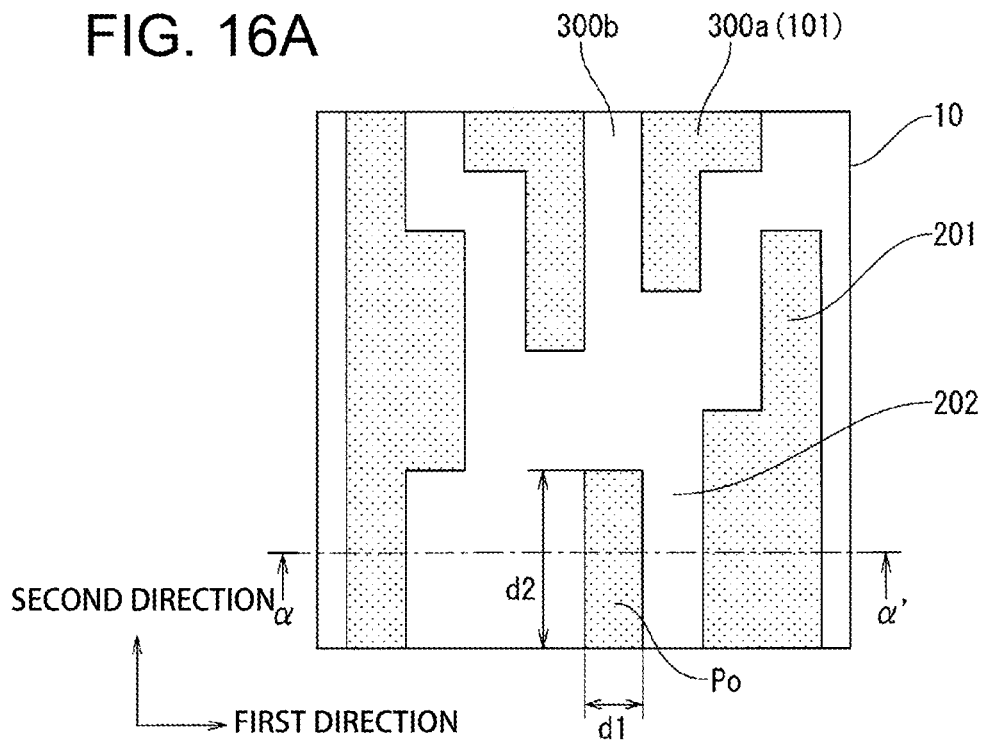
Figure 16B:
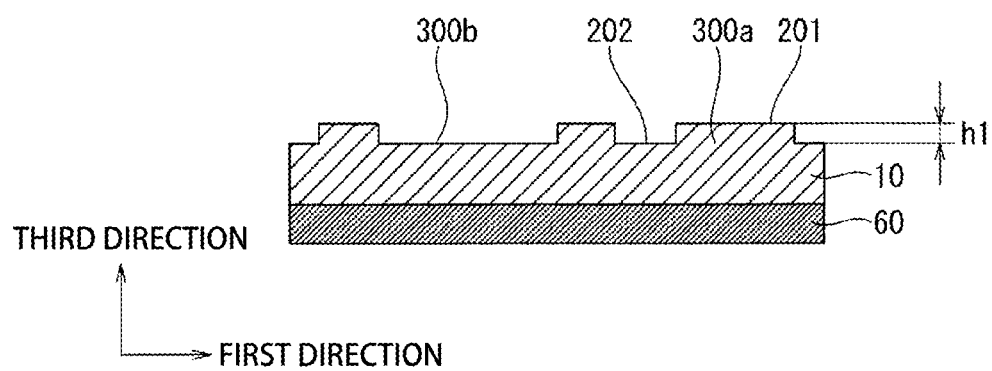

FIGS. 16A and 16B are schematic views illustrating an example of the concave-convex layer 10, in which the pattern formed of the convex portions 300*a* is the first pattern 201. In FIGS. 16A and 16B, for simplicity of illustration, the antireflection layer 61 and the interference layer 31 are omitted.

FIG. 16A is a plan view of the color developing structure 1 shown in FIG. 15 as viewed in a direction facing the interference layer 31. FIG. 16B is a cross-sectional view of the cross-sectional structure of the concave-convex layer 10 shown in FIG. 16A taken along the line α-α'. As shown in FIG. 16A, the concave-convex structure of the concave-convex layer 10 is formed of a plurality of convex portions 300*a* having a strip shape extending in the second direction with irregular length. As shown in FIG. 16B, the concave-convex structure 101 of the concave-convex layer 10 is formed of a plurality of convex portions 300*a* and a plurality of concave portions 300*b*, which are regions where the convex portions 300*a* are not formed. The convex portion 300*a* is raised from the concave portion 300*b*.

The first pattern 201, which is a pattern of the convex portions 300*a* in plan view, has a shape extending in the second direction. The length d2 in the second direction is equal to or greater than the length d1 in the first direction. The plurality of first patterns 201 are arranged so as not to be overlapped with each other in either the first direction or the second direction.

In plan view shown in FIG. 16A, the first pattern 201 is formed by combining a plurality of a preset strip patterns Po.

In the strip patterns Po, the length d1 in the first direction (i.e., width of the strip pattern) is constant. The strip patterns Po are arranged in the first direction at arrangement intervals of the length d1, that is, a periodicity of the length d1.

On the other hand, in the strip patterns Po, the length d2 in the second direction (i.e., length of the strip pattern) is not constant. The length d2 of the respective strip patterns Po constituting the first pattern 201 of the convex portions 300*a* constituting the concave-convex layer 10 is a value selected from a population having a predetermined standard deviation. This population preferably follows a normal distribution. The arrangement pattern of the strip patterns Po constituting the first pattern 201 of all the convex portions 300a constituting the concave-convex layer 10 is determined, for example, in a manner described below. That is, the plurality of strip patterns Po having the length d2 distributed with a predetermined standard deviation are temporarily spread in a predetermined region, and whether the respective strip patterns Po should be actually fixed or not at these locations is determined according to a predetermined probability. By determining the regions in which the strip patterns Po are positioned and the regions in which the strip patterns Po are not positioned, the strip patterns Po are determined. In order to efficiently scatter the reflected light from the color developing structure 1, the length d2 preferably has an average of 4.15 μm or less and distribution with standard deviation of 1 μm or less.

The region in which the strip pattern Po is positioned is a region provided as the first pattern 201, that is, the region in which the convex portion 300a is positioned. When the adjacent strip patterns Po are in contact with each other, the convex portions 300a are arranged such that the adjacent regions in which the strip patterns Po are located is combined to form one first pattern 201. In this configuration, the length of the first pattern 201 in the first direction is an integral multiple of the length d1 of the strip pattern Po.

In order to prevent occurrence of a rainbow spectrum due to the shape of the concave-convex structure, the length d1 of the strip pattern Po in the first direction is set to be equal to or less than the wavelength of light in the visible region. In other words, the length d1 of the strip pattern Po is subwavelength, i.e., a length equal to or less than the wavelength range of incident light. That is, the length d1 is preferably 830 nm or less, and more preferably 700 nm or less. Further, the length d1 is preferably smaller than the peak wavelength of reflected light of the specific wavelength range. For example, when the color developing structure 1 is intended to develop a blue color, the length d1 is preferably approximately 300 nm. When the color developing structure 1 is intended to develop a green color, the length d1 is preferably approximately 400 nm. When the color developing structure 1 is intended to develop a red color, the length d1 is preferably approximately 460 nm. The term "specific wavelength range" as described herein refers to a wavelength range set in advance as the wavelength range of light intended to be seen by an observer.

In order to increase the spread of light reflected by the color developing structure 1, that is, to enhance the scattering effect of the reflected light, the concave-convex structure preferably has many asperities. Further, in order to enhance the scattering effect of the reflected light, the ratio of the area occupied by the first pattern 201 per unit area in plan view is preferably in the range of 40% or more and 60% or less. For example, the ratio of the area of the convex portions 300a to the area of the concave portions 300b per unit area in plan view is preferably 1:1. In plan view, the area of the first pattern 201 per unit area is the area of the convex portions 300a, whereas the area of the region 202, which is the region other than the first pattern 201, is the area of the concave portions 300b.

As shown in FIG. 16B, the height h1 of the convex portions 300a is constant. The height h1 can be set according to the color desired to be exhibited by the color developing structure 1. That is, the height h1 can be set depending on the wavelength range of light desired to be reflected from the color developing structure 1. A scattering effect of reflected light is obtained when the height h1 of the convex portion 300a is larger than the surface roughness of the upper surface of the convex portion 300a and the surface roughness of the upper surface of the concave portion 300b. The heights h1 that are different among the plurality of convex portions 300a in the concave-convex layer 10 enhance the scattered light, but reduce the reflected light and thus decrease the visible contrast of colors. Accordingly, the height h1 of the convex portions 300a is preferably constant.

However, in order to suppress the interference of light caused by reflection on the concave-convex structure on the surface of the convex portions 300a, the height h1 is preferably equal to or less than ½ of the wavelength of light in the visible region. That is, the height h1 is preferably 415 nm or less. Furthermore, in order to suppress the interference of light caused by reflection on the concave-convex structure, the height h1 is more preferably equal to or less than ½ of the peak wavelength of light of the specific wavelength range reflected by the interference layer 31.

Moreover, if the height h1 is excessively large, the scattering effect of the reflected light increases too much, and the intensity of the reflected light tends to be low. Accordingly, when the reflected light is light in the visible region, the height h1 is preferably 10 nm or more and 200 nm or less. For example, in the color developing structure 1 that exhibits a blue color, the height h1 is preferably approximately 40 nm or more and 150 nm or less in order to obtain effective light spreading. The height h1 is preferably approximately 100 nm or less in order to suppress the scattering effect from increasing too much.

In addition, the first pattern 201 can also be arranged in a manner such that two adjacent strip patterns Po arranged in the first direction are partially overlapped. That is, the plurality of strip patterns Po may be arranged in the first direction at arrangement intervals smaller than the length d1, and the arrangement intervals of the strip patterns Po in the first direction may not be necessarily constant. When the strip patterns Po are overlapped with each other, the overlapped strip patterns Po are combined to form one region. Such a region is regarded as one first pattern 201. In this case, the length of the first pattern 201 in the first direction is different from an integral multiple of the length d1 of the strip pattern Po. Further, the length d1 of the strip pattern Po may not be necessarily constant. In each strip pattern Po, the length d2 in the second direction may be equal to or greater than the length d1 in the first direction, and the standard deviation of the length d2 of the plurality of strip patterns Po may be larger than the standard deviation of the length d1. With this configuration as well, the scattering effect of the reflected light can be obtained. The cross section of the strip pattern Po may not be necessarily a rectangular shape, and may also be an ellipse or a circle with rounded corners of the strip shape.

<Second Form of Concave-Convex Structure of Concave-Convex Layer>

Next, a concave-convex layer formed of a pattern that includes a plurality of first patterns 201 described above and second patterns 211 having a second strip shape will be described. That is, the following description will be given of the concave-convex layer 10 that includes a convex portion 301a having a concave-convex structure of a multi-stage shape.

Figure 17A:
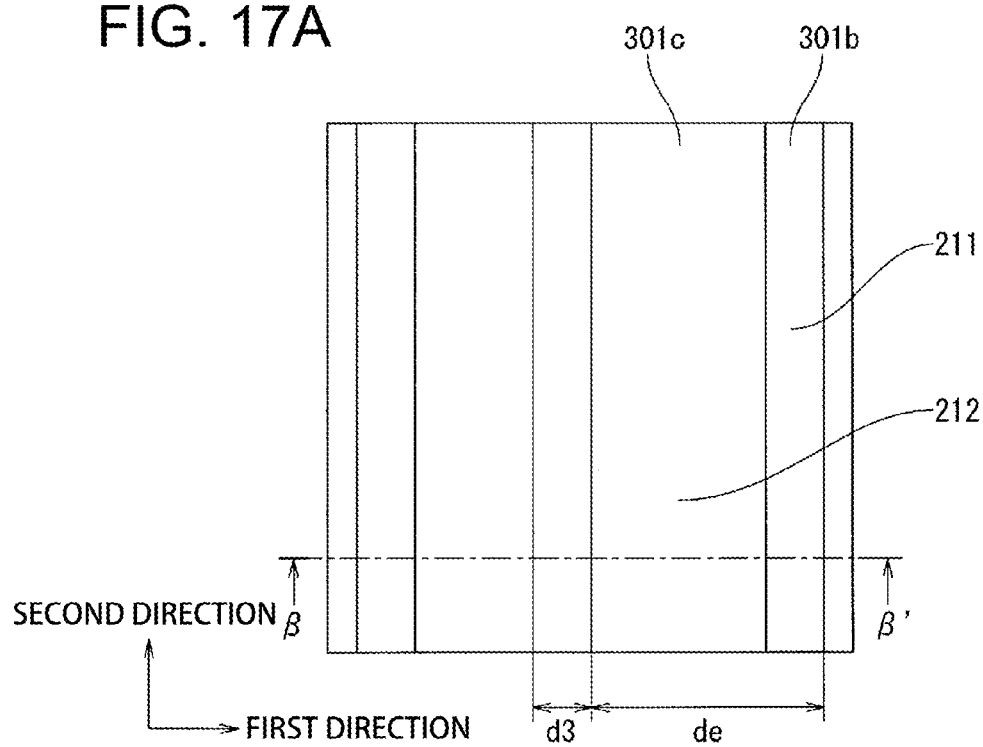
Figure 17B:
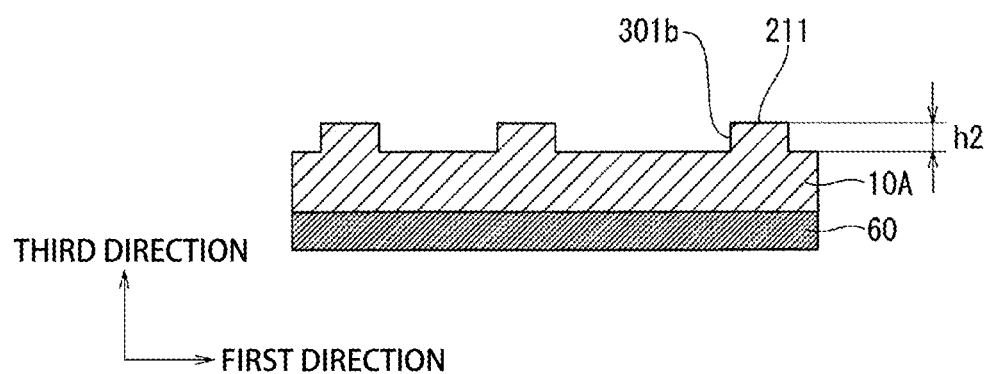
Figure 18A:
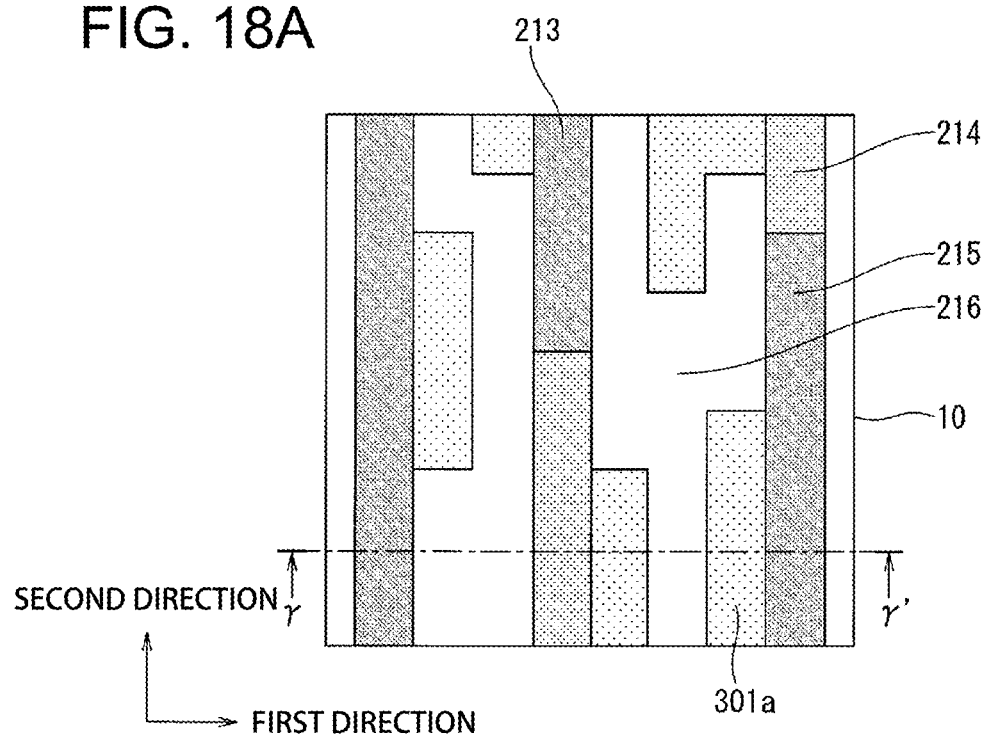
Figure 18B:
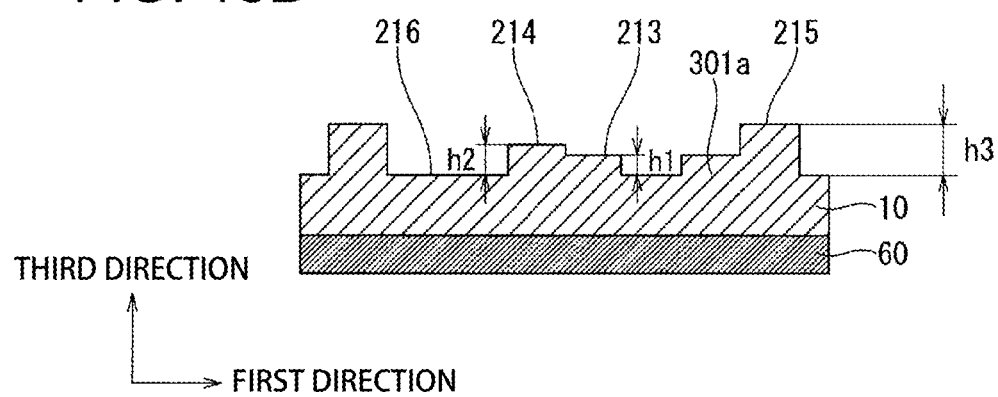

FIGS. 17A and 17B show a concave-convex structure 10A including a convex portion 301b, whose plan view is the second pattern 211. While maintaining the arrangement positions and heights of the convex portions 301b, the convex portions 301b are superimposed on the convex portions 300a, whose plan view is the first patterns 201 shown in FIGS. 16A and 16B. In this case, a pattern composed of the convex portions 301a having a multi-stage shaped concave-convex structure shown in FIGS. 18A and 18B is formed. As shown in FIGS. 18A and 18B, the pattern formed by the concave-convex structure 10A composed of the convex portion 300a and the convex portion 301b differs from the concave-convex layer 10 composed of only the first pattern 201. That is, the concave-convex layer having a multi-stage shape differs from the concave-convex layer having a single stage shape in configuration of the concave-convex structure.

In the following description, the multi-stage shaped concave-convex layer 10 will be described focusing on the difference from the single stage shaped concave-convex layer.

According to the multi-stage shaped concave-convex layer 10, changes in visible color due to the scattering effect of the reflected light depending on the observation angle are gentle. However, in the case of the multi-stage shaped concave-convex layer 10, the vividness of the visible color decreases due to a decrease in the intensity of the reflected light caused by scattering. Depending on the application or the like of the color developing structure 1, there may be a case where a structure that enables more vivid colors to be observed in a wide angular range is required. In the multi-stage shaped concave-convex layer 10, the convex portions 301b constituting the second pattern 211 are arranged so as to generate diffracted light with high reflection intensity. Accordingly, more vivid colors can be observed in a wide angular range due to scattering effect of light by the convex portion 300a, whose plan view is the first pattern 201, and diffraction effect of light by the convex portion 301b, whose plan view is the second pattern 211.

0002With reference to FIGS. 17A and 17B, the configuration of the second pattern 211 will be described. FIG. 17A is a plan view of the concave-convex structure 10A having the convex portions 301b constituting the second pattern 211, and FIG. 17B is a cross-sectional view illustrating a cross-sectional structure taken along the line β-β' of FIG. 17A.

As shown in the plan view of FIG. 17A, the second pattern 211 has a strip shape extending in the second direction with a constant width, and a plurality of second patterns 211 are arranged with a space in the first direction. In other words, a pattern formed by the plurality of second patterns 211 in plan view is a pattern formed of a plurality of strip regions extending in the second direction and arranged in the first direction. The length d3 of the second pattern 211 in the first direction may be the same or different from the length d1 of the first pattern 201 in the first direction.

An arrangement interval de of the second pattern 211 in the first direction is set so that at least part of the light reflected from the surface of the concave-convex structure 10A having the convex portions 301b, whose plan view is the second pattern 211, is observed as first-order diffracted light. In other words, the first-order diffracted light is diffracted light whose diffraction order m is 1 or −1. That is, the arrangement interval de satisfies de≥λ/(sin θ+sin φ), where θ is an angle of incidence of the incident light, φ is a reflection angle of reflected light, and λ is a wavelength of diffraction light. For example, when visible light with λ=360 nm is a target, the arrangement interval de of the second pattern 211 may be 180 nm or more. That is, the arrangement interval de may be ½ or more of the minimum wavelength in the wavelength ranges included in the incident light. Further, the arrangement interval de is a distance in the first direction between the sides of two adjacent second patterns 211. Further, the arrangement interval de is a distance between the sides which are located on the same side of the respective second patterns 211 in the first direction. That is, the arrangement interval de is a distance, for example, between the sides of two adjacent second patterns 211 in FIG. 17A, the sides being located on the right side as viewed in the longitudinal direction.

The periodicity of the arrangement pattern of the second pattern 211 formed by the convex portions 301b included in the concave-convex structure 10A is affected by the periodicity of the concave-convex structure of the substrate 60. That is, the periodicity of the arrangement pattern is affected by the periodicity of the concave-convex structure, described later, on the surface of the antireflection layer 61. Here, a case where the arrangement interval de of the plurality of second patterns 211 is constant and the antireflection layer 61 includes a metal layer 65, described later, will be described. In this case, reflected light of the specific wavelength is emitted by the metal layer 65 at a specific angle due to a diffraction phenomenon on the surface of the metal layer 65. The reflection intensity of light due to this diffraction is much stronger than the reflection intensity of the reflected light due to the scattering effect of light caused by the first pattern 201 described in the aforementioned first pattern 201. Accordingly, while light having a metallic luster is seen, the visible color changes depending on the observation angle since a spectrum due to the diffraction occurs. The metal layer 65 is a reflective layer.

Therefore, for example, even if the structure of the first pattern 201 is designed to enable the color developing structure 1 to exhibit a blue color, light in the range from strong green to red may be observed by surface reflection due to diffraction depending on the observation angle when the arrangement interval de of the second pattern 211 is a constant value in the range of approximately 400 nm or more and 5 μm or less. On the other hand, when the arrangement interval de of the second pattern 211 is increased, for example, to approximately 50 μm, changes in color due to diffraction become less likely to be seen since the angular range in which light in the visible region is diffracted is decreased. However, light having a metallic luster is observed only at a specific observation angle.

Therefore, instead of having the arrangement interval de of a constant value, the arrangement pattern of the plurality of second patterns 211 may be formed as the pattern in which a plurality of structures having different periodicities are overlapped with each other. In this case, since the reflected light due to diffraction is mixed with light of a plurality of wavelengths, dispersed highly monochromatic light is less likely to be seen. As a result, glossy and vivid colors are observed in a wide angular range. In this case, the arrangement intervals de may be selected from, for example, a range of 360 nm or more and 5 μm or less. Further, the average of the arrangement intervals de of the plurality of second patterns 211 may be ½ or more of the minimum wavelength in the wavelength ranges included in the incident light.

0003However, with an increase in the standard deviation of the arrangement interval de, the arrangement of the second pattern 211 becomes irregular and thus the scattering effect becomes dominant. Accordingly, strong reflection due to diffraction becomes less likely to occur. Therefore, the arrangement interval de of the second pattern 211 is preferably determined depending on the angle at which light spreads due to the scattering effect of light by the first pattern 201 so that the light produced due to diffraction is emitted to an angular range which is substantially the same as the angular range for the above scattered light. For example, when blue reflected light is emitted with a spread within a range of ±40° with respect to the angle of incidence, the arrangement interval de in the arrangement pattern of the second pattern 211 is set to have an average in the range of approximately 1 μm or more and 5 μm or less, with a standard deviation of approximately 1 μm. Thus, reflected light due to diffraction is generated in an angular range substantially equal to the angular range to which light is scattered by the first pattern 201.

Further, in order to ensure diffraction phenomenon of a longer periodicity, a square region with each side of 10 μm or more and 100 μm or less may be used as a unit region. Further, in the second pattern 211 disposed in each unit region, the average of the arrangement intervals de may be set in the range of 1 μm or more and 5 μm or less, and the standard deviation may be set to 1 μm or approximately 1 μm. In addition, a plurality of unit regions may include a region having a constant arrangement interval de which is in the range of 1 μm or more and 5 μm or less. Even if there is a unit region having a constant arrangement interval de, the same effect as that of the configuration having irregular arrangement intervals de in all the unit regions is expected due to the resolution of the human eye, as long as the arrangement interval de varies with a standard deviation of 1 μm or approximately 1 μm.

The second pattern 211 shown in FIGS. 17A and 17B has periodicity associated with the arrangement intervals de only in the first direction. The scattering effect of light by the first pattern 201 mainly acts on the light reflected in the first direction, but can also partially affect the light reflected in the second direction. Accordingly, the second pattern 211 may also have a periodicity in the second direction. That is, the arrangement pattern of the second pattern 211 may be a pattern in which a plurality of strip portions extending in the second direction are arranged in each of the first direction and the second direction.

In the arrangement pattern of the second pattern 211, for example, each of the arrangement intervals in the first direction and the arrangement intervals in the second direction of the second pattern 211 may vary with each average being in the range of 1 μm or more and 100 μm or less. Furthermore, depending on the difference between the influence of the light scattering effect of the first pattern 201 on the first direction and the influence on the second direction, the average of the arrangement intervals in the first direction and the average of the arrangement intervals in the second direction may be different from each other. In addition, the standard deviation of the arrangement intervals in the first direction and the standard deviation of the arrangement intervals in the second direction may be different from each other.

The plurality of second patterns 211 are arranged in each of the first direction and the second direction, and at least one of the average and the standard deviation of the arrangement intervals of the second patterns 211 may be different between the arrangement intervals in the first direction and the arrangement intervals in the second direction. In this case, the light diffraction effect of the second patterns 211 can be adjusted depending on the difference between the influence of the light scattering effect of the first patterns 201 on the first direction and the influence on the second direction when the first patterns 201 are periodically arranged only in the first direction.

As shown in FIG. 17B, the height h2 of the convex portion 301b whose plan view is the second pattern 211 may be larger than the surface roughness of the interference layer 31 formed on the convex portion 301b and on a region in which the convex portion 301b is not formed. However, with an increase in the height h2, the diffraction effect due to the convex portion 301b whose plan view is the second pattern 211 becomes dominant in the effect of the concave-convex structure on the reflected light, and thus the scattering effect of light due to the convex portion 300a whose plan view is the second pattern 201 becomes less likely to be obtained. Accordingly, the height h2 of the convex portion 301b is preferably similar to the height h1 of the convex portion 300a, and the height h2 may be the same as the height h1. For example, the height h1 of the convex portion 300a and the height h2 of the convex portion 301b are preferably within the range of 10 nm or more and 200 nm or less. In the color developing structure that exhibits a blue color, the height h1 of the convex portion 300a and the height h2 of the convex portion 301b are preferably within the range of 10 nm or more and 150 nm or less.

With reference to FIGS. 18A and 18B, the details of the multi-stage shaped concave-convex layer 10 will be described. FIG. 18A is a plan view of the concave-convex layer 10 as viewed in a direction facing the interference layer 31, and FIG. 18B is a cross-sectional view illustrating a cross-sectional structure taken along the line γ-γ' of FIG. 18A.

In the plan view shown in FIG. 18A, a pattern formed of the first pattern 201 and the second pattern 211 that constitute the concave-convex layer 10 is a pattern in which the first pattern 201 shown in FIGS. 16A and 16B and the second pattern 211 shown in FIGS. 17A and 17B are overlapped with each other. That is, a region in which the convex portion 301a is located in the concave-convex layer 10 includes a region 213 formed only by the first pattern 201, a region 214 formed only by the second pattern 211, and a region 215 in which the first pattern 201 and the second pattern 211 are overlapped with each other. The remaining is a region 216 in which the convex portion 301a is not formed.

Further, in FIGS. 18A and 18B, the first pattern 201 and the second pattern 211 are overlapped with each other such that their ends are aligned with each other in the first direction. However, the configuration is not limited to this configuration, and an end of the first pattern 201 and an end of the second pattern 211 may not be aligned in the first direction.

As shown in FIG. 18B, the height of a portion of the convex portion 301a corresponding to the region 213 is the height h1 of the convex portion 300a corresponding to the first pattern 201. In this example, the height of the region 216 in which the convex portion 301a is not formed is taken as a reference. Further, the height of a portion of the convex portion 301a corresponding to the region 214 is the height h2 of the convex portion 301b corresponding to the second pattern 211. Similarly, the height of a portion corresponding to the region 215 is a sum (=h3) of the height h1 of the convex portion 300a corresponding to the first pattern 201 and the height h2 of the convex portion 301b corresponding to the second pattern 211. That is, the multi-stage shaped concave-convex layer 10 has a multi-stage shape in which the convex portion 300a of the first pattern 201 having the predetermined height h1 and the convex portion 301b of the second pattern 211 having the predetermined height h2 are partially overlapped in the height direction.

As described above, according to the color developing structure 1 having the multi-stage concave-convex layer 10, which causes the synergy effect of the light diffusion phenomenon due to the convex portion 300a having the first pattern 201 and light diffraction phenomenon due to the convex portion 301b of the second pattern 211, reflected light of the specific wavelength range can be observed in a wide angular range. Further, since the intensity of the reflected light is increased, glossy and vivid colors are visually observed. In other words, although a single concave-convex structure, the multi-stage shaped concave-convex layer 10 performs both the light diffusion function and the light diffraction function since the concave-convex structure has a multi-stage shape.

Further, the first pattern 201 and the second pattern 211 may be arranged so as not to be overlapped with each other in plan view. With this configuration as well, the light diffusion effect and light diffraction effect by the first pattern 201 and the second pattern 211, respectively, can be obtained. However, when the first pattern 201 and the second pattern 211 are arranged so as not to be overlapped with each other, the area in which the first pattern 201 can be positioned per unit area is reduced, and the light diffusion effect is decreased. Hence, in order to improve the light diffusion effect and light diffraction effect by the first pattern 201 and the second pattern 211, respectively, the first pattern 201 and the second pattern 211 are preferably overlapped with each other as shown in FIGS. 18A and 18B so that the convex portion 301a forms a multistage shape. In addition, the same effect can also be obtained in the configuration in which the first pattern 201 is partially positioned on the second pattern 211.

<Interference Layer>

Figure 19:
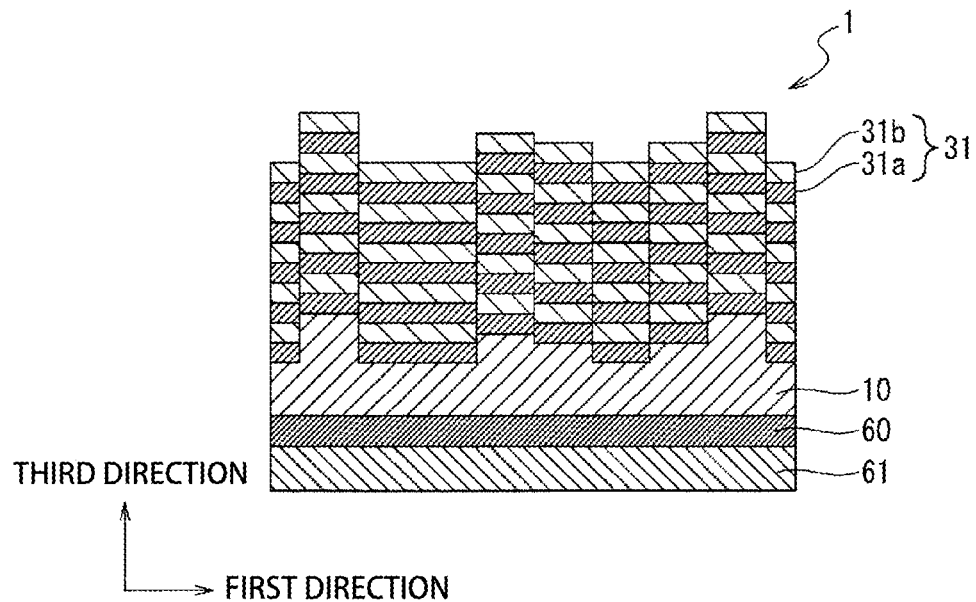
FIG. 19 is a schematic configuration view illustrating an example of an interference layer according to the second embodiment.

With reference to FIG. 19, the interference layer 31 will now be described.

Description will be given of the concave-convex layer including the multi-stage shaped concave-convex layer 10, as shown in FIG. 19, having a pattern including the first pattern 201 and the second pattern 211 in plan view shown in FIGS. 18A and 18B. Instead of the concave-convex layer 10 having a multi-stage shape, the concave-convex layer 10 having only the convex portion 300a whose plan view is the first pattern 201 shown in FIGS. 16A and 16B can also be used.

0004The interference layer 31 has a surface shape that follows the surface shape of the concave-convex structure of the concave-convex layer 10. That is, the interference layer 31 is formed on the upper surfaces of the concave portion and the convex portion of the concave-convex layer 10 in cross-sectional view. When the interference layer 31 is a single layer, thin film interference occurs and the phase is reversed in the following conditions. Accordingly, when the refractive index is n and the optical path difference is 1, increased brightness is achieved under the condition of $2nl=(m+\frac{1}{2})$. Further, when the interference layer 31 is composed of two or more layers, multilayer film interference occurs.

When the interference layer 31 has a multilayer configuration composed of two or more layers, the interference layer 31 has a structure in which high refractive index layers 31a and low refractive index layers 31b are alternately laminated. The refractive index of the high refractive index layer 31a is larger than the refractive index of the low refractive index layer 31b. In order to increase the interference light by using a small number of layers, the difference between the refractive indices of the high refractive index layer 31a and the low refractive index layer 31b is preferably in the range of 0.6 or more and 2.2 or less. In this case, reflection of the specific wavelength range increases with a small number of layers.

The interference layer 31 illustrated in FIG. 19 is laminated on the concave-convex layer 10 so as to extend along the concave-convex structure of the concave-convex layer 10. Further, the interference layer 31 is composed of a total of 10 layers, in which the high refractive index layers 31a and the low refractive index layers 31b are alternately laminated so that asperities extend along the concave-convex structure of the concave-convex layer 10. However, the interference layer 31 is not limited to this configuration.

When light enters the multilayer interference layer 31 thus configured, light reflected by each interface between the high refractive index layer 31a and the low refractive index layer 31b of the interference layer 31 undergoes interference. As a result of the light changing traveling direction due to the irregular asperities on the surface of the interference layer 31, light of the specific wavelength range is emitted in a wide angular range. The specific wavelength range of light strongly emitted as the reflected light is determined depending on the refractive index and extinction coefficient of the material constituting the high refractive index layer 31a and the low refractive index layer 31b, the film thickness, and the width, height, and arrangement of the convex portion.

The material for forming the interference layer 31 may be materials described in the first embodiment for forming the interference layer 31, but is not limited to these materials. When the interference layer 31 includes one or more of a fluorine compound, silicon compound, titanium compound, and niobium compound, it also functions as a protective layer for protecting the color developing structure 1. Accordingly, scratch resistance is improved. Further, when the interference layer 31 is configured as a multilayer film, the protective layer may be provided on the surface of the multilayer film on a side facing away from the substrate 60, that is, on the front surface of the color developing structure 1.

When the film thickness of the interference layer 31 is in the range of 5 nm or more and 2000 nm or less, low cost production is possible since the film thickness is small. The film thickness in the range of 5 nm or more and 1000 nm or less is preferred since it enables a stronger interference effect.

<First Form of Antireflection Layer>

Figure 20:
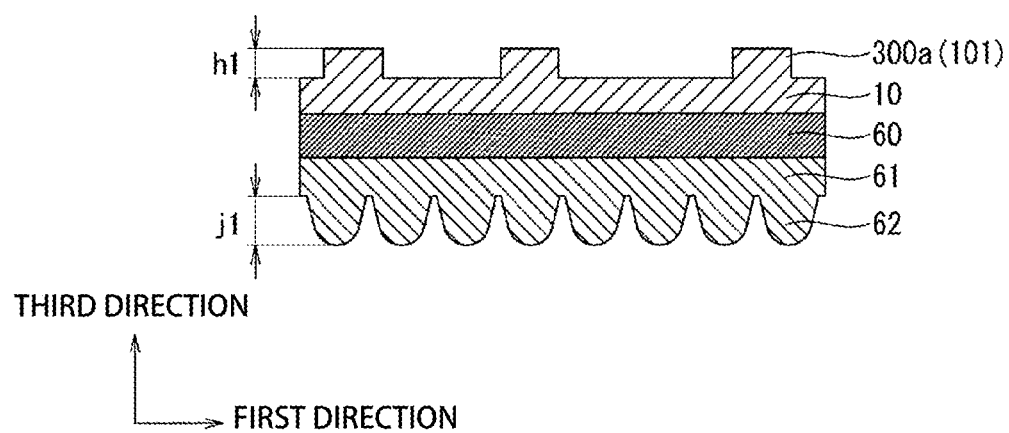
FIG. 20 is a schematic configuration view illustrating a first form of an antireflection layer according to the second embodiment.
Figure 21A:
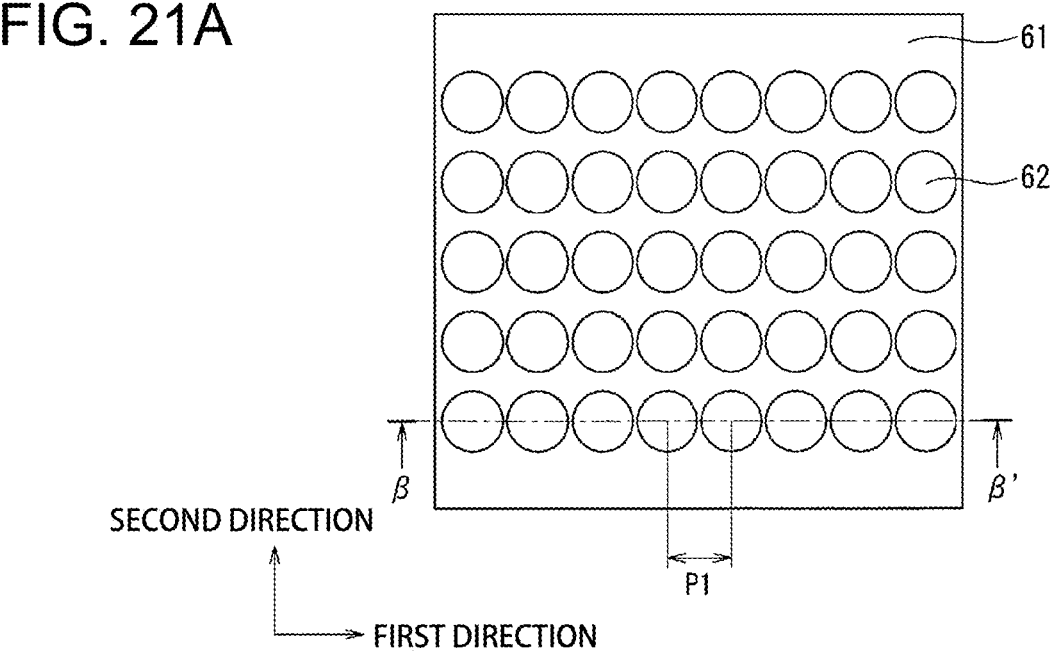
Figure 21B:
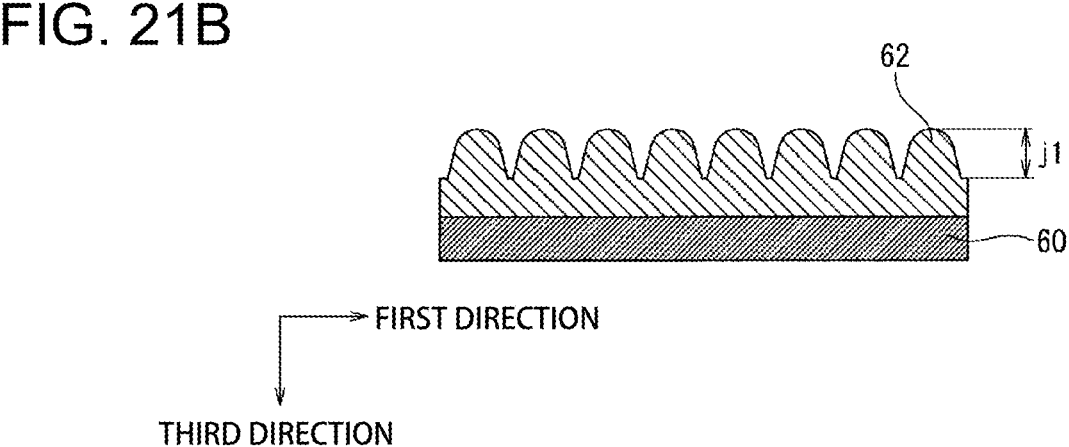

With reference to FIGS. 20, 21A, and 21B, a first form of the antireflection layer 61 will now be described.

The description will be made on the concave-convex layer including the single stage shaped concave-convex layer 10, as shown in FIG. 20, having only the convex portion 300a whose plan view is the first pattern 201 shown in FIGS. 16A and 16B. However, instead of the concave-convex layer 10, a multi-stage shaped concave-convex layer having the first pattern 201 and the second pattern 211 in plan view can also be used.

FIG. 20 is a cross-sectional view in which the first form of the antireflection layer 61 is used as the antireflection layer of the color developing structure 1. FIG. 21A is a view of the color developing structure 1 shown in FIG. 20 as viewed in a direction facing the rear side. FIG. 21B is a cross-sectional view of the cross-sectional structure taken along the line β-β' of FIG. 21A. Further, for simplicity of illustration, the interference layer 31 is omitted in FIG. 20, and the concave-convex layer 10 and the interference layer 31 are omitted in FIGS. 21A and 21B.

The antireflection layer 61 has a concave-convex structure (second concave-convex structure) 62 in which a plurality of convex portions are arranged on a side opposite to that on which the substrate 60 is provided.

The vertical cross-sectional shape of the convex portion of the concave-convex structure 62 may be a bell shape, cone shape, reverse funnel shape, rectangular shape, triangular prism shape, polygonal prism shape, cylindrical shape, or other shape. Due to such a shape of the convex portion of the concave-convex structure 62, the refractive index can vary stepwise in the third direction. As a result, when light has been transmitted without being reflected by the interference layer 31 or has been incident on the rear side of the color developing structure 1, it is possible to reduce the light from being emitted through the front surface. That is, since unnecessary light is less likely to be seen on the front surface of the color developing structure 1, the reflected light of the predetermined wavelength range reflected on the interference layer 31 can be highly visible.

As shown in FIG. 21B, the concave-convex structure 62 preferably has a height variation j1 in the film thickness direction in the range of 10 nm or more and 500 nm or less. Further, the structural periodicity, that is, the arrangement periodicity of the convex portion is preferably in the range of 10 nm or more and 1000 nm or less. The structural periodicity is more preferably a subwavelength, which is equal to or less than the wavelength in the visible region. Further, a plurality of different periodicities can be combined to form the concave-convex structure 62. In this case, the periodicity may be a wavelength in the visible region or more. When the values are within this range, reflection at the interface can be effectively reduced.

In the structural periodicity of the concave-convex structure 62, a ratio of the widths between the concave portion and the convex portion of the concave-convex structure 62 is preferably in the range of 0.25 or more and 0.75 or less. In this case, the refractive index can be easily varied in the cross-sectional direction. Here, a width between the convex portions of the concave-convex structure 62 is the width of the concave portion.

The plurality of convex portions of the concave-convex structure 62 may be irregularly arranged, or may be in a square or hexagonal arrangement. Further, an island-like arrangement formed by combining these arrangements may also be used. The convex portions of the concave-convex structure 62 are preferably designed to have an irregular arrangement, in which the convex portions have varied size and height or are irregularly arranged. With this configuration, reflection of incident light including various wavelength ranges can be effectively reduced.

Preferably, the material for the concave-convex structure 62 is mainly composed of a UV-curable resin, thermosetting resin, or thermoplastic resin. By virtue of the plurality of convex portions of the concave-convex structure 62 being arranged, the antireflection layer 61 can perform its function. The antireflection layer 61 including the concave-convex structure 62 may be provided as a separate layer from the concave-convex layer 10 and disposed via the substrate 60 as shown in FIG. 20. The antireflection layer 61 and the concave-convex layer 10 may also be integrally formed. The antireflection layer 61 and the concave-convex layer 10 may be made of the same resin material or different resin material. The material for the antireflection layer 61 preferably has a refractive index in the range of 1.1 or more and 2.0 or less, and more preferably in the range of 1.4 or more and 1.6 or less.

Figure 22:
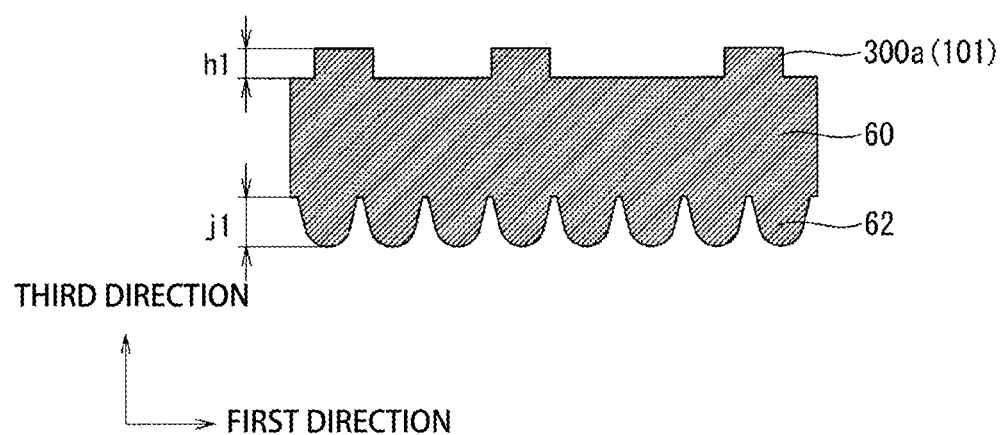
FIG. 22 is a view illustrating a modified example of the color developing structure according to the second embodiment.

Further, the antireflection layer 61 may be formed after the concave-convex layer 10 is formed, or the concave-convex layer 10 may be formed after the antireflection layer 61 is formed. It is preferred to simultaneously form the concave-convex layer 10 and the antireflection layer 61 in view of reduction in manufacturing cost and improvement in production capacity. In other words, the substrate 60 may or may not be provided. That is, as shown in FIG. 22, when the concave-convex structure having the convex portion 300a whose plan view is the first pattern 201 is formed on one side of a member and the concave-convex structure 62 is formed on the other side of the member, the member can be provided as the substrate 60. Further, the interference layer 31 can be formed on the concave-convex structure having the convex portion 300a.

<Second Form of Antireflection Layer>

Figure 23:
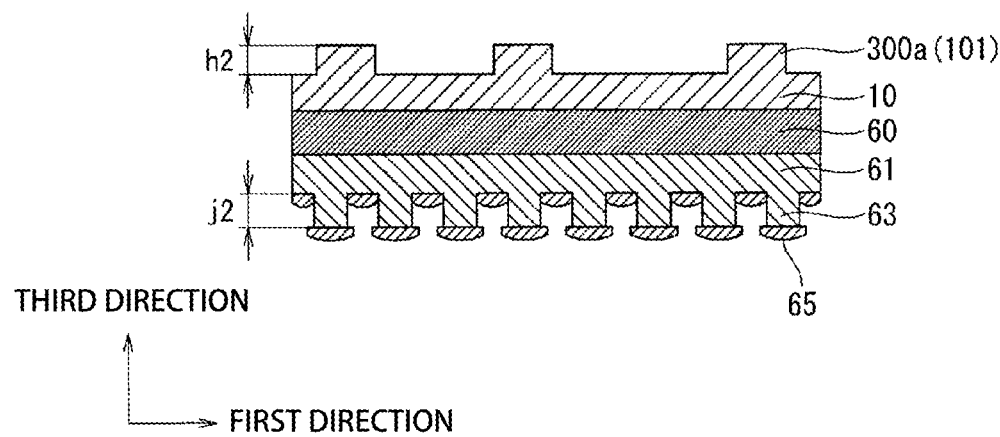
FIG. 23 is a schematic configuration view illustrating a second form of the antireflection layer according to the second embodiment.

With reference to FIGS. 23, 24A, 24B, 25, and 26, a second form of the antireflection layer 61 will now be described. The following description will be made on the concave-convex layer including the concave-convex layer 10, as shown in FIG. 23, having the first pattern 201 shown in FIGS. 16A and 16B. However, instead of the concave-convex layer 10, a multi-stage shaped concave-convex layer 10 having a pattern including the first pattern 201 and the second pattern 211 can also be used.

0005FIG. 23 is a cross-sectional view of the color developing structure 1 in which the second form of the antireflection layer 61 is used as the antireflection layer 61 of the color developing structure 1.

As shown in FIG. 23, the antireflection layer 61 has a concave-convex structure 63 composed of a plurality of concave-convex structures on a side opposite to that on which the substrate 60 is provided. The antireflection layer 61 further includes a metal layer 65 having a surface shape that follows the concave-convex shape of the concave-convex structure 63. The metal layer 65 is formed on the upper surfaces of the concave portion and the convex portion of the concave-convex structure 63 in cross-sectional view.

Figure 24A:
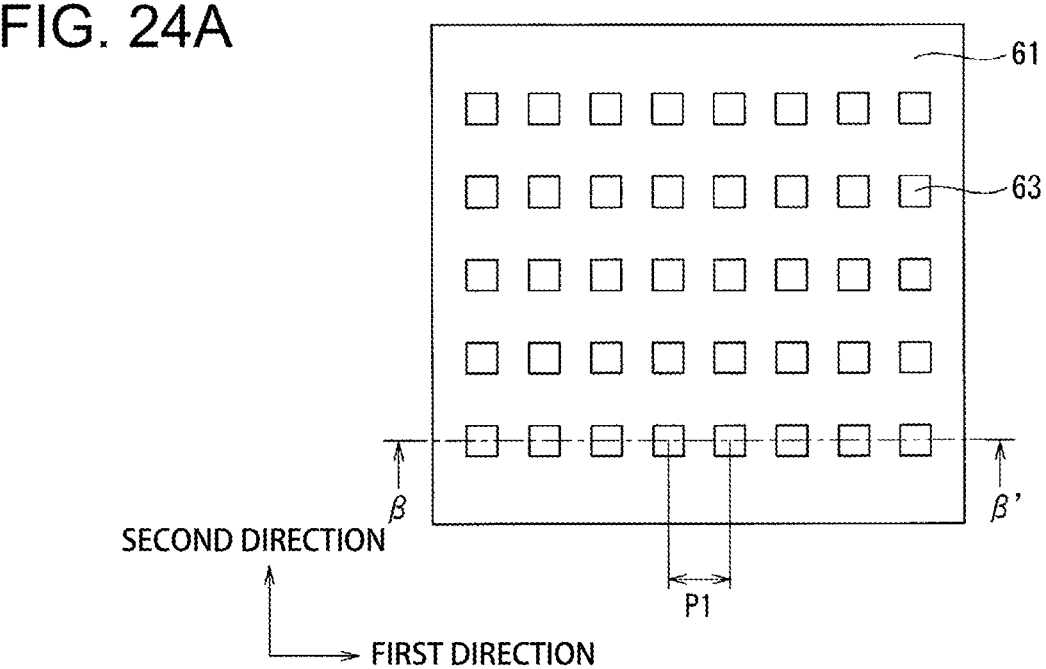
Figure 24B:
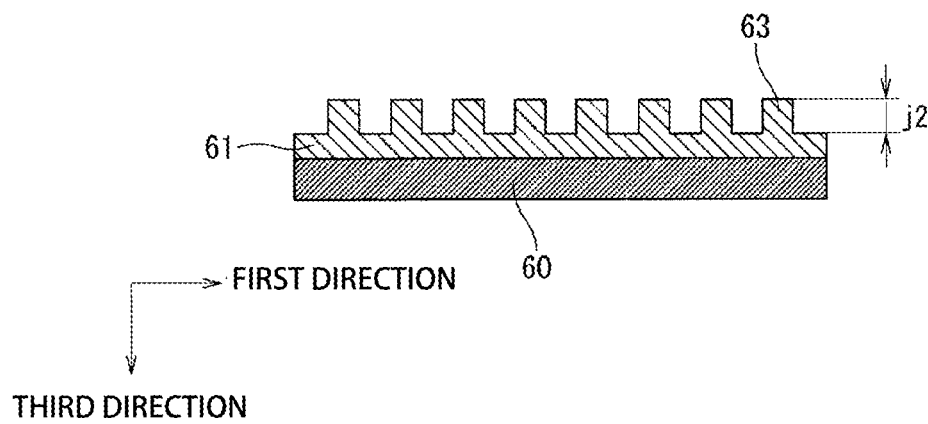
Figure 25:
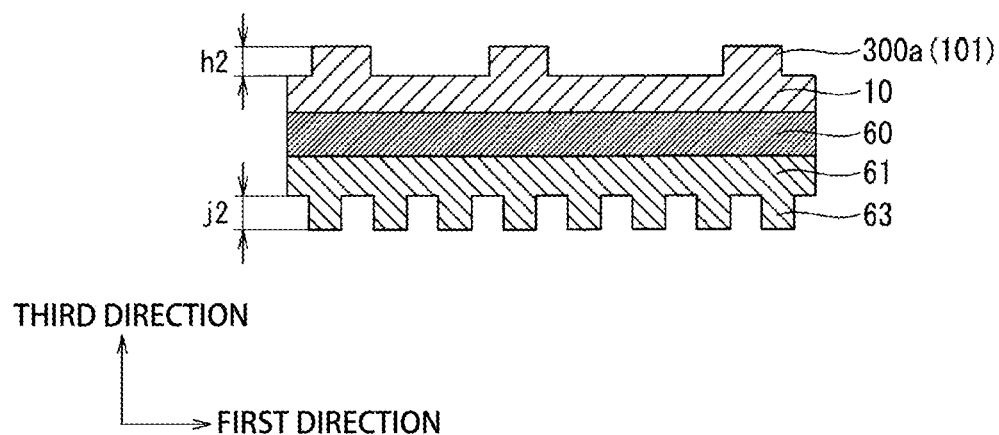
FIG. 25 is a view illustrating the concave-convex structure shown in FIGS. 24A and 24B.

FIG. 24A is a view of the color developing structure 1 shown in FIG. 23 as viewed in a direction facing the antireflection layer 61. FIG. 24B is a cross-sectional view of the cross-sectional structure taken along the line β-β' of FIG. 24A. For simplicity of illustration, the interference layer 31 is omitted in FIG. 23. Further, the concave-convex layer 10, the interference layer 31, and the metal layer 65 are omitted in FIGS. 24A and 24B. That is, FIGS. 24A and 24B show the concave-convex structure 63 in a state in which the metal layer 65 is not formed in the color developing structure 1 (FIG. 23) as shown in FIG. 25.

A structural periodicity P1 of the concave-convex structure 63 is preferably a subwavelength, which is equal to or less than the wavelength in the visible region. The convex portion of the concave-convex structure 63 preferably has a height j2 in the range of 10 nm or more and 200 nm or less in the thickness direction. When the values are within this range, plasmon resonance is likely to occur.

The concave-convex structure 63 may be irregularly arranged, or may be in a square or hexagonal arrangement. Further, an island-like arrangement formed by combining these arrangements may also be used. An irregularly arrangement is preferable in reducing interference fringes.

Further, in this case as well, the concave-convex layer 10 and the antireflection layer 61 may be integrally formed. The antireflection layer 61 may be formed after the concave-convex layer 10 is formed, or the concave-convex layer 10 may be formed after the antireflection layer 61 is formed. When the concave-convex layer 10 and the antireflection layer 61 are simultaneously formed, the manufacturing cost can be reduced. That is, the substrate 60 can be made of the same or different material from the concave-convex layer 10 and the antireflection layer 61. In other words, the substrate 60 may or may not be provided.

Figure 26:
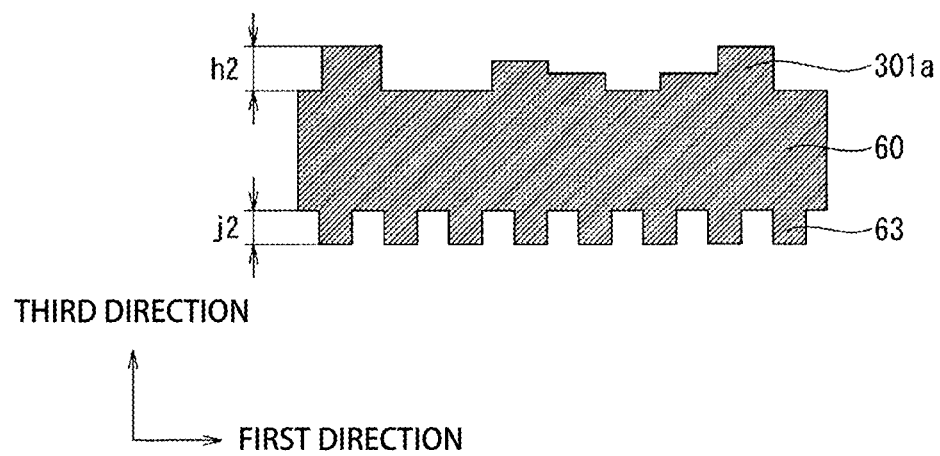
FIG. 26 is a view illustrating a modified example of the color developing structure according to the second embodiment.

Further, as shown in FIG. 26, when the concave-convex structure having the convex portion 301a whose plan view is the first pattern 201 and the second pattern 211 is formed on one side of a member and the concave-convex structure 63 is formed on the other side of the member, the member can be provided as the substrate 60. Further, the color developing structure 1 can be configured with the interference layer 31 formed on the concave-convex structure having the convex portion 301a and the metal layer 65 formed on the concave-convex structure 63. In FIG. 26, the interference layer 31 and the metal layer 65 are omitted.

0006The shape of the concave portion and the convex portion of the plurality of concave-convex structures 63 is not limited to a rectangular shape, and may also be rounded, a triangular prism, a cylinder, or the like.

In the structural periodicity of the concave-convex structure 63, when a ratio of the width in the concave-convex structure 63 is in the range of 0.25 or more and 0.75 or less, plasmon resonance can be effectively induced so that colors can be exhibited with high brightness.

<Third Form of Antireflection Layer>

A third form of the antireflection layer 61 will now be described. Further, the third form of the antireflection layer 61 can be used in combination with the first form of the antireflection layer and the second form of the antireflection layer.

The third form of the antireflection layer 61 is made of a resin to which a black pigment is added. With this configuration, the antireflection layer 61 can absorb light in a wide wavelength range in the visible region. Accordingly, in a configuration in which incident light is light in the visible region, the transmitted light can be suitably absorbed regardless of a difference in wavelength range of the transmitted light according to the configuration of the interference layer 31.

A resin layer containing a black pigment may be provided separately from the substrate 60, or the substrate 60 containing a black pigment may be provided as the antireflection layer 61. Alternatively, the concave-convex structure 62 or 63 may also contain a black pigment to perform these effects.

In a configuration containing a black pigment and a resin, a thermoplastic resin may be used as the resin. Examples of the thermoplastic resin include the thermoplastic resins mentioned as examples of the material of the concave-convex layer 10 and the substrate 60, which will be described later.

Further, examples of the black pigment include black inorganic pigments. Examples of the black inorganic pigment include carbon black, titanium black, black iron oxide, and black composite oxides. The protective layer 61 may further contain other light absorbers made of materials that absorb light in the visible region.

Figure 27:
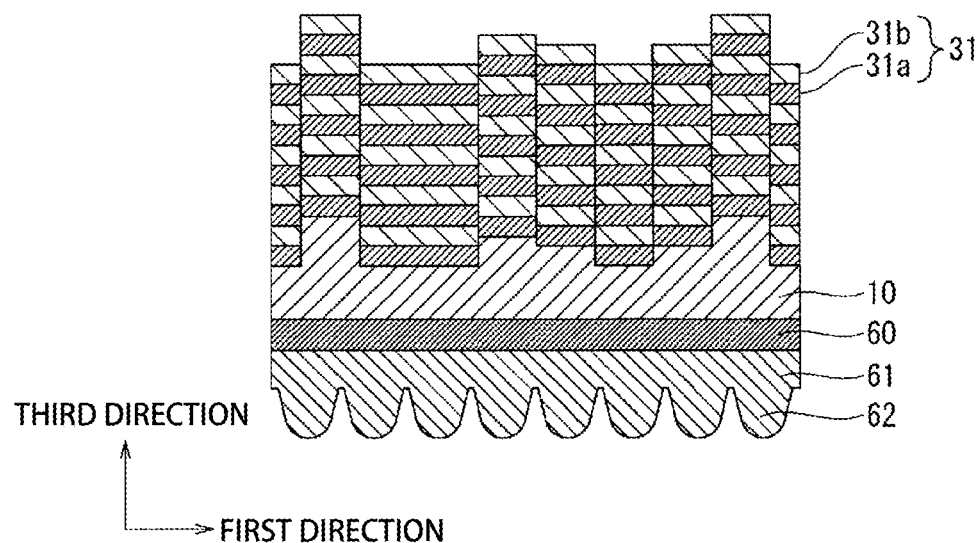
FIG. 27 is a cross-sectional view illustrating another example of the color developing structure according to the second embodiment.
Figure 28:
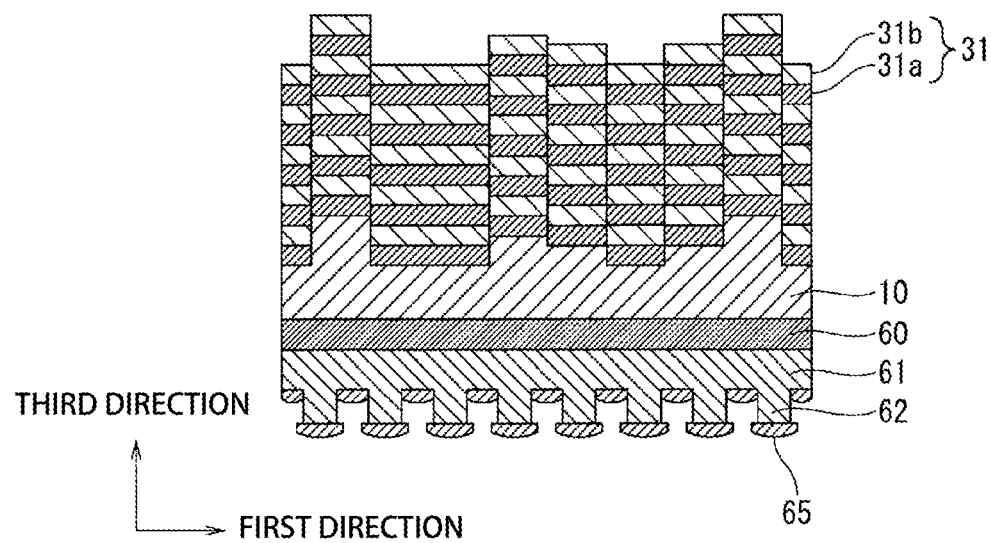
FIG. 28 is a cross-sectional view illustrating another example of the color developing structure according to the second embodiment.

In addition, when the multi-stage shaped concave-convex layer 10 is used as the concave-convex layer in the color developing structure 1 including the first to third forms of the antireflection layers as the antireflection layer 61, the interference layer 31 may have a multilayer structure in which high refractive index layers 31a and low refractive index layers 31b are alternately laminated as shown in FIGS. 27 and 28, or may have a single layer structure.

<Metal Layer>

The metal layer 65 is a reflective layer. The metal layer 65 can be made of the same material as that of the reflective layer in the first embodiment.

As shown in FIG. 23, the metal layer 65 is formed by providing the metal on the upper surface of the concave-convex structure 63. When light is incident on the front surface of the color developing structure 1, light is transmitted through the concave-convex layer 10, the substrate 60, the concave-convex structure 63 of the antireflection layer 61, and the metal layer 65 in this order. On the other hand, when the metal layer is provided on the antireflection layer that does not have the concave-convex structure, strong reflected light is emitted at the interface between the metal layer and the antireflection layer, since the wavelength of the light and the vibration direction of free electrons of the metal are different. Accordingly, white light is emitted even if the interference layer 31 is provided. In contrast, when the metal layer 65 is provided on the upper surface of the convex portion and the upper surface of the concave portion of the concave-convex structure 63, plasmon absorption occurs at the interface between the concave-convex structure 63 and the metal layer 65 so that light of the specific wavelength range is reflected, and, not only specular reflected light, but also light having anisotropic scattering is reflected.

The light that has been transmitted through the concave-convex structure 63 and the metal layer 65 causes an anomalous plasmon transmission phenomenon and is emitted. Accordingly, light reflected from the interference layer 31, light reflected from the metal layer 65, and transmitted light are different. Therefore, it is preferable to use for a display that is strongly resistant to counterfeiting with high security.

Further, when the color developing structure 1 is attached or adhered to another display, the specific surface area is increased due to the concave-convex structure 63 and the metal layer 65 to thereby provide good adhesiveness.

The metal layer 65 preferably includes at least one metal or metal alloy having a refractive index of 0.2 or more and 6.0 or less. In this case, the intensity of light reflected by the metal layer 65 increases.

Further, the extinction coefficient of the metal layer 65 in the visible light region is preferably 2.0 or more and 6.0 or less. This is preferred since the absorbed light decreases and the reflected light is efficiently emitted.

[Method for Producing Color Developing Structure]

Materials for each layer that constitutes the color developing structure 1, and methods for producing the color developing structure 1 will now be described.

The concave-convex layer 10 having the concave-convex structure may be made of the same material as the concave-convex layer 10 described in the first embodiment. The concave-convex layer 10 is made of a material having optical transparency to light in the visible region, that is, a material transparent to light in the visible region. The materials preferably include, but are not limited to, photocurable resins, thermoplastic resins, and thermosetting resins. The thermoplastic resins that can be used include, but are not limited to acrylic, polyester, cellulose, and vinyl-based resins. The thermosetting resins that can be used include, but are not limited to, urethane resins, melamine-based resins, epoxy resins, phenolic resins, and the like obtained by reaction of acrylic polyol or polyester polyol having reactive hydroxyl groups with polyisocyanate.

The substrate 60 is preferably made of a material having optical transparency to light in the visible region. For example, the substrate 60 is formed of a film which is made of a resin such as polyethylene terephthalate, polycarbonate, polyethylene naphthalate, polyethylene, polypropylene, or cycloolefin copolymer. Further, inorganic materials such as glass, quartz, and silicon wafers, and metals can also be used as the substrate 60.

The concavo-convex structure is formed on the surface of a relatively hard substrate such as synthetic quartz or silicon wafer, for example, by using a known microprocessing technique such as lithography or dry etching by irradiating light or charged particle beam.

Forming the concave-convex layer 10 on the substrate 60 can increase flexibility and usability since it imparts mechanical strength such as tensile strength, and formability. For example, production methods suitable for mass production, such as roll-to-roll, can be applied.

The concave-convex layer 10 and the concave-convex structure 62 or 63 of the antireflection layer 61 are fabricated by nanoimprinting or the like. For example, in production of the concave-convex structure of the concave-convex layer 10 by photo-nanoimprinting, a mold, which is an intaglio plate having a reversed concave-convex shape of the concave-convex shape to be formed, is required.

In production of the concave-convex layer 10 and the concave-convex structure 62 or 63 of the antireflection layer 61, the surface of the application layer made of the photocurable resin is superimposed on the substrate 60, and the application layer and the mold, which are pressed against each other, are irradiated with light through the substrate 60 or the mold. Subsequently, the cured photocurable resin and the substrate 60 are released from the mold. Thus, the concave-convex shape of the mold is transferred to the photocurable resin to thereby form the concave-convex layer 10 having the concave-convex shape on the surface thereof. Then, on a surface of the substrate 60 on a side opposite to that on which the concave-convex layer 10 is formed, the surface of the application layer made of the photocurable resin is superimposed on the substrate 60, and the application layer and the mold, which are pressed against each other, are irradiated with light through the substrate 60 or the mold. Subsequently, the cured photocurable resin and the substrate 60 are released from the mold. Accordingly, the concave-convex layer 10 is formed on one surface of the substrate 60, and the antireflection layer 61 having the concave-convex structures 62 and 63 is formed on the other surface of the substrate 60. Further, the photocurable resin may be irradiated with light while it is applied to the surface of the substrate 60 and the mold is pressed against the application layer of the substrate 60.

The order of forming the shape of the concave-convex layer 10 and the antireflection layer 61 having the concave-convex structure 62 or 63 is not limited to that described above, and may be changed. Further, the concave-convex layer 10 and the antireflection layer 61 having the concave-convex structure 62 or 63 may also be simultaneously formed. By forming the concave-convex layer 10 on one surface of the layer made of a photocurable resin, thermosetting resin, or thermoplastic resin, and simultaneously forming the antireflection layer 61 having the concave-convex structure 62 or 63 on the other surface, the cost can be reduced in terms of material and equipment, and thus less expensive displays can be provided.

The method for applying curable resin is not limited, and a known coating method, such as an ink jet method, a spray method, a bar coating method, a roll coating method, a slit coating method, or a gravure coating method, may be used.

The mold is made of, for example, synthetic quartz or silicon, and is formed using a known microprocessing technique such as lithography or dry etching by irradiating light or charged particle beam.

Moreover, a thermal nanoimprint method and room-temperature nanoimprint method may be used in place of the photo-nanoimprint method. In this case, as the resin that constitutes the concave-convex layer 10 and the antireflection layer 61 having the concave-convex structure 62 or 63, a resin such as a thermoplastic resin or a thermosetting resin is used depending on the production method.

Further, when a step of forming the concave-convex layer 10 and the antireflection layer 61 is referred to as a first step, the first step is followed by a second step for forming the interference layer 31 on the concave-convex layer 10, and a third step for forming the metal layer 65 on the concave-convex structure 63. The interference layer 31 is formed so that the specific wavelength range of the reflected light in the interference layer 31 undergoes interference. The metal layer 65 is formed so that plasmon resonance is induced at the specific wavelength range of the incident light.

The compound used for the interference layer 31 may be the compound described in connection with the interference layer of the first embodiment. The method for producing the interference layer 31 may also be the method described in connection with the interference layer of the first embodiment.

When the interference layer 31 is a multilayer, the high refractive index layers 31a and the low refractive index layers 31b are alternately laminated to achieve multilayer film interference. The order of lamination may be changed, and the number of laminated layers can also be reduced as long as a desired color is obtained. Both the high refractive index layer 31a and the low refractive index layer 31b are made of a material having optical transparency to light in the visible region, that is, a material transparent to light in the visible region.

The materials of these layers are not limited as long as the refractive index of the high refractive index layer 31a is higher than the refractive index of the low refractive index layer 31b. However, when the difference in refractive indices between the high refractive index layer 31a and the low refractive index layer 31b is in the range of 0.6 or more and 2.2 or less, high intensity reflected light can be obtained with a small number of laminated layers.

The high refractive index layer 31a and the low refractive index layer 31b made of an inorganic material are each formed by using a known thin film formation technique such as sputtering, vacuum deposition, or an atomic layer deposition method. Further, the high refractive index layer 31a and the low refractive index layer 31b may also be made of organic materials. In this case, the high refractive index layer 31a and the low refractive index layer 31b may be formed by a known technique such as self-organization.

The film thickness of the high refractive index layer 31a and the low refractive index layer 31b may be designed using a transfer matrix method or the like depending on a desired color to be developed by the color developing structure 1. The film thickness of the high refractive index layer and low refractive index layer is preferably approximately in the range of 30 nm or more and 300 nm or less.

Further, the number of layers included in the interference layer 31 shown in FIG. 19 and the order of lamination are not limited thereto. The interference layer 31 may be configured such that layers adjacent to each other have refractive indices that are different from each other, and the reflectance to light in a specific wavelength range of the incident light entering the interference layer 31 is higher than the reflectance in other wavelength ranges.

The material for forming the metal layer 65 is not specifically limited as long as it is a compound that reflects incident light, and is preferably a metal or metal alloy. A metal, metal alloy, or a composite constituting the metal layer 65 may also be superimposed as necessary. Since strong specular reflected light and scattered light can be obtained when light is incident on the concave-convex structure 63, a metal or metal alloy having the refractive index of 0.2 or more and 6.0 or less is preferred. Preferably, the extinction coefficient is 2.0 or more and 6.0 or less in order to reduce light absorption. Specifically, one or more of metals selected from Au, Ag, Cu, Al, Zn, Ni, Cr, Ge, Mo, Ga, Ta, W, In, and Sn, metal alloys thereof, and composites thereof are preferred since plasmon resonance occurs with light incident on the concave-convex structure 63. More preferably, Ag or Al is used.

The metal layer 65 is formed by using a known thin film formation technique such as sputtering, vacuum deposition, or an atomic layer deposition method. Further, the metal layer 65 may have a configuration including an organic material, and may be formed by using a known technique such as self-organization.

In order to induce plasmon resonance in the metal layer 65, the film thickness of the metal layer 65 is preferably approximately in the range of 5 nm or more and 500 nm or less. Further, a film thickness of 5 nm or more and 200 nm or less is more preferable to maintain a balance between optical transparency and a desired reflectance.

[Application Examples of Color Developing Structure]

Specific application examples of the color developing structures illustrated in the above first embodiment and the second embodiment will be described.

Not only the color developing structures illustrated in the above first embodiment and the second embodiment, but any color developing structure satisfying the configuration of the present invention can also be applied to the application examples described below.

<Display>

The first application example of the color developing structure is an embodiment in which the color developing structure is used for a display. The display can be used for the purpose of increasing product counterfeiting resistance. The display can also be used for the purpose of improving product designability. The display can be used for both purposes. For the purpose of increasing product counterfeiting resistance, a display may be attached, for example, to authentication documents such as passports and licenses, securities such as merchandise coupons and checks, cards such as credit cards and cash cards, and paper money. For the purpose of improving product designability, a display may be attached, for example, to wearable accessories, products such as cell phones and mobile devices carried around by users, stationary goods such as household furniture and home electric appliances, structures such as walls and doors, signboards, interiors and exteriors of automobiles.

When a display including a plurality of display elements and configured with the color developing structure 1 is used for high security applications such as a credit card, cash card, and banknote, it is possible to provide varied expression using three colors in addition to surface reflectance, back surface reflection, and transmission. Accordingly, a display that is resistant to counterfeiting can be provided.

When a display including a plurality of display elements and configured with the color developing structure 1 is used for a watch dial, it is possible to make a pattern or film thickness as well as reflectance and transmittance constant for each lot and uniform in a plane, compared to the case of using natural materials such as pearls, silver-lipped pearl oysters, and abalones. Accordingly, a variety of high quality patterns and color tones can be expressed, and a watch dial with high designability can be provided.

Further, a display using the color developing structure 1 maintains high reflectance and has optical transparency. This is preferred since it enables bright display of a lamp such as an LED in the dark.

More preferably, it is applicable to a watch dial having a self-power generating function such as a solar battery. The watch dial can be charged since it ensures a desired optical transparency to solar radiation while a cross shaped insulating strip is shielded. Although the display using an aspect of the color developing structure does not require an absorption layer, black or dark blue solar battery cells serve as an absorption layer so that scattered light increases. Accordingly, a high quality watch dial can be provided.

When a display including a plurality of display elements and configured with the color developing structure 1 is used for outdoor or indoor ornaments, or parts for moving objects or vehicles, which require weatherability, this display is preferred since discoloration due to sunlight hardly occurs compared with coatings or ink. More preferably, a display can be suitably used for automobile parts in general, such as automobile interior parts in view of reducing noticeability of dirt such as fingerprints, and automobile exterior parts in view of a self-cleaning function performed in the rain.

Figure 12:
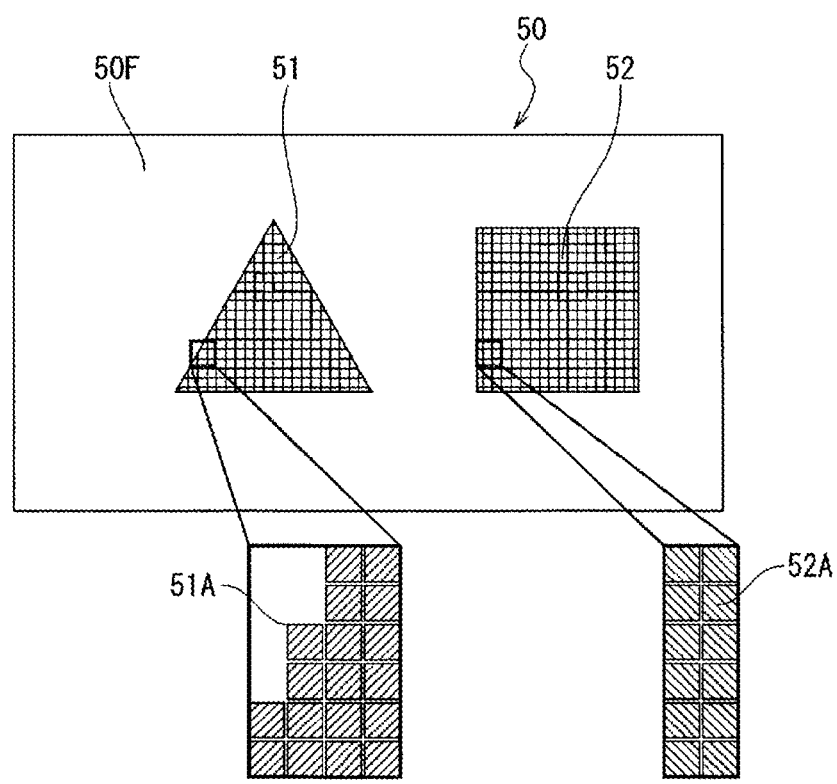
FIG. 12 is a plan view illustrating an embodiment of a display.

As shown in FIG. 12, a display 50 has a front surface 50F and a rear surface that is a surface opposite to the front surface 50F. The display body 50 includes a first display region 51 and a second display region 52 when viewed in a direction facing the front surface 50F. When the color developing structure of the second embodiment is used, display contents can be seen on both the front surface 50F and the rear surface.

The first display region 51 is a region in which a plurality of first pixels 51A are arranged, and the second display region 52 is a region in which a plurality of second pixels 52A are arranged. In other words, the first display region 51 is composed of a set of a plurality of first pixels 51A, and the second display region 52 is composed of a set of a plurality of second pixels 52A. The first pixels 51A and the second pixels 52A each have the configuration of the color developing structure, and the first pixels 51A and the second pixels 52A develop colors with different hues. That is, when viewed in the direction facing the front surface 50F of the display 50, colors with different hues are visible in the first display region 51 and the second display region 52.

Each of the first display region 51 and the second display region 52 expresses characters, symbols, graphics, patterns, designs, backgrounds thereof, etc., singly or in combination of two or more of these regions.

The display 50 may have, around the display regions 51 and 52, etc., a region having a configuration different from that of the color developing structure, for example, a region having a configuration in which the interference layer 31 is laminated on the substrate with a flat surface, or a region having a configuration in which the reflective layer 20 is laminated on the substrate.

When the color developing structure of the second embodiment is used, the height h1 of the convex portion 300a constituting the first pattern 201 included in the concave-convex layer 10 of the color developing structure 1 is different between the first pixel 51A and the second pixel 52A. On the other hand, the configuration of the interference layer 31 is common to the first pixel 51A and the second pixel 52A, that is, the material and film thickness of the high refractive index layer 31a, the material and film thickness of the low refractive index layer 31b, and the number of layers of these layers are the same. Since the height h1 of the convex portion 300a constituting the first pattern 201 is different between the first pixel 51A and the second pixel 52A, the first pixel 51A and the second pixel 52A develop colors with different hues. The height h1 of the convex portion 300a constituting the first pattern 201 in the first pixel 51A and the second pixel 52A may be set depending on the hue desired for each of the pixels 51A and 52A.

Figure 13:
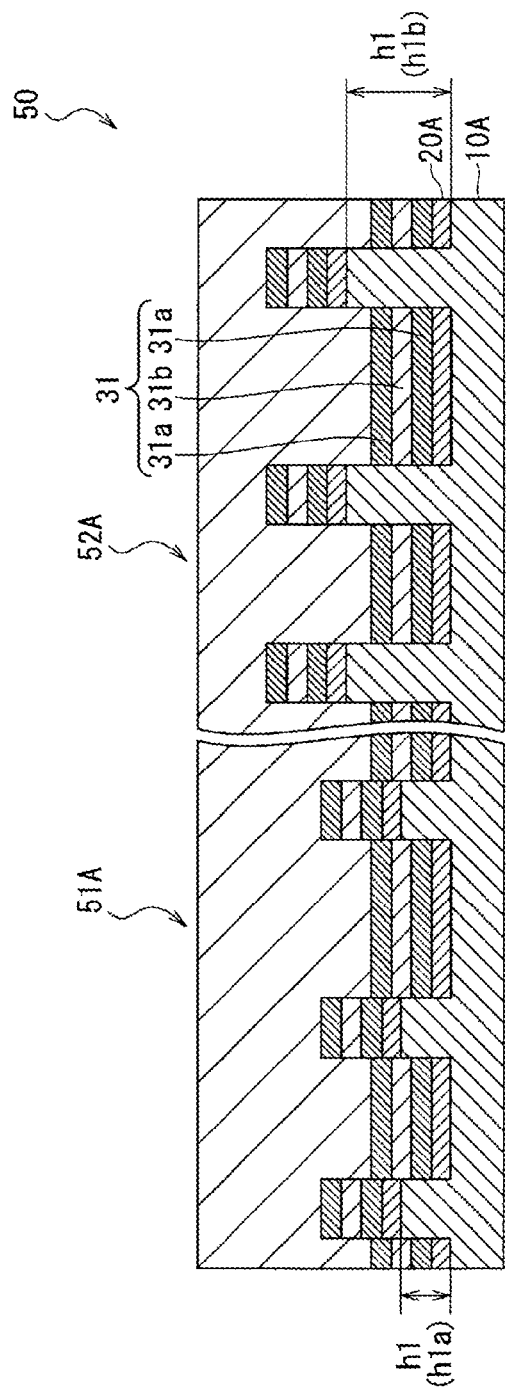
FIG. 13 is a cross-sectional view illustrating a first example of the display of FIG. 12 using the configuration of the first embodiment.
Figure 14:
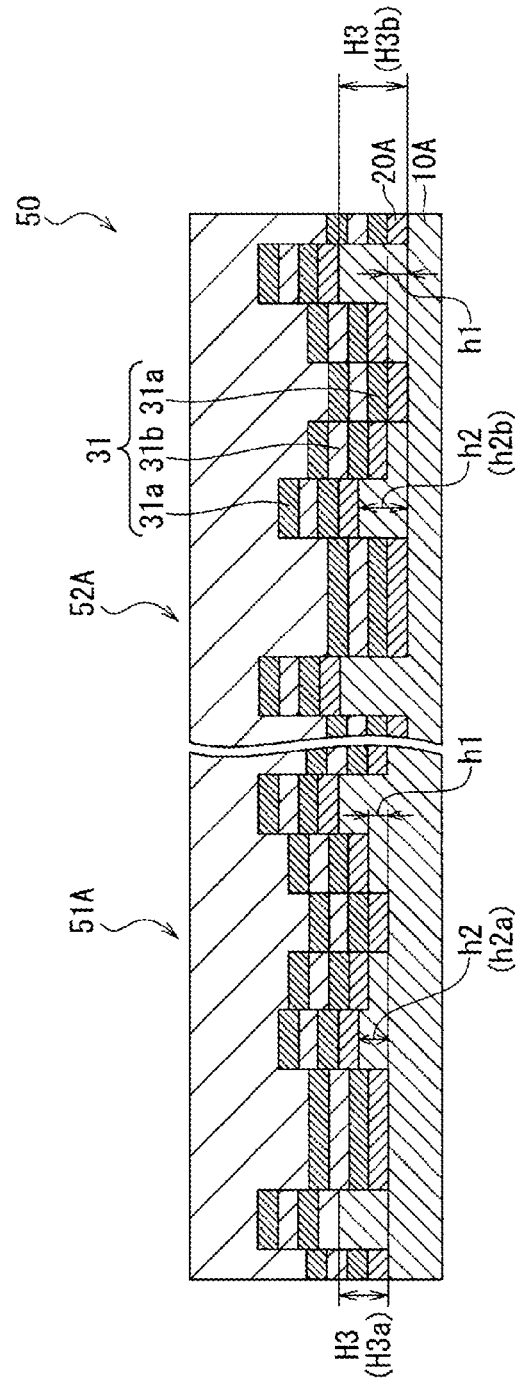
FIG. 14 is a cross-sectional view illustrating a second example of the display of FIG. 12 using the configuration of the first embodiment.

FIGS. 13 and 14 are views of the cross-sectional structures of the first pixel 51A and the second pixel 52A using the color developing structure of the first embodiment. FIG. 13 illustrates an example in which the color developing structure constituting these pixels 51A and 52A is a color developing structure having a single stage shape configuration. FIG. 14 illustrates an example in which the color developing structure constituting these pixels 51A and 52A is a color developing structure having a multi-stage shape configuration.

In the display of FIG. 13, the height h1 of the first pattern 12 is different between the first pixel 51A and the second pixel 52A. On the other hand, the configuration of the reflective layer 20 is common to the first pixel 51A and the second pixel 52A. That is, the material and film thickness of the high refractive index layer 31a, the material and film thickness of the low refractive index layer 31b, and the number of these layers are the same. Since the height h1 of the convex portion of the first pattern 12 is different between the first pixel 51A and the second pixel 52A, the first pixel 51A and the second pixel 52A exhibit colors with different hues. The height h1 of the convex portion of the first pattern 12 in each of the pixels 51A and 52A may be determined according to the hue desired for each of the pixels 51A and 52A.

The larger the difference between a height h1a of the convex portion of the first patterns 12 and 201 in the first pixel 51A and a height h1b of the convex portion of the first patterns 12 and 201 in the second pixel 52A, the larger the difference between the hue developed by the first pixel 51A and the hue developed by the second pixel 52A. As a result, the difference in hue is more likely to be recognized by the human eye.

When the color developing structure of the first embodiment is used, a difference between the height h1a and the height h1b is preferably 5 nm or more, and is preferably 1% or more of the peak wavelength of the light reflected by the reflective layer 20 when the interference layer 31 is disposed on a flat surface.

For example, when the peak wavelength of the light reflected by the reflective layer 20 which is disposed on a flat surface is 500 nm, and the pixel is intended to develop a green color, the height h1 of the convex portion of the first pattern 12 is preferably approximately 100 nm. When the pixel is intended to develop a red color, the height h1 of the convex portion of the first pattern 12 is preferably approximately 200 nm.

When the color developing structure of the second embodiment is used, the peak wavelength of the light reflected by the interference layer 31 when the interference layer 31 is disposed on a flat surface, for example, is preferably 500 nm. When the first pixel 51A and the second pixel 52A are intended to develop a green color, the height h1 of the convex portion 300a constituting the first pattern 201 is, preferably, 100 nm or approximately 100 nm. When the first pixel 51A and the second pixel 52A are intended to develop a red color, the height h1 of the convex portion 300a constituting the first pattern 201 is preferably approximately 200 nm.

In the display shown in FIG. 14, the height h1 of the first pattern is the same between the first pixel 51A and the second pixel 52A, whereas the height h2 of the second pattern is different. The relationship between a height h2a of the convex portion of the second pattern of the first pixel 51A and a height h2b of the convex portion of the second pattern of the second pixel 52A is h2a<h2b. Accordingly, in a height H3 of the convex portion in which the first pattern and the second pattern are overlapped with each other, a height H3b in the second pixel 52A is larger than a height H3a in the first pixel 51A.

Further, when the color developing structure applied to the pixels 51A and 52A is a color developing structure having a multi-stage shape, in a configuration in which the strip portions of the second pattern occupy a smaller area than the strip portions of the first pattern in the pattern formed by the projected image of the convex portions in the virtual plane, the effect of the height h2 of the strip portions of the second pattern on the hue exhibited by the pixels 51A and 52A is extremely small.

Therefore, in the color developing structure having a multi-stage shape shown in FIG. 14, it is also possible to adjust the hue exhibited by the pixels 51A and 52A by adjusting the height of the strip portions constituting the first pattern 12 of the first structure.

Further, when the color developing structure of the second embodiment is used, colors with different hues are seen in the first display region 51 and the second display region 52 when viewed in a direction facing the rear surface. Moreover, colors with different hues are seen due to light being transmitted through each of the first display region 51 and the second display region 52.

The first patterns 12 and 201 are set, for example, for each of the first pixel 51A and the second pixel 52A. That is, the average and standard deviation of the length d1 and length d2 in a plurality of strip portions constituting the pattern of the projected images of the first patterns 12 and 201 are set individually for each of the pixels 51A and 52A. The first patterns 12 and 201 may be the same or different between the pixels 51A and 52A. The size of the pixels 51A and 52A can be set depending on the desired resolution of images formed by the display regions 51 and 52. In order to display a more highly accurate image, each side of the pixels 51A and 52A is preferably 10 μm or more.

When the color developing structure of the first embodiment is used, the color seen when the display 50 is observed in a direction facing the front surface 50F and the color of light reflected by the reflective layer 20 are different, and thus the display 50 can provide a variety of expressions.

When the color developing structure of the second embodiment is used, the color seen in a direction facing the interference layer 31 in the display that uses the color developing structure 1 shown in FIG. 28 and the color seen in a direction facing the metal layer 65 are different, and thus the display 50 can provide a variety of expressions.

A lower part of the concave-convex layer 10 is continuous between the first pixel 51A and the second pixel 52A. That is, these pixels 51A and 52A have one common substrate.

The concave-convex structure is formed, for example, by performing lithography or dry etching on each of a portion corresponding to the first display region 51 in which the first pixels 51A are positioned, and a portion corresponding to the second display region 52 in which the second pixels 52A are positioned. The etching time can be modified to change the height h1 of the first patterns 12 and 201.

When the first display region 51 and the second display region 52 are in contact with each other, the reflective layer 20 and the interference layer 31 are each continuous between the first pixel 51A and the second pixel 52A.

The hues developed by the first pixel 51A and the second pixel 52A can be made different by making the material, film thickness, etc., of the layers that constitute the reflective layer 20 different between the first pixel 51A and the second pixel 52A. However, if the configurations of the reflective layer 20 are different between the display regions 51 and 52, it is necessary to repeat masking of the regions and film formation of the high refractive index layer 31a and the low refractive index layer 31b. Accordingly, the production steps become more complex. As a result, the production cost increases, and the yield decreases. Further, since masking of a fine region is difficult, there is a limit for formation of a precise image.

On the other hand, according to the configuration of the display 50, portions of the reflective layer 20 corresponding to the first display region 51 and the second display region 52 can be simultaneously formed. Accordingly, load for the production of the display 50 is reduced. Further, compared with masking of a fine region, it is easy to change the height h1 of the convex portions of the first patterns 12 and 201 for each of the fine regions. Accordingly, the display regions 51 and 52 can be reduced in size to form a more precise image.

When the color developing structure of the second embodiment is used, hues can also be made different by using other methods as described below. That is, the first pixel 51A and the second pixel 52A can be provided with the same configuration of the metal layer 65 and different arrangements of the concave-convex layer 10 to thereby exhibit different hues. That is, the first pixel 51A and the second pixel 52A are arranged in such a manner that the extending direction of the convex portion 301a of the concave-convex layer, for example the concave-convex layer 10, of the color developing structure 1 in the first pixel 51A differs from the extending direction of the convex portion 301a of the concave-convex layer, for example the concave-convex layer 10, of the color developing structure 1 in the second pixel 52A. For example, the convex portion 301a in the color developing structure 1 in each first pixel 51A in the display region 51 extends in the second direction, whereas the convex portion 301a in the color developing structure 1 in each second pixel 52A in the display region 52 extends in the first direction.

Accordingly, since the light is scattered in different directions, different brightness and thus different hues are seen between the adjacent pixels.

Further, the extending direction of the convex portion 301a is not limited to the first direction or the second direction, and can extend in any direction. For example, the convex portions 301a can be arranged in such a manner that an angle formed between the extending direction of the convex portion 301a of the color developing structure 1 in the first pixel 51A and the second direction is 45°. Thus, when the convex portions 301a are arranged in such a manner that an angle formed between the extending direction of the convex portion, for example the convex portion 301a, and the first direction or the second direction, is 00 or more and 90° or less, expression can be made different from that in the case where the convex portion 301a extends in the first direction or the second direction. Accordingly, a variety of expressions can be achieved.

Moreover, the first pixel 51A and the second pixel 52A can be provided with the same configuration of the metal layer 65 and different heights j1 or j2 of the convex portion of the concave-convex structure 62 or 63 of the antireflection layer 61 so that different hues of transmitted light as well as reflected light are exhibited. Further, in the concave-convex structure 62 of 63 of the antireflection layer 61, the ratio of the width of the periodicity of the convex portion to the width of the concave portion and the ratio of the width of the metal layer to the concave portion can be made different so that different hues of transmitted light as well as reflected light are exhibited.

In addition, when the color developing structure of the first embodiment is used, in order to make the first pixel 51A and the second pixel 52A exhibit different hues by having different heights h1 of the convex portion of the first pattern 12 while having the same configuration of the reflective layer 20, the reflective layer 20 is preferably formed as described below. That is, the reflective layer 20 is preferably configured such that the peak wavelength of the light reflected from the reflective layer 20 when the reflective layer 20 is disposed on a flat surface is between the wavelength of light with the hue developed by the first pixel 51A and the wavelength of light with the hue developed by the second pixel 52A.

When the color developing structure of the first embodiment is used, changing the height h1 of the convex portion of the first patterns 12 and 201 causes a change in the shape of the respective layers constituting the reflective layer 20 to thereby change the optical path length and a change in the wavelength range of light efficiently scattered by the concave-convex structure. Due to these phenomena, hues seen in the color developing structure can vary.

0009Moreover, when the configuration of the color developing structure, i.e., the configuration having the concave-convex layer 10 disposed on the substrate 9, is applied to the configuration of the pixels 51A and 52A, the concave-convex structure is formed, for example, in the following manner. That is, a mold is used in which the height of the concave-convex shape is changed between the portions corresponding to the display regions 51 and 52 by using a nanoimprint method, and the concave-convex structures of the concave-convex layer 10 of the pixels 51A and 52A are simultaneously formed.

Such a mold may be formed by performing lithography or dry etching on each of the portions corresponding to the display regions 51 and 52. Further, the mold can be more easily formed by the following method, for example. That is, the radiation dose of a charged particle beam applied to a resist used in charged particle beam lithography is changed for each of the display regions 51 and 52, and the developing time is adjusted so that a concave-convex shape with a desired height is formed in each of the display regions 51 and 52 to form a resist pattern. After a metal layer such as nickel is formed by electrocasting on the surface of the resist pattern, the resist is dissolved. Thus, a mold made of nickel is obtained.

The number of display regions in the display 50, that is, the number of display regions in which pixels configured from the color developing structure are arranged and develop colors with different hues, is not limited. The number of display regions may be one, or three or more. Further, the display region may include a display element configured from the color developing structure. The display element is not limited to a pixel that is the minimum repeating unit for forming a raster image, and may be a region formed by connecting anchor points for forming a vector image.

When a display including a plurality of display elements and configured from the color developing structure is used for a watch dial, it has high designability and ensures a desired optical transparency to a lamp such as LED or solar radiation. This is preferred since it enables a bright display in the dark and power derived from solar radiation can be stored in a solar battery.

A display including a plurality of display elements and configured from the color developing structure is more preferably used for automobile parts. This is preferred since it has high designability, and can be used as an exterior or interior part having high weatherability and antifouling properties.

When the color developing structure has the concave-convex structure, a diffusion effect of reflected light is obtained by the convex portion. Accordingly, light of a specific wavelength range is observed across a wide angular range as the reflected light from the reflective layer 20.

When the color developing structure has the concave-convex structure of a multi-stage shape, a diffusion effect and a diffraction effect of reflected light are obtained by the convex portion. Accordingly, light of a specific wavelength range can be observed across a wide angular range as the reflected light from the reflective layer 20, and glossy and vivid colors are seen since the intensity of the reflected light is increased.

In the configuration in which the color developing structure has the concave-convex structure of a multi-stage shape, and, in the second pattern formed of the projected image of the strip portions of the second pattern, when a plurality of strip portions are arranged in each of the first direction and the second direction in such a manner that at least one of the average and the standard deviation of the arrangement intervals of the strip portions is different between the arrangement intervals in the first direction and the arrangement intervals in the second direction, the diffraction effect of the reflected light produced by the strip portions of the second pattern can be adjusted according to the difference between the influence on the scattering effect of the reflected light from the strip portions of the first pattern in the first direction and the influence in the second direction. Further, in the configuration in which the average of the arrangement intervals in the first direction and the average of the arrangement intervals in the second direction in the strip portions are each 1 μm or more and 100 μm or less, the reflected light diffraction effect can be adjusted within a range in which the reflected light diffraction effect is suitably expressed.

When the color developing structure of the first embodiment is used, and, in the configuration in which the material and film thickness of respective layers constituting the reflective layer 20 are the same between the first pixel 51A and the second pixel 52A, and the height of the convex portions of the concave-convex layer is different between the first pixel 51A and the second pixel 52A in the display 50 having the pixels configured from the color developing structure, colors are seen with hues that are different between the region in which the first pixel 51A is located and the region in which the second pixel 52A is located. Since the reflective layer 20 in the first pixel 51A and the second pixel 52A have the same configuration, there is no need to form the reflective layer 20 for each of the region in which the pixel 51A is located and the region in which pixel 52A is located. Accordingly, the display 50 having the pixels 51A and 52A that exhibit hues different from each other can be produced by a simple production step.

When the color developing structure of the second embodiment is used, and, in the configuration in which the material and film thickness of the reflective layer 65 are the same between the first pixel 51A and the second pixel 52A, and the height of the convex portions of the concave-convex layer 10 is different between the first pixel 51A and the second pixel 52A in the display 50 having the pixels in which the color developing structure 1 includes the antireflection layer 61 having the metal layer 65, colors are seen with hues that are different between the region in which the first pixel 51A is located and the region in which the second pixel 52A is located. Since the metal layer 65 in the first pixel 51A and the second pixel 52A have the same configuration, there is no need to perform a step of forming the metal layer 65 for each of the region in which the pixel 51A is located and the region in which 52A is located. Accordingly, the display 50 having the pixels 51A and 52A that exhibit hues different from each other can be produced by a simple production step.

According to the method of producing the concave-convex structure of the concave-convex layer by nanoimprinting, a fine concave-convex structure can be produced in a suitable and simple manner. Further, according to a production method that uses photo-nanoimprinting or thermal nanoimprinting as the nanoimprinting method, formation of the concave-convex structure by nanoimprinting can be performed in a suitable and simple manner.

The pixels in the display 50 may include pixels in which the concave-convex structures in the concave-convex layers extend in different directions in the above virtual plane. Specifically, the second direction that is a direction in which the convex portion extends in any pixel and the second direction that is a direction in which the convex portion extends in a pixel different from the aforementioned pixel may be different from each other. For example, these directions may be perpendicular to each other. With such a configuration, the direction in which the reflected light from the reflective layer 20 is diffused can be changed for each of the pixels, and thus a variety of images can be expressed.

Since the reflective layer 20 is also formed on the side surface of the convex portion in the concave-convex layer, the width of the convex portion of the concave-convex structure in the reflective layer 20 is slightly wider than the width of the convex portion in the concave-convex layer. In a portion in which pixels whose concave-convex structures extend in different directions are adjacent to each other, portions extending as described above in the reflective layer 20 are connected between the convex portions extending in different directions. If the concave-convex structure of the reflective layer 20 is modified, desired color development in a desired direction is less likely to be obtained from each pixel. Therefore, a region in which the concave-convex shape is not formed in the concave-convex layer is preferably provided between the pixels whose concave-convex structures extend in different directions. Further, a region in which the concave-convex shape is not formed in the concave-convex layer may also be provided between the pixels whose concave-convex structures extend in the same direction. With this configuration, modification of the concave-convex structure caused by the spread of the reflective layer 20 is reduced at the end of the pixels so that desired color development from the entire pixels can be easily achieved. Preferably, the width of the region in which concave-convex shape is not formed provided between the pixels is, for example, ½ or more of the film thickness of the reflective layer 20.

The convex portions that constitute the concave-convex structure of the concave-convex layer may have a configuration in which the width in the first direction gradually decreases from the proximal end toward the distal end. With this configuration, the reflective layer 20 is easily formed on the convex portions. In this case, the length d1 and length d3 in the first direction are defined by the pattern formed by the bottom of the convex portion.

Effects and Others of First Embodiment

Next, effects and others in use of the color developing structure of the first embodiment will be described.

[Color Developing Structure of First Mode of First Embodiment]

In the case of the color developing structure having the first surface formed of a flat surface that is a light irradiation surface, and having a reflective layer, the intensity of specular reflected light is significantly large when light is radiated, and stimulation to the visual organ is large. Accordingly, metallic gloss, which is highly stimulating light, is seen.

On the other hand, the color developing structure of a first mode has a concave-convex structure on the first surface of the concave-convex layer, and a reflective layer having a shape extending along (a shape that follows) the surface shape of the concave-convex structure. Accordingly, in the color developing structure of the first mode, not only specular reflected light but also anisotropic scattered light is generated. As a result, according to the color developing structure of the first mode, directional light is seen without excessively stimulating the visual organ. The reason for this is that, unlike metal gloss, light can be seen in a wide angular range since anisotropic scattered light is included. The material for forming the reflective layer is preferably one or more of metals, metal alloys, and metal composites.

An interference layer formed extending along the surface shape of the concave-convex structure (in other words, an interference layer that follows the shape of the reflective layer that extends along the concave-convex structure) may be further provided on the reflective layer.

With this configuration, in the color developing structure of the first mode, not only interference light reflected by the interference layer, but also light transmitted through the interference layer is also reflected by the reflective layer, and is again seen as interference light due to the interference layer. Accordingly, the reflectance of light in a specific wavelength range become higher than the reflectance in other wavelength ranges, which is preferred since the visibility of light in a specific wavelength range is improved.

The material for forming the reflective layer is preferably one or more of metals, metal alloys, and metal composites having a refractive index in the visible light region of 0.2 or more and 5.0 or less.

With this configuration, when incident light is reflected, the intensity of specular reflection light and the intensity of scattered light generated at the interface between the reflective layer and the interference layer are both increased. The refractive index of the material forming the reflective layer is more preferably 1.4 or more and 3.0 or less.

The material for forming the reflective layer is preferably one or more of metals, metal alloys, and metal composites having an extinction coefficient in the visible light region of 2 or more and 6 or less.

This configuration is preferred since incident light is less absorbed by the reflective layer and is efficiently reflected.

The material for forming the reflective layer is preferably one or more of metals selected from Au, Ag, Cu, Al, Zn, Ni, Cr, Ge, Mo, Ga, Ta, W, In, and Sn, metal alloys thereof, and metal composites thereof. This configuration is preferred since the brightness of light reflected by the reflective layer increases. More preferably, the metal is Au, Ag, Cu, or Al.

The film thickness of the reflective layer is preferably in the range of 5 nm or more and 500 nm or less in order to ensure the intensity of the reflected light and scattered light. A film thickness in the range of 10 nm or more and 200 nm or less is more preferred to maintain a balance between optical transparency and an intended reflectance.

When the interference layer is a single layer, the phase of light emitted from the interference layer is reversed due to the thin film interference by the interference layer, and thus the above effect is achieved. Further, in the first mode, since the reflective layer is provided as an underlayer of the interference layer, the utilization efficiency of incident light can be increased for the same reason as described above. Therefore, the interference layer composed of a single layer is also preferred since good visibility can also be achieved. Further, high designability can be obtained without providing an absorption layer such as black pigment or carbon black in a layer on the concave-convex structure on a side opposite to an observer.

The material for forming the interference layer preferably includes compounds having a refractive index difference between the interference layer and the reflective layer in the range of 0.6 or more and 1.5 or less.

With this configuration, an interference effect between the interference layer and the reflective layer increases, and reflected light generated at the interface between the air and the interference layer also increases. The refractive index difference between the interference layer and the reflective layer is more preferably in the range of 1.0 or more and 1.5 or less.

The interference layer is preferably composed of two or more layers. With this configuration, multilayer film interference occurs, which increases the intensity of the reflected light of the incident light in a specific wavelength range, and the specific wavelength range can be easily controlled.

In a case where multilayer film interference is performed by a multilayer film according to prior art, the phase is reversed when light is incident from the high refractive index compound to the low refractive index compound in multilayer film interference. Although phase reversal also occurs in two layers, the intensity of the reflected light is small. In order to obtain a color that can be recognized by visual observation, it is necessary to laminate more than ten layers to hundreds of layers to cause multilayer film interference.

On the other hand, according to the first mode of the first embodiment, in which the interference layer composed of a multilayer film is provided on the reflective layer, there is no need of inducing interference by laminating tens of layers. Accordingly, visibility achieved in about two layers is similar to that achieved in more than ten layers.

When a multilayer film is laminated as the interference layer, the interference layer is preferably 1 layer or more and 6 layers or less, and more preferably 2 layers or more and 4 layers or less. Since the reflective layer is provided, the number of layers of the interference layer can be set to this range, and, with the interference layer having a small number of layers, the intensity of light by multilayer film interference can be ensured, and thus good visibility can be obtained.

The material for forming the interference layer preferably includes one or more of a titanium compound, niobium compound, and silicon compound, but is not limited thereto. Since this configuration also functions as a protective layer for protecting the reflective layer, scratch resistance is improved. The interference layer is a thin film layer that follows the fine concave-convex structure. By virtue of the protective layer, dirt attached to the layer can be easily wiped off, and thus an antifouling effect is improved. In addition, when a multilayer film is applied to the interference layer, a layer on the multilayer film on a side facing away from the reflective layer is preferably provided as the protective layer described above.

The interference layer preferably includes a layer composed of a compound having a refractive index of 1.4 or more and 5.0 or less as a layer at the interface with the air. With this configuration, the phase of light incident on the interference layer from the air is reversed, and thus the interference effect to the light emitted from the interference layer is enhanced.

The film thickness of the interference layer is preferably in the range of 5 nm or more and 2000 nm or less. With this configuration, low cost production is possible since the film thickness of the interference layer is small. The film thickness of the interference layer is more preferably in the range of 5 nm or more and 1000 nm or less, since the interference effect is further enhanced.

[Color Developing Structure of Second Mode of First Embodiment]

The color developing structure of a second mode of the first embodiment differs from the first mode in that the reflective layer is disposed on the second surface, which is a surface opposite to the first surface of the concave-convex structure.

In the color developing structure of the second mode of the first embodiment, light that has been transmitted through the interference layer without being reflected is transmitted through the concave-convex layer. Since the reflective layer is provided on the second surface, the light which has been transmitted through the concave-convex layer is reflected by the reflective layer, and again enters the interference layer. As a result, the transmitted light can be reused as interference light. Accordingly, the reflectance of light in a specific wavelength range become higher than the reflectance in other wavelength ranges, and the visibility of light in a specific wavelength range is improved. Further, a flat region on which the concave-convex structure is not formed can be used as an interference layer by adjusting the thickness of the concave-convex layer (thickness between the first surface and the second surface). As a result, in the color developing structure of the second mode, thin film interference can be generated without providing the interference layer. Further, when the multilayer film as described above is provided as the interference layer, the number of layers of the multilayer film can be reduced.

The thickness between the first surface and the second surface of the concave-convex layer is preferably in the range of 20 nm or more and 1000 nm or less. More preferably, the thickness is in the range of 80 nm or more and 800 nm or less. When the thickness is within this range, the flat region can be used as one of layers constituting the interference layer so that interference light can be effectively obtained.

Further, the material for forming the concave-convex layer preferably includes composites having a refractive index in the visible light region of 1.4 or more and 3.0 or less, or composites containing an inorganic compound having an extinction coefficient of 2 or more and 6 or less. With this configuration, the thin film interference effect is increased in the concave-convex layer and the reflective layer. More preferably, the material for forming the concave-convex layer has a refractive index in the visible light region of 1.5 or more and 3.0 or less.

[Color Developing Structure of Third Mode of First Embodiment]

In the color developing structure of a third mode of the first embodiment, the convex surface of the concave-convex structure has a multi-stage shape including a first pattern and a second pattern which is at least partially superimposed on the first pattern in plan view in the color developing structure of the first mode. Further, the second pattern is composed of a plurality of second strip portions in plan view, and the second strip portion has a width in the first direction and a length in the second direction which is perpendicular to the first direction. An arrangement interval of the plurality of second strip portions in the first direction is not constant, and an average of the arrangement intervals is ½ or more of the minimum wavelength in the wavelength ranges of incident light.

With this configuration, a diffusion effect and a diffraction effect of reflected light are obtained by the convex portion of the concave-convex structure. Accordingly, light of a specific wavelength range is observed across a wide angular range as the reflected light from the color developing structure. Furthermore, with this configuration, the intensity of the reflected light is increased, and thus glossy and vivid colors are seen.

Further, in a virtual plane in which the concave-convex structure is projected in the thickness direction of the concave-convex layer, a pattern formed of the projected image of the convex portions in the virtual plane may be a pattern composed of a plurality of strip portions, and the height of the convex portions constituting the concave-convex structure may be constant. With this configuration, different heights of the concave-convex shapes enhance the scattered light, but reduce the reflected light and thus decrease the visible contrast of colors.

In the second pattern, the plurality of strip regions (second strip portions) may be arranged in each of the first direction and the second direction, and at least one of the average and the standard deviation of the arrangement intervals of the strip portions may be different between the arrangement intervals in the first direction and the arrangement intervals in the second direction.

0013With this configuration, the diffraction effect of light by the strip portions of the second pattern can be adjusted depending on the difference between the influence of the scattering effect on the light by the strip portions of the first pattern in the first direction and the influence in the second direction.

In the second pattern, the plurality of strip portions (second strip portions) may be arranged in each of the first direction and the second direction, and in the plurality of strip portions, an average of the arrangement intervals of the strip portions in the first direction and an average of the arrangement intervals of the strip portions in the second direction may be 1 μm or more and 100 μm or less.

With this configuration, the diffraction effect of light by the strip portions of the second pattern can be adjusted depending on the difference between the influence on the scattering effect of the light by the strip portions of the first pattern in the first direction and the influence in the second direction, and the diffraction effect of the reflected light described above can be adjusted within the range in which the diffraction effect of the reflected light is suitably expressed.

The color developing structure of the first embodiment, which is exemplified in the first to third modes, can constitute a display element of a display that includes, for example, a plurality of display elements, and has a front surface and a rear surface.

The color developing structure of the first embodiment may include a functional layer such as light absorption layer, a protective layer, or an adhesive layer as necessary on one side or on the other side of the color developing structure. With this configuration, color development suitable for observation of the display is achieved. Further, the display including the color developing structure can be suitably attached to an adherend for decoration or the like.

The display including the plurality of display elements and configured from the color developing structure of the first embodiment can be used as a watch dial. In this case, it is possible to make a pattern or film thickness as well as reflectance constant for each lot and uniform in a plane, compared to the case of using natural materials such as pearls, silver-lipped pearl oysters, and abalones. Further, a variety of high quality patterns and color tones can be expressed. As a result, a watch dial with high designability can be provided.

Further, the display using the color developing structure of the first embodiment includes the reflective layer, and thus has an improved reflectance. Accordingly, the display using the color developing structure of the first embodiment can produce a display brighter than the conventional art when illuminating a lamp such as an LED in the dark.

More preferably, the above display is a watch dial having a self-power generating function such as solar battery. The display using the color developing structure of the first embodiment can be charged since it ensures a desired optical transparency to solar radiation while a cross shaped insulating strip is shielded. Although the display using the color developing structure of the present embodiment does not require an absorption layer, black or dark blue solar battery cells serve as an absorption layer so that scattered light increases. Accordingly, a high quality watch dial can be provided.

The display including a plurality of display elements and configured with the color developing structure of the first embodiment may be used for outdoor or indoor ornaments, or parts for moving objects or vehicles, which require weatherability. In this case, discoloration due to sunlight hardly occurs compared with coatings or ink. More preferably, the display can be suitably used for interior automobile parts in view of reducing noticeability of dirt such as fingerprints. Further, the display can be suitably used for automobile parts in general, such as exterior automobile parts in view of the self-cleaning function performed in the rain.

The display can include a plurality of the display elements in a plane, and two display elements selected from the plurality of the display elements, that is, a first display element and a second display element, constitute color developing structures having layer configurations which are the same in material and film thickness and different in height of a convex portion of the concave-convex structure.

According to the display of this form, the first display element and the second display element exhibit colors with different hues, so the hues seen in the first display region in which the first display element is located and the second display region in which the second display element is located are different from each other. Since the first display element and the second display element have the same configuration of the color developing structure, there is no need to form the color developing structure layer for each of the display regions. Accordingly, the display having the display regions that exhibit hues different from each other can be produced by a simple production step.

Three or more display elements may be selected from the plurality of the display elements, and the color developing structures of the selected displays may have layer configurations which are the same in material and film thickness and different in height of a convex portion of the concave-convex structure.

A method for producing the color developing structure of the first embodiment may include a step (first step) of forming the concave-convex structure by transferring a concave-convex pattern of an intaglio plate to a resin by nanoimprinting. After the first step, a second step of forming a reflective layer on one surface of the concave-convex layer is performed. Further, a third step of forming an interference layer on the reflective layer or the concave-convex structure is performed as necessary. The reflective layer is configured such that the reflectance to light in a specific wavelength range of the incident light entering the color developing structure layer is higher than the reflectance in other wavelength ranges. The interference layer is formed so that interference occurs in the specific wavelength range of the reflected light from the reflective layer.

The above production method is preferred since the concave-convex structures are collectively formed in a desired area by nanoimprinting, and thus a fine concave-convex structure can be produced in a suitable and simple manner.

Further, it is preferred to use the color developing structure of the second mode of the first embodiment since the concave-convex structure and the flat region can be simultaneously formed by nanoimprinting.

In the above method, the nanoimprinting is more preferably photo-nanoimprinting or thermal nanoimprinting.

When the concave-convex layer is disposed on the substrate such as a film or when the concave-convex layer per se has a thickness to some extent, the production method is more preferably a method suitable for mass production such as a roll-to-roll method.

In order to impart mechanical strength such as tensile strength and functions such as formability to the color developing structure, the concave-convex layer may be formed on a substrate having a predetermined thickness. Since the thickness of the concave-convex layer can be reduced and low cost production can be achieved by using the substrate, and the material required for the application can be selected as the substrate, it is possible to improve the degree of freedom of the display. In order to impart bendability and flexibility, plastics such as photocurable resin, thermosetting resin, and thermoplastic resin are used. Further, inorganic materials such as glass, quartz, and silicon wafers, and metal plates can also be used as the substrate.

Since the display of the first embodiment has good color development properties and exhibit anisotropic scattering, a display having high designability can be provided. Since the display of the first embodiment can be formed on a substrate made of photocurable resin, thermosetting resin, or thermoplastic resin, the degree of freedom and utilization as a display can be increased. Due to high flexibility, production methods suitable for mass production, such as roll-to-roll, can be applied. Compared with a multilayer film in which tens or hundreds of layers are laminated, the cost can be reduced in terms of material and equipment, and thus inexpensive displays can be provided.

Effects and Others of Second Embodiment

Next, effects and others in use of the color developing structure of the second embodiment will be described.

As described above, the color developing structure 1 according to the second embodiment includes the interference layer 31 having a surface shape that follows the concave-convex structure of the concave-convex layer 10 on the concave-convex layer 10 that transmits light in the visible region and has the concave-convex structure, and the antireflection layer 61 on a surface of the concave-convex layer 10 on a side facing away from the interference layer 31 so as to absorb at least part of light transmitted through the interference layer 31. Further, the concave-convex layer 10 includes a plurality of first patterns 201 constituting the convex portion, and the first pattern 201 has a shape of one or a combination of a plurality of strip patterns Po. The width of the strip pattern Po in the first direction is smaller than the wavelength of incident light, and the standard deviation of the lengths in the direction perpendicular to the first direction is larger than the standard deviation of the widths of the strip pattern Po.

Therefore, in the second embodiment, thin film interference or multilayer film interference is caused by the interference layer 31 to exhibit the effect of phase reversal of the emitted light. When the light of the specific wavelength is reflected by the interference layer 31 having a surface shape that follows the concave-convex structure of the concave-convex layer 10, not only specular reflected light but also anisotropic scattered light is generated. As a result, light of the same wavelength range, that is, the same color can be seen in a wide angular range. In the conventional configuration in which the multilayer film is formed on a flat surface, the intensity of the specular reflected light is significantly large, and colors change depending on the observation angle. However, according to the color developing structure 1 of the second embodiment, a viewing angle can be increased.

Further, in the case where the antireflection layer 61 is not provided, due to the light that has been transmitted without being reflected by the interference layer 31, or the light entering from a surface which is opposite to the interference layer 31 (rear surface), the visibility of the color of light reflected by the interference layer 31 in the specific wavelength range is reduced. However, in the color developing structure 1 of the second embodiment, in which the antireflection layer 61 is provided, it is possible to absorb unnecessary light. As a result, reflected light in the specific wavelength range can be highly visible.

Here, the antireflection layer 61 is provided on a surface of the substrate 60 on a side facing away from the concave-convex layer 10. Further, the height in the film thickness direction of the concave-convex structure 62 or 63 included in the antireflection layer 61 is 10 nm or more and 500 nm or less, and the concave-convex structure 62 or 63 can be designed as an irregular arrangement, or either one of a square arrangement and a hexagonal arrangement, or an island-like arrangement formed by combining these. Further, the structure periodicity of the concave-convex structure 62 or 63 may be 10 nm or more and 1000 nm or less, and the ratio of the width of the periodicity of the concave-convex structure to the concave portion of the concave-convex structure 62 or 63 may be 0.25 or more and 0.75 or less.

Thus, since the antireflection layer 61 is formed of the concave-convex structure having the plurality of convex portions with the height of 10 nm or more and 500 nm or less, a low reflection effect can be obtained by a moth-eye structure. As a result, unnecessary light can be reduced, and the reflected light in the specific wavelength range reflected by the interference layer 31 can be highly visible. Further, when the antireflection layer 61 of the color developing structure 1 is bonded or adhered to another display, a contacting surface area is increased due to the plurality of concave-convex structures 62 or 63, and adhesiveness is increased.

Further, the concave-convex structure 62 or 63 is formed on the surface on a side facing away from the concave-convex layer 10, and the height of the concave-convex structure 62 or 63 in the film thickness direction is in the range of 10 nm or more and 200 nm or less. The concave-convex structures 62 and 63 are arranged in an irregular arrangement, or either one of a square arrangement and a hexagonal arrangement, or an island-like arrangement formed by combining these. Further, the metal layer 65 is formed on the upper surface of the concave portion and the convex portion of the concave-convex structures 62 and 63. The structure periodicity of the concave-convex structures 62 and 63 and the metal layer 65 may be a subwavelength periodicity, which is less than the wavelength of the visible region, and the ratio of the width of the periodicity of the concave-convex structure to the concave portion of the concave-convex structures 62 and 63 and the ratio of the width of the metal layer to the concave portion of the metal layer 65 may be 0.25 or more and 0.75 or less.

According to this configuration, a plasmon resonance phenomenon occurs. That is, since light that has been transmitted through the interference layer 31 is transmitted through the antireflection layer 61 due to the plasmon resonance phenomenon, it is possible to reduce unnecessary light from being reflected toward the interference layer 31. As a result, the reflected light in the specific wavelength range reflected by the interference layer 31 can be highly visible. Moreover, when the color developing structure 1 is observed in a direction facing the antireflection layer 61, which is the rear surface, a wavelength range different from that of the interference layer 31, which is the front surface, can be observed due to the plasmon resonance phenomenon. Therefore, a color developing structure 1 that exhibits three colors due to the front surface reflected light, rear surface reflected light, and transmitted light can be obtained.

Further, when the antireflection layer 61 of the color developing structure 1 is bonded or adhered to another display 50, a contacting surface area is increased due to the concave-convex structure having the plurality of convex portions, and adhesiveness is increased.

Further, in the color developing structure 1, the material constituting the metal layer 65 may be one or more of metals, metal alloys, and metal composites having a refractive index in the visible light region of 0.2 or more and 6.0 or less, and metals, metal alloys, and metal composites having an extinction coefficient in the visible light region of 2.0 or more and 6.0 or less.

With this configuration, when observed in a direction facing the rear surface, incident light is less absorbed and is efficiently reflected.

Further, in the color developing structure 1, the antireflection layer 61 may include a black pigment.

With this configuration, it is possible to reduce unnecessary light from being reflected toward the interference layer 31. As a result, the reflected light in the specific wavelength range reflected by the interference layer 31 can be highly visible.

Further, in the color developing structure 1, the concave-convex layer 10 has a multi-stage shape in which the second pattern 211 composed of a plurality of convex portions are disposed on the first pattern 201. A plurality of second patterns 211 are provided in plan view, and the second pattern 211 has a width in the first direction and a length in the second direction. An arrangement interval of the second pattern 211 in the first direction is not constant, and an average of the arrangement intervals is set to ½ or more of the minimum wavelength in the wavelength ranges of incident light.

Accordingly, a diffusion effect and a diffraction effect of reflected light are obtained by the convex portions of the concave-convex structure composed of the first pattern 201 and the second pattern 211, and the reflected light of a wide wavelength range is emitted from the color developing structure 1 while scattered light is emitted in a wide angular range. Therefore, glossy and vivid colors can be seen. Further, colors are recognized as the same colors even if the observation angle is changed, and the viewing angle can be widened.

Moreover, in the color developing structure 1, one of materials forming the interference layer 31 may include one or more compounds including an inorganic substance or an inorganic composite material having a refractive index of 1.3 or more and 4.0 or less.

With this configuration, when the interference layer 31 includes a layer made of a compound having a refractive index of 1.3 or more and 4.0 or less as a layer at the interface with the air, the phase of light incident on the interference layer 31 from the air is reversed, and thus the interference effects on the light emitted from the interference layer 31 are enhanced.

In the color developing structure 1, the interference layer 31 has a multilayer film configuration in which a high refractive index compound and a low refractive index compound are alternately laminated, and a refractive index difference between the high refractive index compound and the low refractive index compound is in a range of 0.6 or more and 2.2 or less.

Due to the refractive index difference between the high refractive index compound and the low refractive index compound in a range of 0.6 or more and 2.2 or less, the reflectance of light in a specific wavelength range become higher than the reflectance in other wavelength ranges, and the visibility of light in a specific wavelength range is improved.

Further, since the display 50 includes the display element configured from the color developing structure 1, a display having improved visibility of light in a specific wavelength range can be provided.

The display 50 may be configured to include a plurality of display elements in a plane, and two color developing structures constituting the first display element and the second display element included in the plurality of display elements may have layer configurations which are the same in material and film thickness and different in height of a convex portion of the concave-convex structure of the antireflection layer 61.

With this configuration, the first display element and the second display element exhibit colors with different hues, so the hues seen in the first display region in which the first display element is located and the second display region in which the second display element is located are different from each other. Since the first display element and the second display element have the same configuration of the color developing structure, there is no need to form the color developing structure layer for each of the display regions. Accordingly, the display having the display regions that exhibit hues different from each other can be produced by a simple production step.

0014A display including the display element configured from the color developing structure, which uses plasmon resonance phenomenon, is provided. The display includes a plurality of display elements in a plane, and two color developing structures constituting the first display element and the second display element included in the plurality of display elements have layer configurations which are the same in material and film thickness. However, the display may also be configured such that the convex portions of the concave-convex layer 10 have different heights or the concave-convex portions of the concave-convex structures 62 and 63 have different structures.

With this configuration, on the interference layer (front surface), the first display element and the second display element exhibit colors with different hues, so the hues seen in the first display region in which the first display element is located and the second display region in which the second display element is located are different from each other. Further, on the rear surface, the absorption wavelength range due to a plasmon resonance phenomenon can be changed since the concave-convex portions of the concave-convex structures 62 and 63 have different structures. As a result, colors with different hues can be seen in each of the display regions on the front and rear surfaces.

A method for producing the color developing structure 1 may include a step of forming the concave-convex structures 62 and 63 by transferring a concave-convex pattern of an intaglio plate to a resin by nanoimprinting. By using this production method, the concave-convex structures are collectively produced in a desired area by nanoimprinting, and thus a fine concave-convex structure can be produced in a suitable and simple manner.

EXAMPLES

0015The method of producing the color developing structure and the display including the color developing structure described above will now be described using specific examples.

First Example

First, first examples corresponding to the first embodiment will be described.

The first example is an example in which the functional layer is configured by the reflective layer as in the first embodiment.

Example 1-1

Example 1-1 is a display in which a color developing structure is applied to pixels. The pixels of the display of Example 1-1 are constituted from a color developing structure in which a concave-convex structure having a single stage shape configuration is formed on a substrate.

First, a mold was prepared as an intaglio plate used in a photo-nanoimprint method. Specifically, because light at a wavelength of 365 nm was used as the light irradiated in the photo-nanoimprint method, synthetic quartz capable of transmitting light at this wavelength was used as the material of the mold. In the formation of the mold, a film made of chromium (Cr) was first formed by sputtering on the surface of a synthetic quartz substrate, and an electron beam resist pattern was formed on the Cr film by electron-beam lithography.

The pattern thus formed was a pattern including a set of a plurality of strip portions shown in FIGS. 17A and 17B.

Each pixel region was a square with a side of 130 mm. The length of the above strip portions in the first direction was 380 nm, and the length of the above strip portions in the second direction was a length selected from a normal distribution with an average of 2400 nm and a standard deviation of 580 nm. In the above pattern, the plurality of strip portions were arranged so that they were not overlapped with each other in the first direction. The resist used was a positive type, and the film thickness was set to 200 nm.

Next, the Cr film in the region exposed from the resist was etched with plasma generated by applying a high frequency to a gas mixture of chlorine ($Cl_2$) and oxygen ($O_2$). Subsequently, the synthetic quartz substrate in the region exposed from the resist and the Cr film was etched with plasma generated by applying high frequency to hexafluoroethane gas. The depth of the synthetic quartz substrate etched in this manner was 70 nm. The remaining resist and Cr film were removed, thereby obtaining a mold in which a concave-convex structure was formed.

Subsequently, Optool HD-1100 (produced by Daikin Industries, Ltd.) was applied as a mold release agent to the surface of the mold. Then, a photocurable resin (PAK-02, produced by Toyo Gosei Co., Ltd.) was applied to the surface of a synthetic quartz wafer used as a substrate. The surface of the mold on which the concave-convex pattern was formed was pressed against the resin, and light at 365 nm was applied to the rear surface of the mold. After the photocurable resin was cured by irradiation with this light, the synthetic quartz wafer and the resin layer were removed from the mold. Thus, a synthetic quartz wafer was obtained in which the resin layer having a concave-convex structure was laminated.

Subsequently, the synthetic quartz wafer was etched with plasma using $O_2$ gas to remove the photocurable resin remaining in the concave portions of the concave-convex structure. In this process, 40 sccm of $O_2$ gas was introduced to provide a plasma during discharge. Next, etching with plasma using a gas mixture of octafluorocyclobutane ($C_4F_8$) and argon (Ar) was carried out to transfer the concave-convex structure of the resin layer to the synthetic quartz wafer. In this process, 40 sccm of $C_4F_8$ gas and 60 sccm of Ar gas were introduced. After the pressure in the plasma chamber was set to 5 mTorr, 75 W of RIE power and 400 W of ICP power were applied to discharge the plasma. The height of the convex portions in the concave-convex structure formed on the synthetic quartz wafer was set to 100 nm.

Next, organic cleaning was carried out using a mixture of dimethyl sulfoxide and monoethanolamine (7:3) (ST-105, produced by Kanto Chemical Co., Inc.), and acid cleaning was carried out using a mixed aqueous solution comprising sulfuric acid and aqueous hydrogen peroxide as basic components (SH-303, produced by Kanto Chemical Co., Inc.), thereby obtaining a synthetic quartz wafer, which was a substrate having a concave-convex structure of the first structure.

Next, an Al film having a film thickness of 50 nm as a reflective layer and a $TiO_2$ film having a film thickness of 200 nm as a thin film layer were sequentially formed by vacuum deposition on the surface of the synthetic quartz wafer having the concave-convex structure to thereby form a color developing structure layer.

Example 1-2

Example 1-2 is a display in which a color developing structure is applied. The display of Example 1-2 is constituted from a color developing structure layer in which a concave-convex layer having a concave-convex structure, a reflective layer, and a thin film layer are formed on a substrate.

First, a mold was prepared as an intaglio plate used in a photo-nanoimprint method. Specifically, because light at a wavelength of 365 nm was used as the light irradiated in the photo-nanoimprint method, synthetic quartz capable of transmitting light at this wavelength was used as the material of the mold. In the formation of the mold, a film made of chromium (Cr) was first formed by sputtering on the surface of a synthetic quartz substrate, and an electron beam resist pattern was formed on the Cr film by electron-beam lithography.

The pattern thus formed was a first pattern including a set of a plurality of strip portions shown in FIGS. 17A and 17B. The length (width) of the above strip portions in the first direction was 300 nm, and the length of the above strip portions in the second direction was a length selected from a normal distribution with an average of 2000 nm and a standard deviation of 500 nm. In the above pattern, the plurality of strip portions were arranged so that they were not overlapped with each other in the first direction. The resist used was a positive type, and the film thickness was set to 200 nm.

Next, the Cr film in the region exposed from the resist was etched with plasma generated by applying high frequency to a gas mixture of chlorine ($Cl_2$) and oxygen ($O_2$). Subsequently, the synthetic quartz substrate in the region exposed from the resist and the Cr film was etched with plasma generated by applying high frequency to hexafluoroethane gas. The depth of the synthetic quartz substrate etched in this manner was 70 nm. The remaining resist and Cr film were removed, thereby obtaining a synthetic quartz substrate in which a concave-convex structure corresponding to the first structure was formed.

Next, a film made of Cr was formed by sputtering on the surface of the synthetic quartz substrate in which the above concave-convex structure was formed, and an electron beam resist pattern was formed on the Cr film by electron-beam lithography. The pattern thus formed was a second pattern including a plurality of strip portions shown in FIGS. 18A and 18B. The length (width) of the above strip portions in the first direction was 200 nm, and the arrangement interval of the above strip portions in the first direction had an average of 2000 nm and a standard deviation of 500 nm. The electron beam resist used was a positive type, and the film thickness was set to 200 nm.

Next, the Cr film in the region exposed from the resist was etched with plasma generated by applying high frequency to a gas mixture of chlorine ($Cl_2$) and oxygen ($O_2$). Subsequently, the synthetic quartz substrate in the region exposed from the resist and the Cr film was etched with plasma generated by applying high frequency to hexafluoroethane gas. The depth of the synthetic quartz substrate etched in this manner was 65 nm. After the remaining resist and Cr film were removed, Optool HD-1100 (produced by Daikin Industries, Ltd.) was applied as a mold release agent to the surface of the synthetic quartz substrate. The mold in which a concave-convex structure corresponding to the second structure was formed was obtained in this manner.

Next, a photocurable resin (PAK-02, produced by Toyo Gosei Co., Ltd.) was applied to one surface of a polyester film, which was subjected to easily-adhesive treatment (Cosmoshine A4100, produced by Toyobo Co., Ltd.). The surface of the mold on which the concave-convex structure was formed was pressed against the resin, and light at 365 nm was applied to the rear surface of the mold. After the photocurable resin was cured by irradiation with this light, the polyester film and the concave-convex layer were removed from the mold. Thus, the polyester film, which was a substrate on which a concave-convex layer having the concave-convex structure composed of the first strip shape structure and the second strip shape structure was laminated, was obtained.

Next, an Al film having a film thickness of 50 nm as a reflective layer and a $TiO_2$ film having a film thickness of 200 nm as a high refractive index layer were sequentially formed by vacuum deposition on the surface having the concave-convex structure of the obtained laminate of the substrate and the concave-convex layer to thereby form a color developing structure layer.

In a batch different from that described above, an Al film having a film thickness of 50 nm as a reflective layer, a $TiO_2$ film having a film thickness of 80 nm as a high refractive index layer, a $SiO_2$ film having a film thickness of 70 nm as a low refractive index layer, and a $TiO_2$ film having a film thickness of 150 nm as a high refractive index layer were sequentially formed by vacuum deposition on the surface having the concave-convex structure of the obtained laminate of the substrate and the concave-convex layer to thereby form a color developing structure layer.

Example 1-3

In a batch different from that described above, a $TiO_2$ film having a film thickness of 80 nm as a high refractive index layer and a $SiO_2$ film having a film thickness of 70 nm as a low refractive index layer were sequentially formed by vacuum deposition on the surface having the concave-convex structure of the obtained laminate of the substrate and the concave-convex layer to thereby form an interference layer. Then, an Al film having a film thickness of 50 nm as a reflective layer was formed by vacuum deposition on the surface different from the concave-convex layer to thereby form a color developing structure layer.

Example 1-4

0017In a batch different from that described above, a $SiO_2$ film having a film thickness of 70 nm as a low refractive index layer and a $TiO_2$ film having a film thickness of 80 nm as a high refractive index layer were sequentially formed by vacuum deposition on the surface having the concave-convex structure of the obtained laminate of the substrate and the concave-convex layer to thereby form an interference layer. Then, an Al film having a film thickness of 50 nm as a reflective layer was formed by vacuum deposition on the surface having the concave-convex structure to thereby form a color developing structure layer.

Second Example

First, second examples corresponding to the second embodiment will be described.

The second example is an example in which the functional layer is configured by the antireflection layer as in the second embodiment.

The method of producing the color developing structure 1 and the display 50 including the color developing structure described above will now be described using specific examples.

Example 2-1

Example 2-1 is a display 50 including a color developing structure 1. The display 50 of Example 2-1 includes the color developing structure 1 that includes a concave-convex layer 10 formed on one surface of the substrate 60 and having a concave-convex structure of a multi-stage shape, an interference layer 31 formed on the concave-convex layer 10 and having a concave-convex structure in which a concave-convex pattern is repeated along the concave-convex structure of the concave-convex layer 10, and an antireflection layer 61 formed on the other surface of the substrate 60 and having a concave-convex structure 62 as the antireflection layer 61.

First, a mold was prepared as an intaglio plate used in a photo-nanoimprint method. Specifically, because light at a wavelength of 365 nm was used as the light irradiated in the photo-nanoimprint method, synthetic quartz capable of transmitting light at this wavelength was used as the material of the mold.

In the formation of the mold, a film made of chromium (Cr) was first formed by sputtering on the surface of a synthetic quartz substrate, and an electron beam resist pattern was formed on the Cr film by electron-beam lithography. The pattern thus formed was a pattern including a set of a plurality of first patterns 201 shown in FIGS. 16A and 16B. The length d1 of the first patterns 201 in the first direction was 300 nm, and the length d2 of the first patterns 201 in the second direction was a length selected from a normal distribution with an average of 2000 nm and a standard deviation of 500 nm. In the above pattern, the plurality of first patterns 201 were arranged so that they were not overlapped with each other in the first direction. The resist used was a positive type, and the film thickness was set to 200 nm.

Next, the Cr film in the region exposed from the resist was etched with plasma generated by applying high frequency to a gas mixture of chlorine ($Cl_2$) and oxygen ($O_2$). Subsequently, the synthetic quartz substrate in the region exposed from the resist and the Cr film was etched with plasma generated by applying high frequency to hexafluoroethane gas. The depth of the synthetic quartz substrate etched in this manner was 70 nm. The remaining resist and Cr film were removed, thereby obtaining a synthetic quartz substrate in which a concave-convex structure corresponding to the arrangement pattern of the first pattern 201 was formed.

Next, a film made of Cr was formed by sputtering on the surface of the synthetic quartz substrate in which the above concave-convex structure was formed, and an electron beam resist pattern was formed on the Cr film by electron-beam lithography. The pattern thus formed was a pattern including a plurality of strip regions shown in FIGS. 18A and 18B. The length of the above strip regions in the first direction was 200 nm, and the arrangement interval of the above strip regions in the first direction had an average of 2000 nm and a standard deviation of 500 nm. The electron beam resist used was a positive type, and the film thickness was set to 200 nm.

Next, the Cr film in the region exposed from the resist was etched with plasma generated by applying high frequency to a gas mixture of chlorine ($Cl_2$) and oxygen ($O_2$). Subsequently, the synthetic quartz substrate in the region exposed from the resist and the Cr film was etched with plasma generated by applying high frequency to hexafluoroethane gas. The depth of the synthetic quartz substrate etched in this manner was 65 nm. After the remaining resist and Cr film were removed, Optool HD-1100 (registered trademark; produced by Daikin Industries, Ltd.) was applied as a mold release agent to the surface of the synthetic quartz substrate. The mold in which a concave-convex structure corresponding to the concave-convex structure of the concave-convex layer 10 having a multi-stage shape was formed was obtained in this manner. A mold in which a concave-convex structure corresponding to the concave-convex structure 62 was formed for forming the antireflection layer 61 was formed by the same production method.

Next, a photocurable resin (PAK-02, produced by Toyo Gosei Co., Ltd.) was applied to both surfaces of a polyester film, which were subjected to easily-adhesive treatment (Cosmoshine A4100 (registered trademark), produced by Toyobo Co., Ltd.). The surface of the mold on which the concave-convex structure was formed was pressed against the resin, and light at 365 nm was applied to the rear surface of the mold. After the photocurable resin was cured by irradiation with this light, the polyester film and the concave-convex layer were removed from the mold. Thus, the polyester film, which was a substrate 60 on which a concave-convex layer 10 composed of the first pattern 201 and the second pattern 211 was laminated, was obtained.

Next, a mold for forming a concave-convex structure 62, which has a cross-sectional bell shape, a periodicity of 400 nm, a height of 200 nm, and an aspect ratio of 2.0, was formed by the same method as that of the concave-convex layer 10. Then, a photocurable resin (PAK-02, produced by Toyo Gosei Co., Ltd.) was applied to the surface of the substrate 60 on a side opposite to that on which the concave-convex layer 10 was formed. The surface of the mold on which the concave-convex structure was formed was pressed against the resin, and light at 365 nm was applied to the rear surface of the mold. After the photocurable resin was cured by irradiation with this light, the polyester film and the concave-convex structure 62 were removed from the mold. The polyester film, which was a substrate 60 on which the antireflection layer 61 having the concave-convex structure 62 was formed, was obtained in this manner.

Then, a $TiO_2$ film having a film thickness of 80 nm as a high refractive index layer, a $SiO_2$ film having a film thickness of 70 nm as a low refractive index layer, and a $TiO_2$ film having a film thickness of 150 nm as a high refractive index layer were sequentially formed by vacuum deposition on the surface having the concave-convex layer 10, and an interference layer 31 was formed on the concave-convex layer 10 to thereby form a color developing structure 1. Thus, a display 50 having the color developing structure 1 was obtained.

Example 2-2

Example 2-2 is the color developing structure 1 that includes a concave-convex layer 10 having a concave-convex structure and which is formed on one surface of the substrate 60, an interference layer 31 formed on the concave-convex layer 10 and having a concave-convex structure in which a concave-convex pattern is repeated along the concave-convex structure of the concave-convex layer 10, and an antireflection layer 61 formed on the other surface of the substrate 60 and having a concave-convex structure 63 as the antireflection layer 61.

Specifically, a mold for forming the concave-convex structure 63, which has a cross-sectional shape of a rectangular shape, a film thickness of 150 nm, and a pattern in which rectangles having a short side length of 180 nm and long side length of 3 cm are arranged in the short side direction at a periodicity of 396 nm, was formed by the same method as that of the concave-convex structure 62 of Example 1. Then, a photocurable resin (PAK-02, produced by Toyo Gosei Co., Ltd.) was applied to the surface of the substrate 60 on a side opposite to that on which the concave-convex layer 10 was formed. The surface of the mold on which the concave-convex structure was formed was pressed against the resin, and light at 365 nm was applied to the rear surface of the mold. After the photocurable resin was cured by irradiation with this light, the polyester film and the concave-convex structure were removed from the mold. The polyester film, which was a substrate 60 on which the antireflection layer 61 having the concave-convex structure 63 was laminated, was obtained in this manner.

Then, an Al film having a film thickness of 50 nm was formed as a metal layer by vacuum deposition on the surface having the concave-convex structure 63, and the metal layer 65 was formed on the upper surface of the convex portion and the upper surface of the concave portion of the concave-convex structure 63 to thereby form a color developing structure 1. Thus, a display 50 having the color developing structure 1 was obtained.

Comparative Example 2-1

The display of Comparative Example 2-1 was obtained in the same manner as Example 2-1 except that the antireflection layer 61 was not formed. That is, Comparative Example 2-1 is a color developing structure that includes the concave-convex layer 10 having a concave-convex structure, which is formed on the substrate 60, and an interference layer 31 formed on the concave-convex layer 10 and having a concave-convex structure in which a concave-convex pattern is repeated along the concave-convex structure of the concave-convex layer 10.

<Evaluation of Display>

In the displays 50 of Examples 2-1 and 2-2, a glossy blue color was observed with good visibility. Further, in Example 2-2, a reflection spectrum having a center wavelength of approximately 620 nm was observed in a reflection spectroscopy performed on the rear surface. On the other hand, in Comparative Example 2-1, the visibility of a blue color was lower than that of Examples.

The embodiments of the present invention has been described above. However, these embodiments are merely examples of a device or a method for embodying the technical idea of the present invention, and the technical idea of the present invention are not intended to limit the materials, shapes, structures, layouts and the like of the components. The technical idea of the present invention can be modified in various ways within the technical scope defined by the claims.

The scope of the present invention is not limited to the illustrative embodiment illustrated and described above, but also includes all embodiments that provide effects equivalent to those intended by the present invention. Further, the scope of the present invention is not limited to combinations of features of the invention defined by the claims but should be defined by any desired combination of specific features among all the disclosed features.

REFERENCE SIGNS LIST

1: Color developing structure; 9, 60: Substrate; 10: Concave-convex layer; 100: Flat region; 11: First surface; 110: Second surface; 12: First pattern; 121a, 121b: Strip portion of first pattern; 122a, 122b: Strip portion of first pattern; 123: Strip portion of first pattern; 124a, 124b: Strip portion of first pattern; 125a, 125b: Strip portion of first pattern; 13: Concave portion of first pattern; 14: Second pattern; 141 to 143: Strip portion of second pattern (second strip portion); 15: Concave portion of second pattern; 16: Region including only strip portion of first pattern; 17: Region including only strip portion of second pattern; 18: Region in which strip portions of first pattern and second pattern are overlapped with each other; 19: Concave portion; 20: Reflective layer; 31: Interference layer; 31*a*: High refractive index layer; 31*b*: Low refractive index layer; 50: Display; 51: First display region; 51A: First pixel; 52: Second display region; 52A: Second pixel; 61: Antireflection layer; 65: Metal layer.

What is claimed is:

1. A color developing structure, comprising:
   a concave-convex layer having a first surface, and a second surface located on a side facing away from the first surface, the first surface being provided with a concave-convex structure, the concave-convex structure comprises a first convex surface having a first upper-most height from the second surface of the concave-convex layer, a second convex surface having a second upper-most height from second surface of the concave-convex layer and a third convex surface having a third upper-most height from second surface of the concave-convex layer, the first upper-most height is smaller than the second upper-most height and the second upper-most height is smaller than the third upper-most height; and
   a functional layer located on the first surface or the second surface of the concave-convex layer, wherein
   the first convex surface of the concave-convex structure has a first pattern composed of a plurality of first strip portions in plan view, and each strip portion of the plurality of first strip portions has a width in a first direction and a length in a second direction perpendicular to the first direction, the width is smaller than a wavelength of incident light, and a standard deviation of the lengths of the plurality of first strip portions is larger than a standard deviation of the respective widths;
   the second convex surface of the concave-convex structure has a second pattern that overlaps the first pattern in plan view only partially; the second pattern is composed of a plurality of second strip portions in plan view, and each of the plurality of second strip portions has a width in the first direction and a length in the second direction perpendicular to the first direction, and
   arrangement intervals of the plurality of second strip portions in the first direction are not constant, and an average of the arrangement intervals is equal to or more than ½ of a minimum wavelength in a wavelength range of incident light.

2. The color developing structure of claim 1, wherein a material for forming the concave-convex layer is a composite having a refractive index in the visible light region of 1.4 or more and 3.0 or less, or a composite including an inorganic compound having an extinction coefficient of 2 or more and 6 or less.

3. The color developing structure of claim 1, wherein the functional layer is a reflective layer, and the reflective layer is disposed on the first surface and follows a surface shape of the concave-convex structure.

4. A method for producing the color developing structure of claim 1, comprising a step of forming the concave-convex structure by transferring a concave-convex pattern of an intaglio plate to a resin by nanoimprinting.

5. The color developing structure of claim 1, wherein the functional layer is a reflective layer, and the reflective layer is disposed on the second surface of the concave-convex layer.

6. The color developing structure of claim 5, wherein the concave-convex layer has a thickness in a range of 20 nm or more and 1000 nm or less between the first surface and the second surface.

7. A display comprising a display element formed of the color developing structure of claim 1.

8. The display of claim 7, wherein
   a plurality of the display elements are disposed in a plane, and
   two display elements selected from the plurality of the display elements, that is, a first display element and a second display element, constitute color developing structures having layer configurations which are the same in material and film thickness and different in height of a convex portion of the concave-convex structure.

9. A watch dial having the display of claim 7.

10. An automobile component having the display of claim 7.

11. The color developing structure of claim 1, further comprising an interference layer that follows a surface shape of the concave-convex structure.

12. The color developing structure of claim 11, wherein a material for forming the interference layer includes a compound having a refractive index difference of 0.2 or more and 0.8 or less relative to the concave-convex layer.

13. The color developing structure of claim 11, wherein the functional layer is a reflective layer, and a material for forming the interference layer includes a compound having a refractive index difference of 0.6 or more and 1.5 or less relative to the reflective layer.

14. The color developing structure of claim 13, wherein the reflective layer is made of one or more materials selected from the group consisting of metal, metal alloy, and metal composite material, and the selected material satisfies one or both of a refractive index in the visible light region of 0.2 or more and 5.0 or less and an extinction coefficient in the visible light region of 2 or more and 6 or less.

15. The color developing structure of claim 11, wherein the functional layer is an antireflection layer, and the antireflection layer is disposed on the second surface of the concave-convex layer.

16. The color developing structure of claim 15, wherein
   the antireflection layer has a second concave-convex structure on a side facing away from the concave-convex layer,
   the second concave-convex structure has a height of 10 nm or more and 500 nm or less in a film thickness direction,
   convex portions constituting the second concave-convex structure are arranged in any one of an irregular arrangement, a square arrangement, and a hexagonal arrangement, or an island-like pattern formed by combining these,
   a structural periodicity of the second concave-convex structure is in a range of 10 nm or more and 1000 nm or less, and
   a ratio of a width of the structural periodicity of the second concave-convex structure to a width of a concave portion constituting the second concave-convex structure is in a range of 0.25 or more and 0.75 or less.

17. The color developing structure of claim 15, wherein
   the antireflection layer has a second concave-convex structure on a side facing away from the concave-convex layer, the second concave-convex structure has a height of 10 nm or more and 200 nm or less in a film thickness direction, convex portions constituting the second concave-convex structure are arranged in any one of an irregular arrangement, a square arrangement, and a hexagonal arrangement, or an island-like pattern formed by combining these, the color developing structure further comprises a reflective layer that follows a surface shape of the second concave-convex structure, a structural periodicity of the second concave-convex structure and a structural periodicity of the reflective layer are a subwavelength periodicity, which is equal to or less than a wavelength in the visible region, and a ratio of a width of the structural periodicity of the second concave-convex structure to a width of a concave portion of the second concave-convex structure, and a ratio of a width of a convex portion of a concave-convex structure of the reflective layer to a width of a concave portion of the concave-convex structure of the reflective layer which follows the second concave-convex structure are in a range of 0.25 or more and 0.75 or less.

18. The color developing structure of claim 15, wherein the antireflection layer includes a black pigment.

19. The color developing structure of claim 15, wherein the interference layer includes one or more compounds including an inorganic substance or an inorganic composite material having a refractive index of 1.3 or more and 4.0 or less.

20. The color developing structure of claim 15, wherein the interference layer has a multilayer film configuration in which a high refractive index compound and a low refractive index compound are alternately laminated, and a refractive index difference between the high refractive index compound and the low refractive index compound is in a range of 0.6 or more and 2.2 or less.

* * * * *